(12) United States Patent
Izaki et al.

(10) Patent No.: US 9,785,813 B2
(45) Date of Patent: Oct. 10, 2017

(54) PORTABLE OPTICAL READER

(71) Applicant: Keyence Corporation, Osaka (JP)

(72) Inventors: Tomomi Izaki, Osaka (JP); Yusuke Nishizawa, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/298,254

(22) Filed: Oct. 20, 2016

(65) Prior Publication Data

US 2017/0140188 A1    May 18, 2017

(30) Foreign Application Priority Data

Nov. 13, 2015    (JP) ................ 2015-222598

(51) Int. Cl.
    *G06K 7/10*      (2006.01)
    *G06K 7/14*      (2006.01)
    *G06K 19/06*     (2006.01)

(52) U.S. Cl.
    CPC ..... *G06K 7/10881* (2013.01); *G06K 7/10742* (2013.01); *G06K 7/1417* (2013.01); *G06K 19/06037* (2013.01)

(58) Field of Classification Search
    CPC ........... G06K 7/10881; G06K 7/10742; G06K 19/06037; G06K 7/10891; G06K 7/10851; G06K 17/0022; G06K 7/10584

USPC ............ 235/462.44, 462.45, 462.46, 462.47, 235/472.01, 472.02, 472.03, 462.11
See application file for complete search history.

(56) References Cited

U.S. PATENT DOCUMENTS

| | | | | |
|---|---|---|---|---|
| 5,448,046 A | * | 9/1995 | Swartz | ............... G06K 7/10633 235/383 |
| 2003/0001018 A1 | * | 1/2003 | Hussey | .............. G06K 7/10851 235/472.01 |
| 2017/0140187 A1 | | 5/2017 | Izaki et al. | |

FOREIGN PATENT DOCUMENTS

JP           2012-103092 A      5/2012

* cited by examiner

*Primary Examiner* — Karl D Frech
(74) *Attorney, Agent, or Firm* — Kilyk & Bowersox, P.L.L.C.

(57) ABSTRACT

A portable optical reader is provided with: a reading part 41 optically reading a symbol as a reading object; a head part 3 storing the reading part 41 and having a reading port 4 for the reading part 41; a holding part 2 continuously connected to the head part 3 and extending in a connecting direction; and a display part 22 provided in the head part 3 and displaying at least a reading result. The head part 3 is formed by side surfaces, and the display part 22 is provided in at least two side surfaces which are a side surface facing to a surface providing the holding part 2, and a side surface in which a reading direction by the reading part 41 and an extending direction of the holding part 2 are substantially orthogonal to each other.

19 Claims, 48 Drawing Sheets

FIG. 9
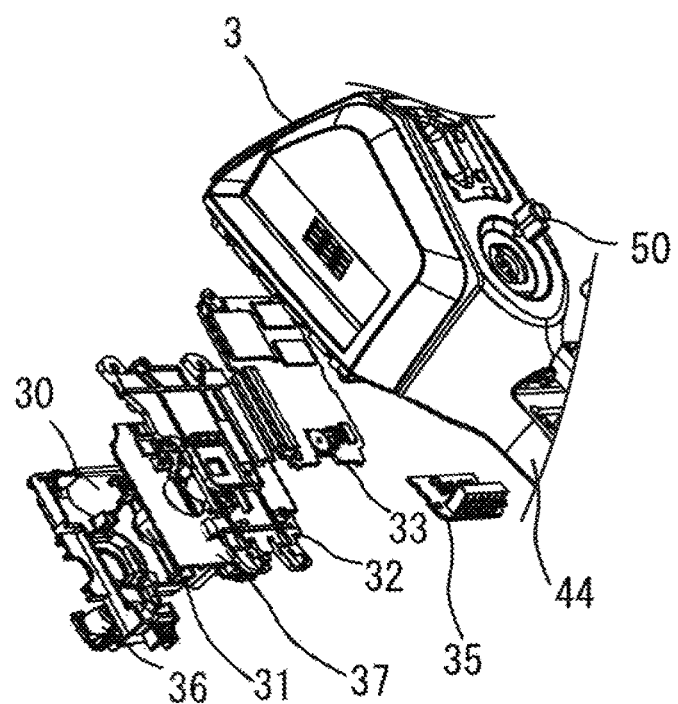
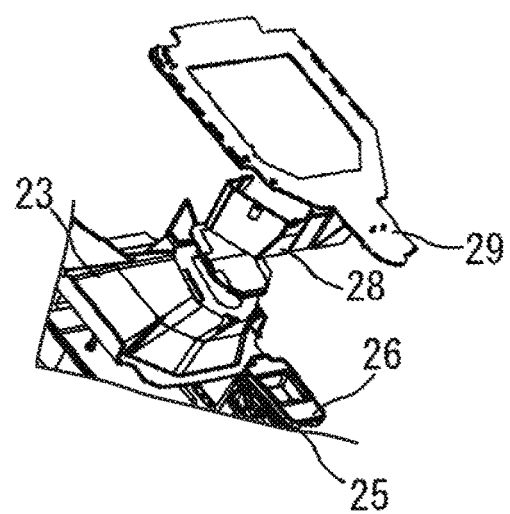

WHEN PRESSING FUNCTION BUTTON, A MODE IS CHANGED.

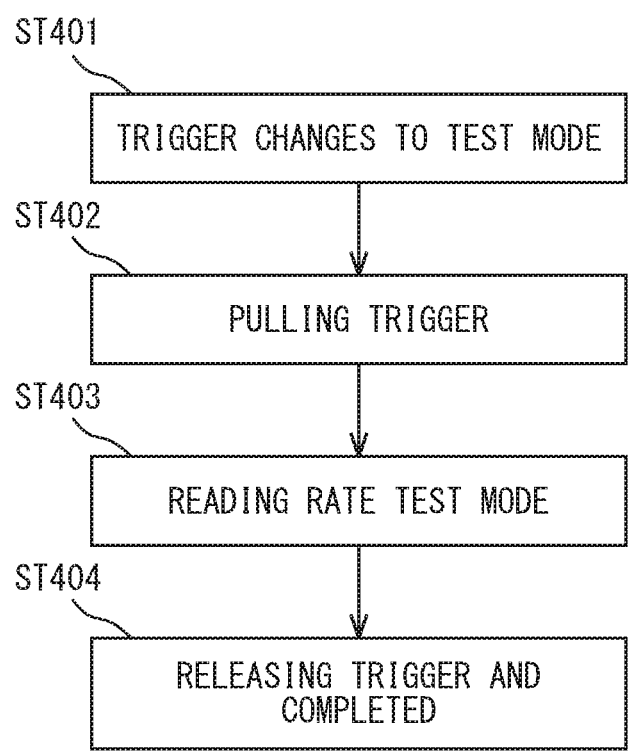

PORTABLE OPTICAL READER

CROSS-REFERENCE TO RELATED APPLICATIONS

The present application claims foreign priority based on Japanese Patent Application No. 2015-222598, filed Nov. 13, 2015, the contents of which is incorporated herein by reference.

TECHNOLOGICAL FIELD

The present invention relates to a portable optical reader which improves visibility of indicators for notifying various information to a user.

BACKGROUND ART

Conventionally, handy scanners, which are hand-held type scanners, are well known as a device to read symbols marked on products or a packing boxes. Among the handy scanners, generally, indicators such as a LED or a liquid crystal display, etc. are provided for the user to notify when symbols are read.

For example, in Patent Document 1 (JP 2012-103092), as shown in FIG. 48, a lamp 1014 turned on when a symbol is read is provided on the top surface (in a direction of a head part of a grip) of a reader 1001, and when the product bar code BC is read, the lamp 1014 is turned on.

SUMMARY OF THE INVENTION

Problems to be Solved by the Invention

However, as shown in FIG. 48, the indicator described above is arranged on the top surface of the head part which stores a reading part such as a laser scanner or an imaging element, etc. In this case, when the user holds the grip to read a symbol, there is a problem that it is difficult to view the indicator which is arranged in a user's blind area.

In this view point, it may be considered that the indicator is provided in, for example, a rear surface of the head part which is the surface where the user can view even when the user holds the grip.

On the other hand, in many cases, when the user holds the grip to read a symbol, the user's vision is directed toward the symbol itself attached in the products or the packing boxes. Therefore, the indicator arranged in a position farther from ahead of a user's vision is still lack of visibility.

The present invention was made in consideration of the aforementioned problems. One of the objects in the present invention is to provide a portable optical reader which improves visibility of indicators for notifying various information to a user.

Means for Solving the Problems

According to the portable optical reader according to the first aspect of the present invention, it can be provided with: a reading part optically reading a symbol as a reading object; a head part housing (storing) the reading part and having (forming) a reading port for the reading part; a holding part continuously connected (provided) to the head part and extending in a connecting direction, and the holding part being held by a user; and a display part provided in the head part to display at least a reading result read by the reading part for the user. The head part has outer side surfaces, and the display part is provided on at least two of outer side surfaces, the outer side surfaces being a side surface facing to a surface on which the holding part is connected and being a side surface substantially orthogonal to both a reading direction by the reading part and an extending direction of the holding part. With the aforementioned structure, by providing the display part in a portion which hardly becomes a blind area in the side surfaces of the head part, the visibility of the display part can be improved. Further, even though the head part is formed by a curved surface, by providing the display part to the side surfaces which include a tangent plane which is in the aforementioned positional relationship, the visibility of the display part can be improved.

Further, according to the portable optical reader according to the second aspect of the present invention, the display part has a first display part on one side of a pair of the outer side surfaces facing in a direction substantially orthogonal to the extending direction of the holding part, and has a second display part on another side. With the aforementioned structure, by respectively providing the first display part and the second display part to the right side surface and the left side surface of the head part, the user can view the display part whether a reading operation is performed from the left side or the right side with respect to a symbol, that is, whether the user is left-handed or right-handed, the display part can be viewed.

Further, according to the portable optical reader according to the third aspect of the present invention, on the side surfaces which form the head part, the display part is provided in a position further forward than a rear surface of the holding part. With the aforementioned structure, at the time of the reading operation, the user's vision is directed towards the symbol, so that the display part is provided in vicinity of the reading port which becomes the closest to the symbol at the time of the reading operation. Therefore, the visibility of the display part can be further improved.

Further, according to the portable optical reader according to the fourth aspect of the present invention, the display part has an inclined surface separating from a reading optical axis of the reading part while being closer to the reading port. With the aforementioned structure, the user can view the display part even though the user views from the rear side of the head part.

Further, according to the portable optical reader according to the fifth aspect of the present invention, the display part extends along a circumference direction of the reading port. With the aforementioned structure, the display part has a bar shape which extends along the circumference direction of the reading port, so that the visibility of the display part is enhanced. Specifically, the viewing angle of the display part widens in a case in which the side surface of the head part is curved in the circumference direction of the reading port.

Further, according to the portable optical reader according to the sixth aspect of the present invention, the display part includes a plurality of display elements continuously provided in an extending direction of the holding part in a manner of extending along the circumference direction of the reading port. With the aforementioned structure, the plurality of the display elements is continuously provided in a bar shape, so that each display element may be integrally or individually displayed, and it is possible to display various operations or status of the portable optical reader.

Further, according to the portable optical reader according to the seventh aspect of the present invention, the holding part is continuously connected (provided) to the head part in a manner in which the extending direction of the holding part is substantially parallel to a plane surface including the reading port of the reading part.

Further, according to the portable optical reader according to the eighth aspect of the present invention, it is provided with: a reading part optically reading a symbol as a reading object; a dome-shaped member provided in front of the reading part, the dome-shaped member having (forming) a first opening, a sidewall surface and a second opening, the first opening through which a reading optical axis of the reading part passes formed on a rear end surface (rear surface) of the dome-shaped member which faces to the reading part, the sidewall surface having a diameter which progressively or gradually becomes larger with an increase of a distance from the first opening, and the second opening formed on (in) a front end of the sidewall surface; a head part housing the reading part and the dome-shaped member, the head part having a side surface having a diameter which progressively and gradually becomes larger in a direction from a rear side to a front side, and having (forming) a reading port in a position facing to the second opening; a holding part in which one end of the holding part is mounted on the side surface of the head part, and extending in a direction increasing a distance from a reading optical axis of the reading part; and a display part provided to the side surface except a portion, where the holding part is mounted within the side surface of the head part, for displaying, at least, a reading result of the reading part to a user. With the aforementioned structure, by providing the display part in an inclined surface of the dome-shaped head part which stores the dome-shaped member, the visibility of the display part can be enhanced.

Further, according to the portable optical reader according to the ninth aspect of the present invention, the display part can be formed in an elongated shape in which a direction along a circumference of the side surface of the head part is defined as a longitudinal direction.

BRIEF DESCRIPTION OF THE DRAWINGS

FIG. 9 is a structural diagram showing an inside structure of the handy scanner when viewed from an angle which is different from FIG. 8;

FIG. 37 is a flowchart showing procedures of the operation of the test mode;

EMBODIMENTS FOR CARRYING OUT THE INVENTION

Figure 1:
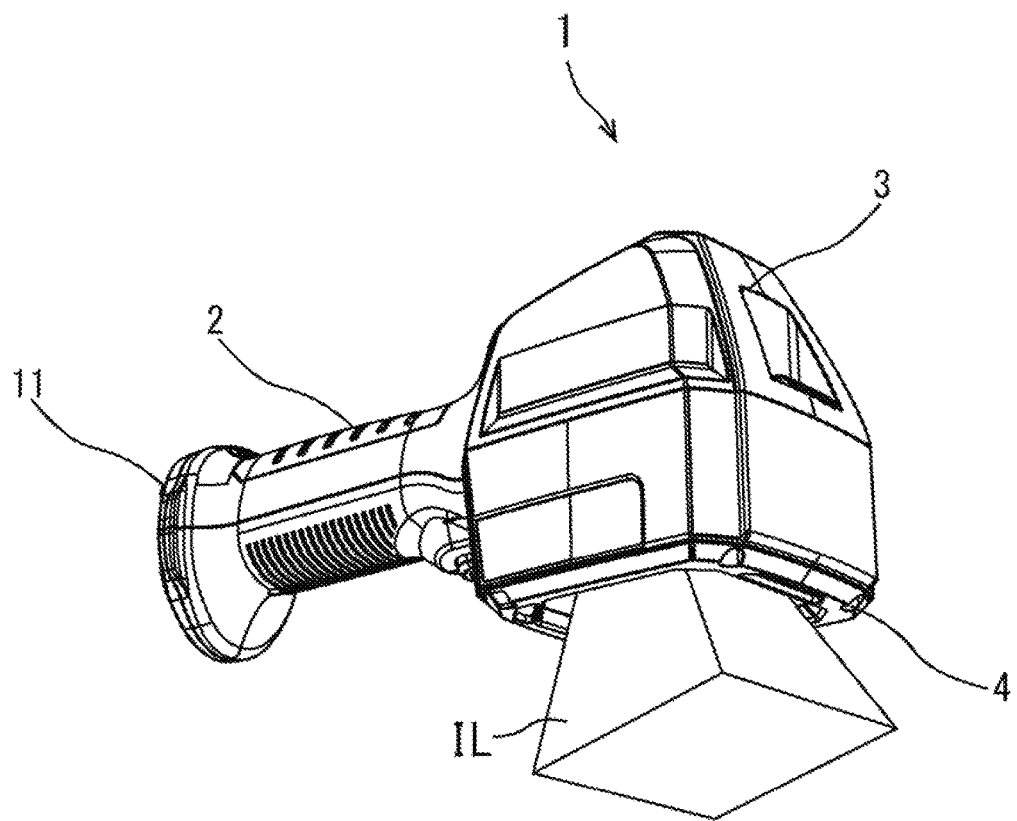
FIG. 1 is a schematic view showing a structure of a handy scanner according to embodiment 1 of the present invention.

Hereinafter, the embodiments of the present invention will be described in reference to the drawings. However, the following embodiments are each described to explain one example of a portable optical reader which realizes the technical scope of the present invention, and the present invention is not limited to the portable optical readers described below. Further, the present disclosure does not limit the elements described in the claims to the elements described in the embodiments. Specifically, the dimensions, materials, shapes, relative arrangements and so on of the elements described in the embodiments are not limited to the scope of the present disclosure to these alone in particular unless specifically described. Additionally, the sizes and the positional relationships, etc. of the elements in each of drawings are occasionally shown larger exaggeratingly for ease of explanation. Further, in the following descriptions, the same designations and the same reference numerals indicate the same or similar elements, and their description is omitted. In addition, a plurality of structural elements of the present invention may be shown as a single part that serves for the purpose of describing the plurality of elements, and on the other hand, a single structural element may be shown as a plurality of parts that serve the purpose of describing the single element.

The basic principle of the portable optical reader (hereinafter referred to as "handy scanner") is to irradiate laser light and identify symbols such as bar code, etc. (hereinafter referred to as "bar code" or "code" as an example) by contrast of reflecting light. In recent years, in mobile phones or smartphones, two-dimensional code (QR Code (registered trademark) etc.) has widely become popular, and this symbol type cannot be scanned by laser light, so that it is captured by, mainly, a camera as an image and the image is analyzed to identify the code.

The optical reader can be broadly classified into a laser type optical reader and a camera type optical reader, in other words, it can be classified into a fixed type optical reader and a hand-held type optical reader. Generally, the fixed type optical reader may not be used in daily life, but it can be used in an automation line in, for example, a factory for traceability. For the hand-held type optical reader, there is a consumer product to be used in daily life such as cash register, or there is a chance to use the hand-held type optical reader in a factory where people work.

If it is further classified, there are a one-dimensional bar code and a two-dimensional bar code as kinds of codes. Many of the portable optical readers read symbols printed on papers or labels, but some of the portable optical readers read symbols directly printed on metal products or parts such as engines, etc. by using a laser marker, which is commonly called as Direct Part Marking (DPM).

The portable optical reader according to the present invention is a type which a user holds by hands for a reading work. Application targets are in various fields such as consumer products, DPM, etc., and are not particularly limited.

Further, for the symbols, in addition to one-dimensional code or two-dimensional code, the symbols include the combined symbols of the one-dimensional code and the two-dimensional code. The one-dimensional code is called as bar code or one-dimensional symbol, etc., and it may be Code 39, Code 128, etc.

The two-dimensional code is also called as two-dimensional bar code or two-dimensional symbol, etc., and there are QR Code (registered trademark), Micro QR Code, DataMatrix, VeriCode, AztecCode, PDF417, MicroPDF417, MaxiCode, etc.

Further, for the combined symbols, there are GS1 combined symbol, etc. in which the one-dimensional code and the two-dimensional code exist. Three types EAN/UPC (EAN-13, EAN-8, UPC-A, UPC-E), GS1-128, and GS1 data bar can be used as the one-dimensional code, which becomes the base, for the GS1 combined symbol. Further, two-dimensional codes MicroPDF417 or PDF417 can be used for additional information. Furthermore, the present embodiments can apply to the combination of a bar code and a matrix type two-dimensional code such as Micro QR Code, etc. (Structure of handy scanner 1)

FIG. 1 is a schematic diagram showing the structure of a handy scanner 1 according to one embodiment of the present invention. In the drawing, reference numeral IL denotes illumination light. Hereinafter, for the sake of convenience, the respective surfaces are defined in conformity with the orthographic drawing method. The surface in the direction viewed from the reading port 4 side of the handy scanner 1 is defined as a front surface. The surface in the direction viewed from the head part 3 side is defined as a plane surface. The surface in the direction viewed from the end surface side of the holding part 2 is defined as a bottom surface. Further, the reading port 4 side of the handy scanner 1 is defined as a front side, and the opposite side of the handy scanner 1 is defined as a rear side.

Figure 2:
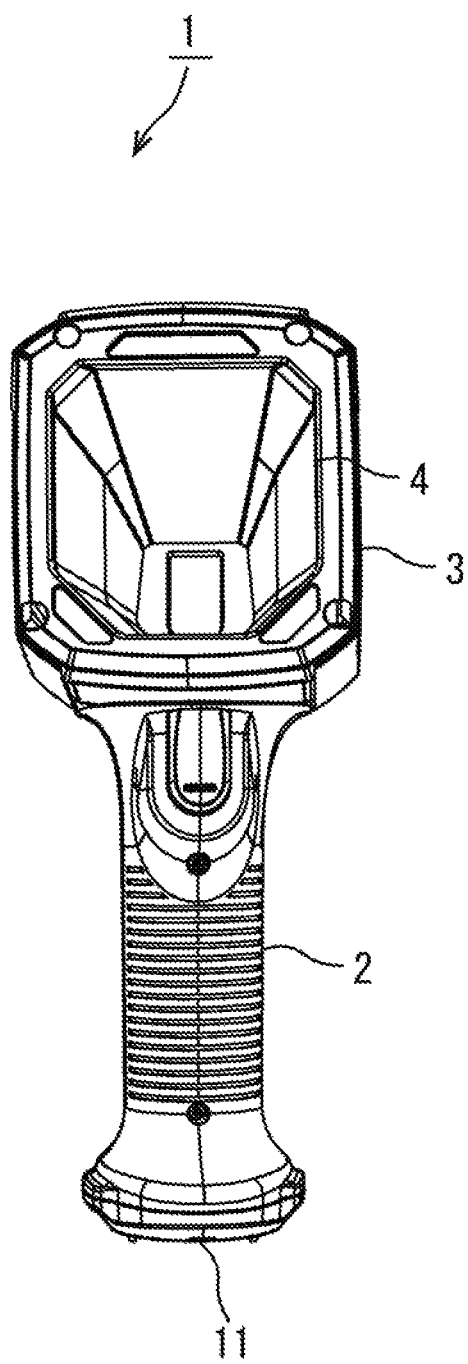
FIG. 2 is a front view of the handy scanner.
Figure 3:
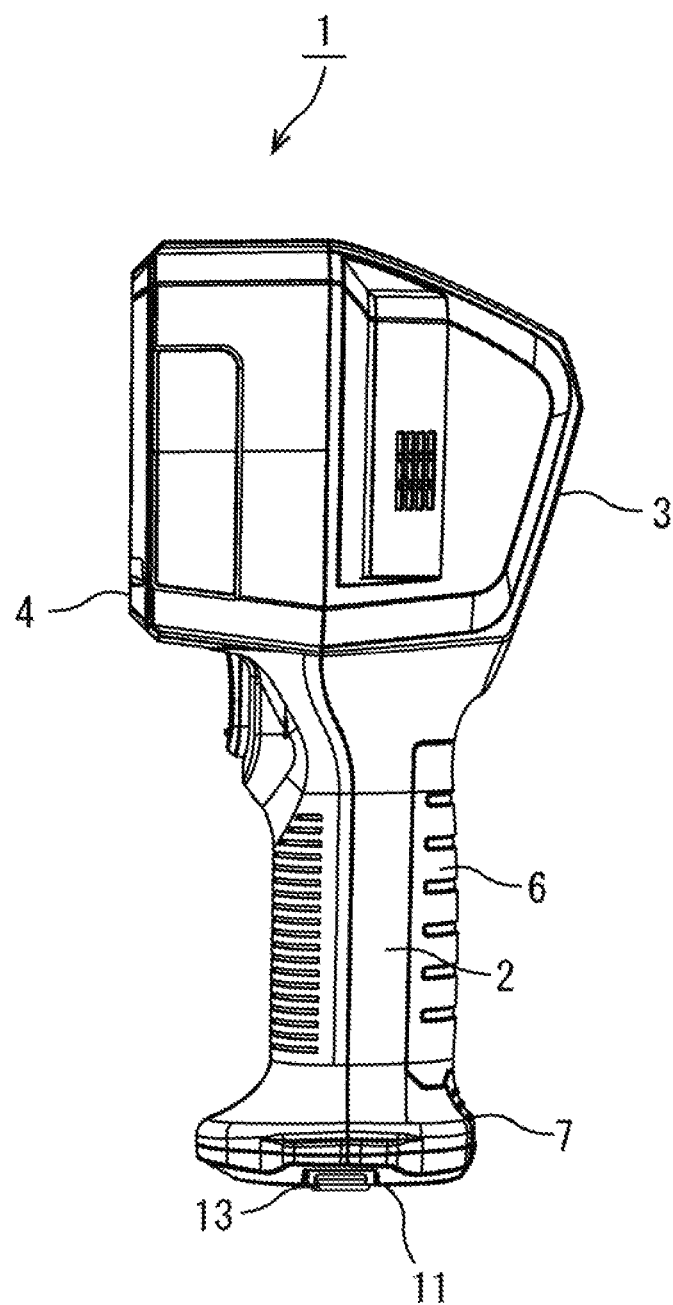
FIG. 3 is a right side view of the handy scanner.
Figure 4:
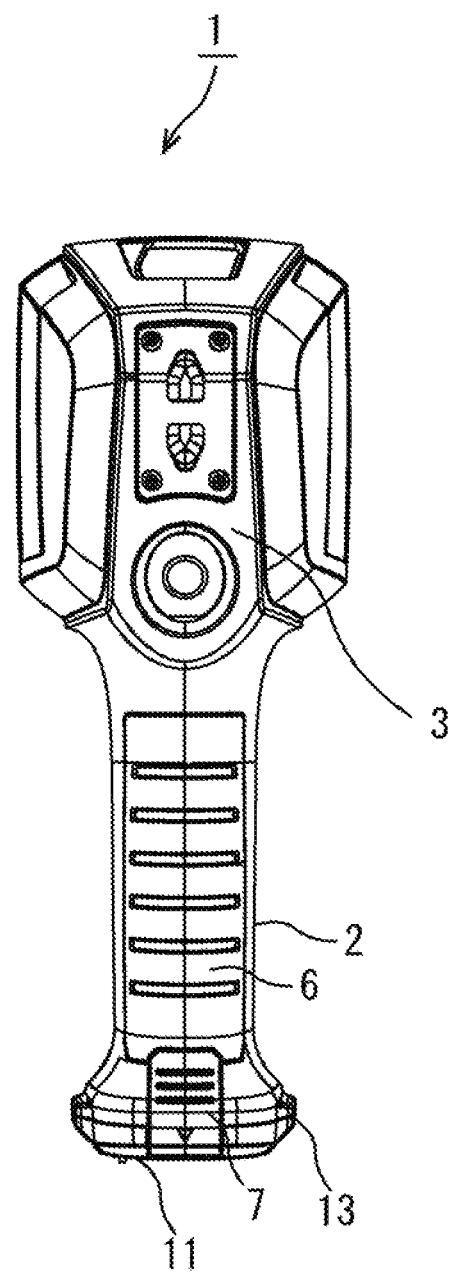
FIG. 4 is a rear view of the handy scanner.

FIG. 2 is a front view of the handy scanner 1. FIG. 3 is a right side view of the handy scanner 1. FIG. 4 is a rear view of the handy scanner 1. As shown in FIGS. 1 to 4, the handy scanner 1 is provided with, at the upper part of the front view, a rectangular-shaped reading port 4 for reading a bar code, and a head part 3 continuously formed on the both surfaces and the plane surface in the direction from the reading port 4 to the rear surface. Further, a holding part 2, which is held by the user, is continuously provided to the head part 3 in a continuously providing direction; that is, it extends in a direction of the bottom surface in a manner in which the outer shape becomes a substantially circular rod shape in the cross-section. The holding part 2 is continuously provided to the head part 3 in a manner in which the extending direction of the holding part 2 is approximately parallel to the plane surface including the reading port 4.

Figure 5:
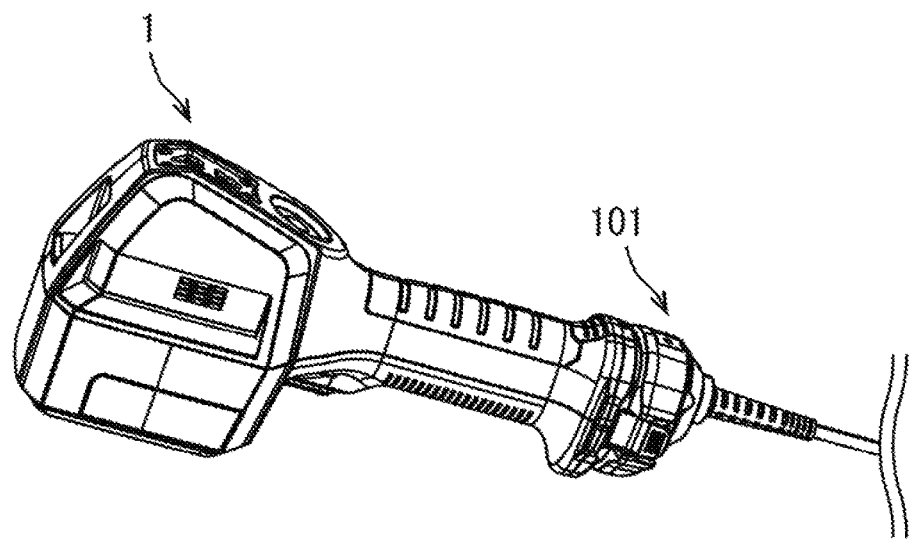
FIG. 5 is a diagram showing a state in which a charging unit and the handy scanner are connected.
Figure 6:
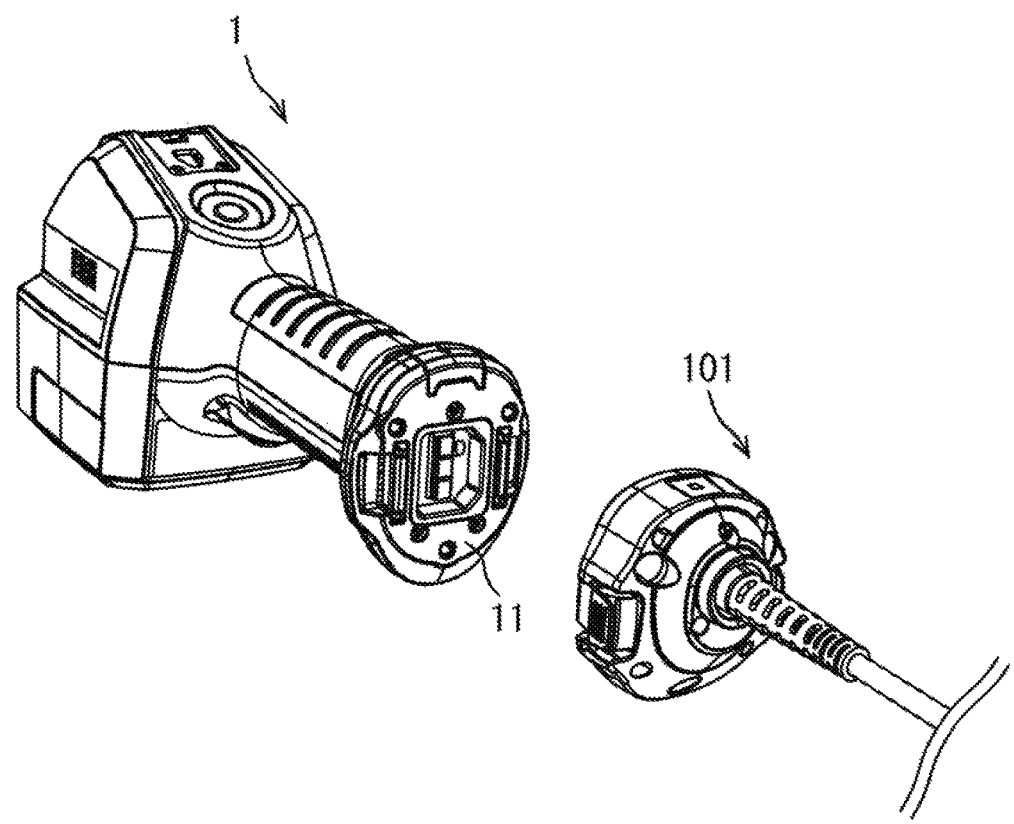
FIG. 6 is a diagram showing a state in which the handy scanner is removed from the charging unit.

An end surface is formed in the direction of the bottom surface of the holding part 2, and a charging unit connection part 11 is arranged on the end surface. A charging unit 101 is connected to the charging unit connection part 11. FIG. 5 is a diagram showing a state in which the handy scanner 1 is connected to the charging unit 101. FIG. 6 is a diagram showing a state in which the handy scanner 1 is removed from the charging unit 101. As shown in these drawings, the handy scanner 1 can be used while keeping the connection to the charging unit 101, or the handy scanner 1 can be used as a stand-alone wireless unit.

The battery 5 or the charging unit 101 supplies driving power in order to drive the handy scanner 1. However, if both of the battery 5 and the charging unit 101 can supply driving power, the one having higher voltage is prioritized. Normally, the charging unit 101 which has higher voltage supplies the driving power. As shown in the drawings, the user can perform a reading operation of bar code while keeping the state in which the handy scanner 1 is connected to the charging unit 101 without caring about the charging state of the battery 5, or regardless of existence of the battery 5.

Figure 7:
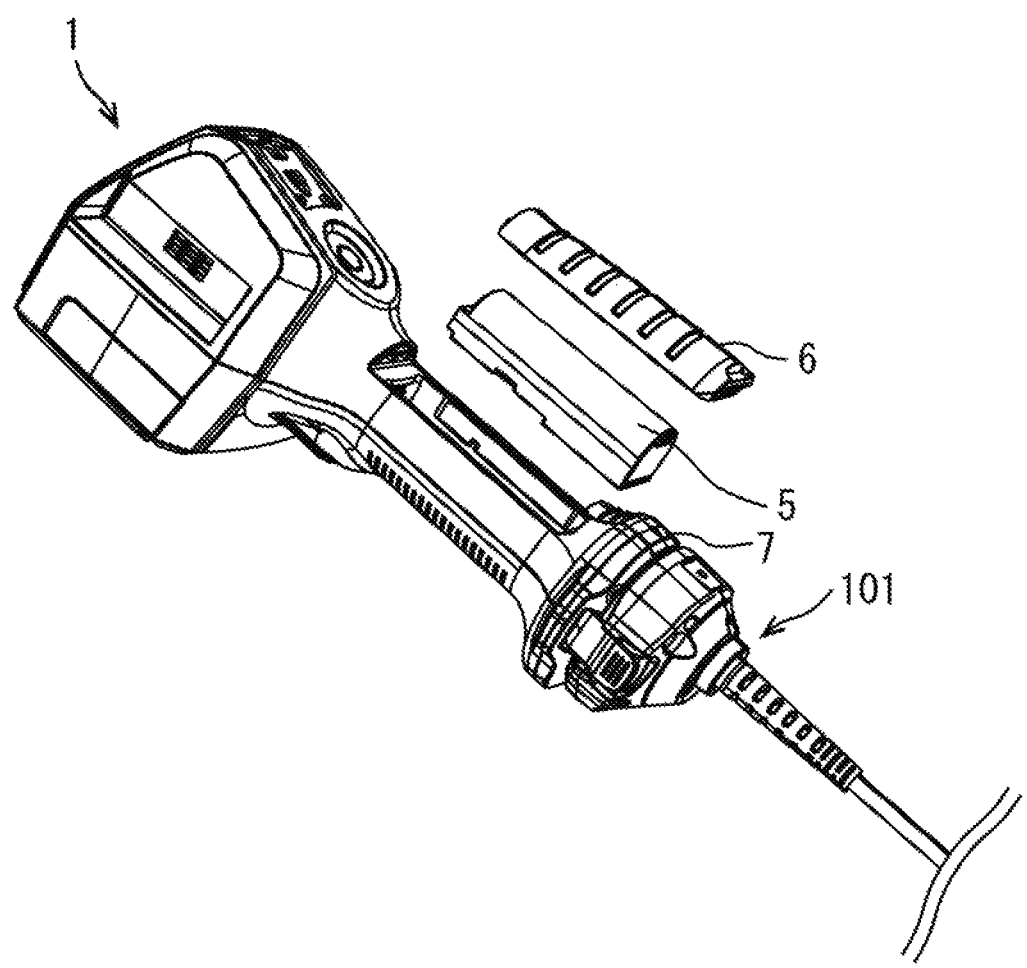
FIG. 7 is a diagram showing a state in which a battery is removed from the handy scanner.

FIG. 7 is a diagram showing a state in which the battery 5 is removed from the handy scanner 1. As shown in the drawing, the battery 5 has a cylindrical shape. For example, a lithium ion battery can be used, and it is stored inside the holding part 2 by closing a battery lid 6. A battery lid lock 7 is provided in the lower side of the battery lid 6 in FIG. 7. There is a structure in which when the user pushes the battery lid lock 7, the battery lid 6 opens.

Figure 8:
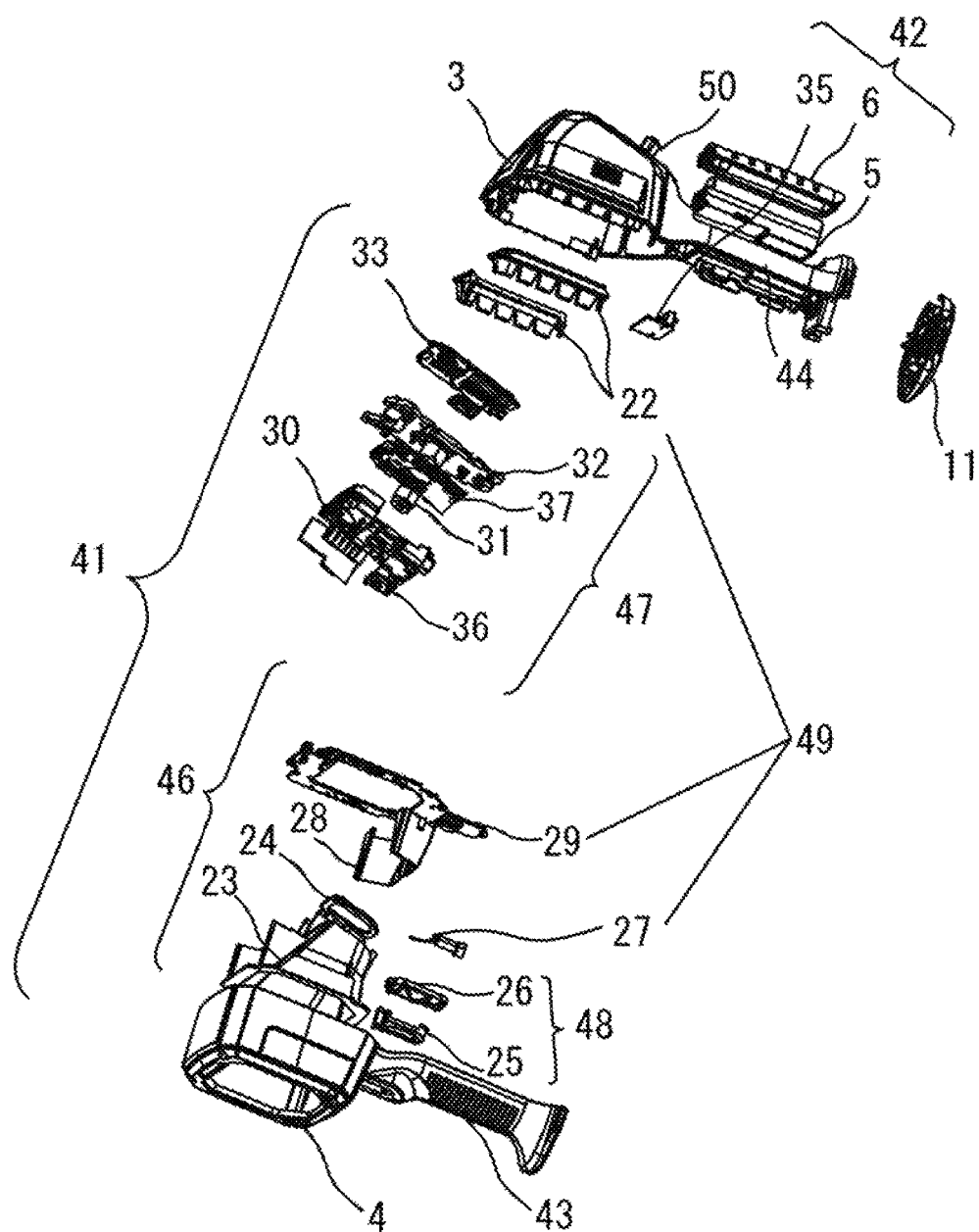
FIG. 8 is a structural diagram showing an inside structure of the handy scanner.
Figure 10:
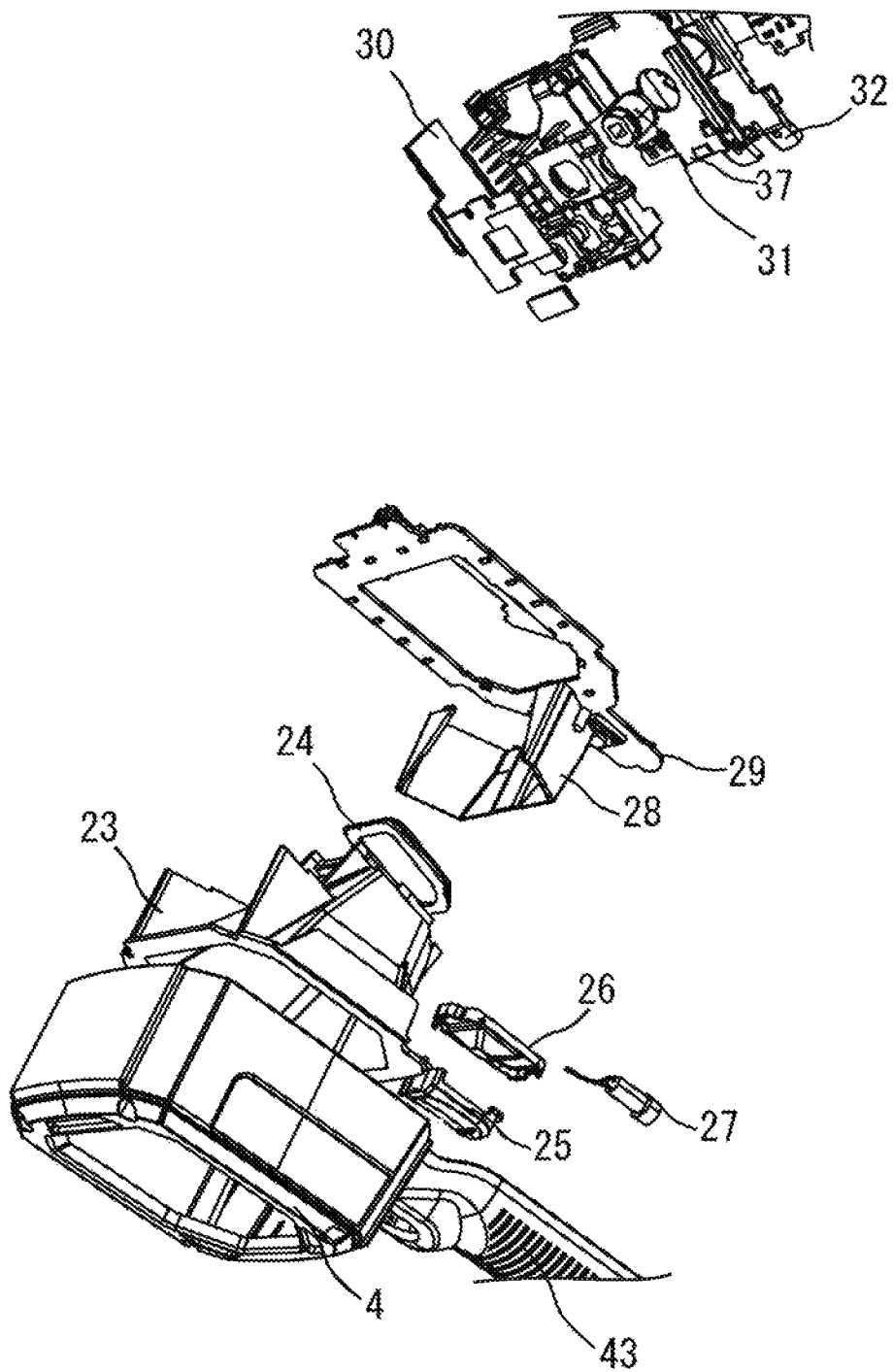
FIG. 10 is a structural diagram showing an inside structure of the handy scanner when viewed from an angle which is different from FIGS. 8 and 9.

FIGS. 8 to 10 are structural diagrams showing an inside structure of the handy scanner 1. As shown in these drawings, mainly, the handy scanner 1 is provided with a front case 43, a reading part 41, a battery part 42, a rear case 44, and a charging unit connection part 11.

As shown in FIGS. 8 to 10, the reading part 41 is provided with the following main elements: a LED illumination 2915 (not shown) projecting LED illumination light IL to a reading object through a reflector 36 and a light projection polarizing element 242 of a polarizing element 24; LED illuminations 2911 to 2914 (not shown) emitting diffusion light IL from the side surface to the reading object through a diffusion plate 23; an illumination substrate 29 for controlling the LED illuminations 2911 to 2915; a light projecting part 46 including the reflecting plate 28 for efficiently reflecting the reflecting light which is useful for the reading; a camera frame 32; a camera cover 30; a light receiving lens 31 receiving the reflecting light from the reading object through a light reception polarizing element 241 of a polarizing element 24, in which the phase differs from the phase of the light projection polarizing element 242 by 90 degrees, and forming a light image; a light receiving part 47 including a CMOS image sensor 34 for providing a digital image from the light image formed in the light receiving lens 31; a trigger switch 25 operated by the user; a trigger packing 26; an operation part 48 including a function switch 50 for switching various modes; a notification part 49 including a vibrator 27, an indicator LED 21 (not shown), and an indicator lens 22 for notifying various information to the user; a communication part (not shown) for performing wireless communication, for example, Bluetooth (registered trademark) with a different communication unit (not shown) for sending the reading results to a Programmable Logic Controller (PLC) or a Personal Computer (PC); a main substrate 33 controlling the light projecting part 46, the light receiving part 47, the operation part 48, the notification part 49, and the communication part; and a power source substrate 37 for supplying power to various elements.

The battery part 42 is provided with, mainly, a cylindrical shaped 3.7V battery 5, the battery lid 6 for closing the storage of the battery 5, and the battery substrate 35 for supplying power from the battery 5 to the main substrate 33.

A front case 43 and a rear case 44 stores the reading part 41 and the battery part 42, and forms a housing by bonding both of the front case 43 and the rear case 44. The charging unit connection part 11 is provided to the end surface of the holding part 2 of the housing.

(Circuit Block of Handy Scanner 1)

Figure 11:
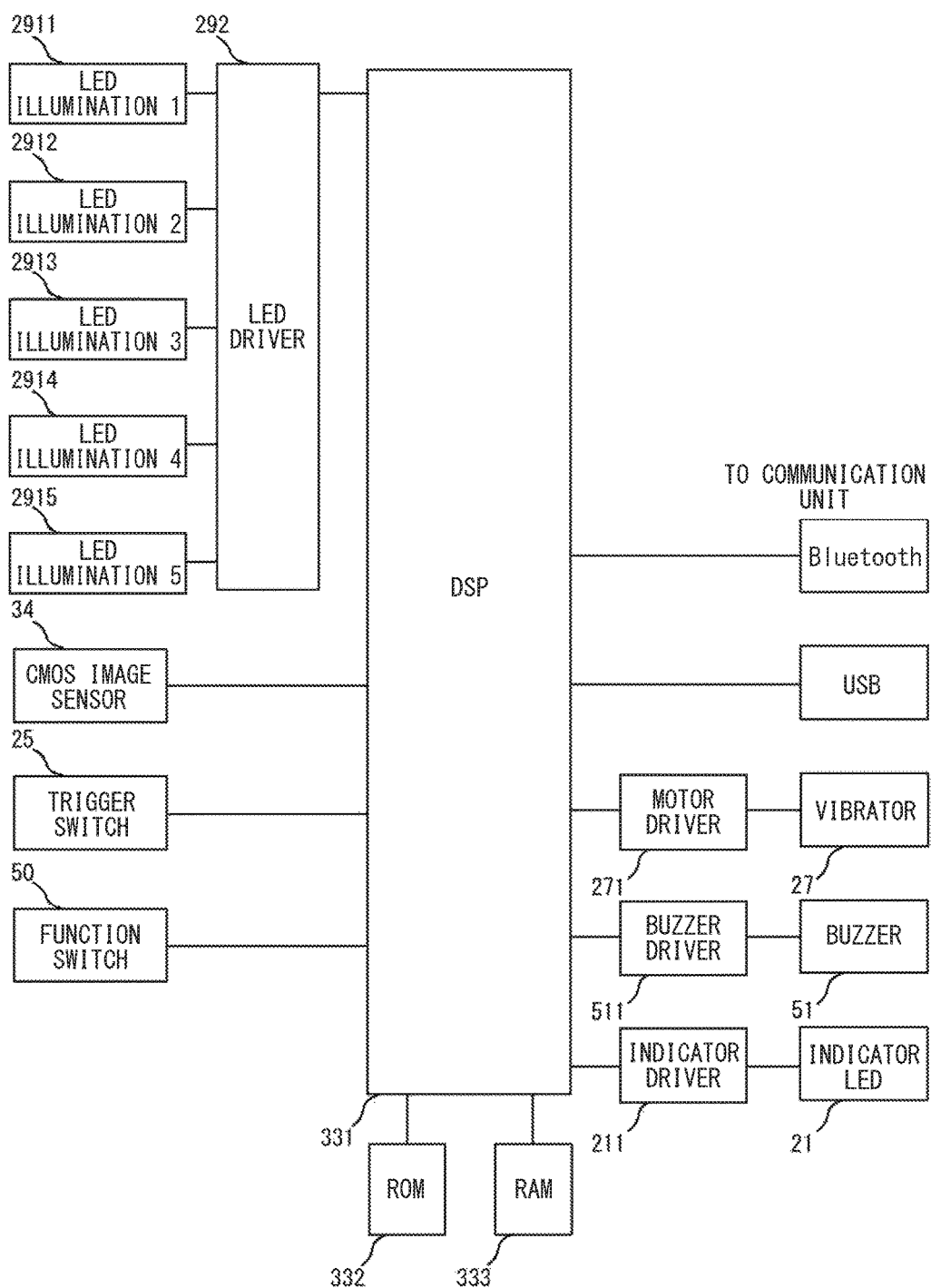
FIG. 11 is a block diagram showing a hardware structure of the handy scanner.

FIG. 11 is a block diagram showing a hardware structure of the handy scanner 1. As shown in FIG. 11, the main substrate 33 is provided with DSP 331, etc. so as to control the operations of the light projecting part 46 and the light receiving part 47 of the handy scanner 1, the operation part 48, and the notification part 49, and to execute the reading processing for an obtained image. Further, the main substrate 33 sends the reading results to the communication unit by operating the communication part.

When detecting the trigger switch ON, the DSP 331 controls to turn on the light in the LED illuminations 2911 to 2915 through a LED driver 292 in a mode based on the program or setting stored in a ROM 332 (or developed in a RAM 333). For example, blocks are formed by arranging the LED illuminations 2911 to 2914 respectively on the rear part of the diffusion plate 23 on the periphery so as to control to turn on the light in each of the blocks. By the block lighting, even though it is the diffused illumination, the illumination can be applied to a bar code in a specific direction. The block lighting will be described in detail later.

Next, the CMOS image sensor 34 stores image data in the RAM 333 and the DSP 331 performs a decode processing based on the image data stored in the RAM 333. When the reading processing completes, the communication part is controlled and the reading results are output by the Bluetooth (registered trademark). Further, the DSP 331 outputs sound to notify the completion of the proper reading from the buzzer 51 through the buzzer driver 511, and at the same time, operates the vibrator 27 through the motor driver 271. Furthermore, the DSP 331 controls to turn on the light in the indicator LED 21 through the indicator driver 211 and notify the completion of the reading or the progress of various processes to the user through the indicator case 22. The indicators 22 will be described in detail later.

Figure 12:
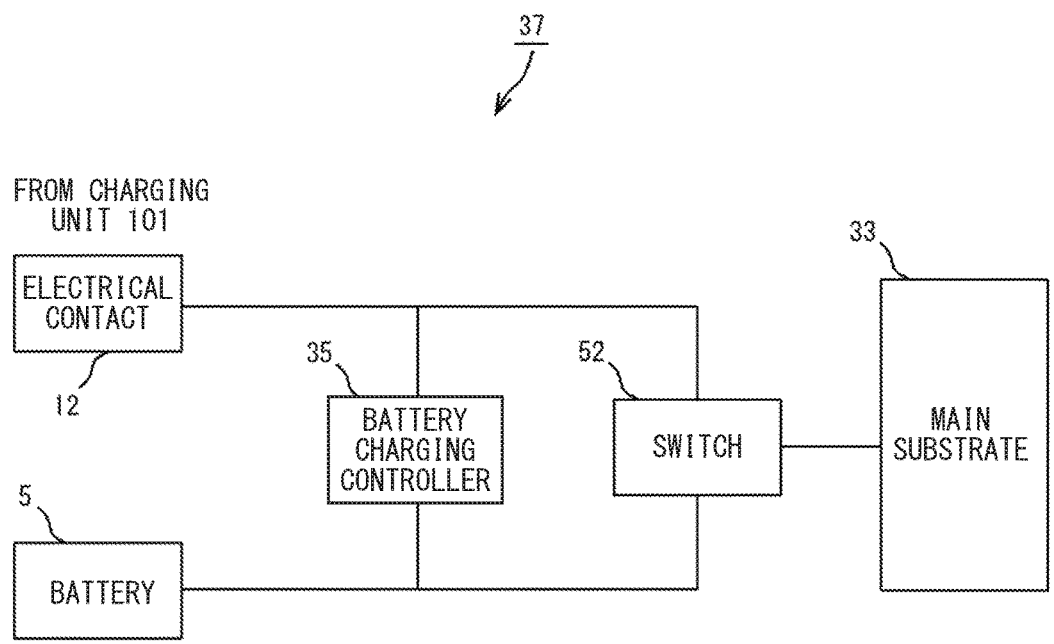
FIG. 12 is a block diagram showing a hardware structure for supplying power to a main substrate in a power source substrate.

FIG. 12 is a block diagram showing a hardware structure for supplying power to the main substrate 33 in the power source substrate 37. A predetermined voltage is applied to a system which supplies power from the charging unit 101 connected to an AC adapter through the electrical contact 12, and a predetermined voltage is applied to a system which supplies power from the battery 5. In the power source substrate 37, the switch 52 and the battery charging controller 35 are connected in parallel, so that it is possible to charge the battery 5 through the battery charging controller 35, or it is possible to supply power to the main substrate 33 through the switch 52. When the charging unit 101 connects to the handy scanner 1 and the battery 5 is stored in the handy scanner 1, that is, when both of them are connected, normally, the power is supplied to the main substrate 33 from the charging unit 101. In this case, when the voltage of the battery 5 is lower than the predetermined voltage, the battery 5 is charged.

Further, when the charging unit 101 is not connected to the handy scanner 1, the power is supplied from the battery 5. When the battery 5 is not stored in the handy scanner 1, the power is supplied from the charging unit 101.

(Structure of Indicators 22)

Figure 13:
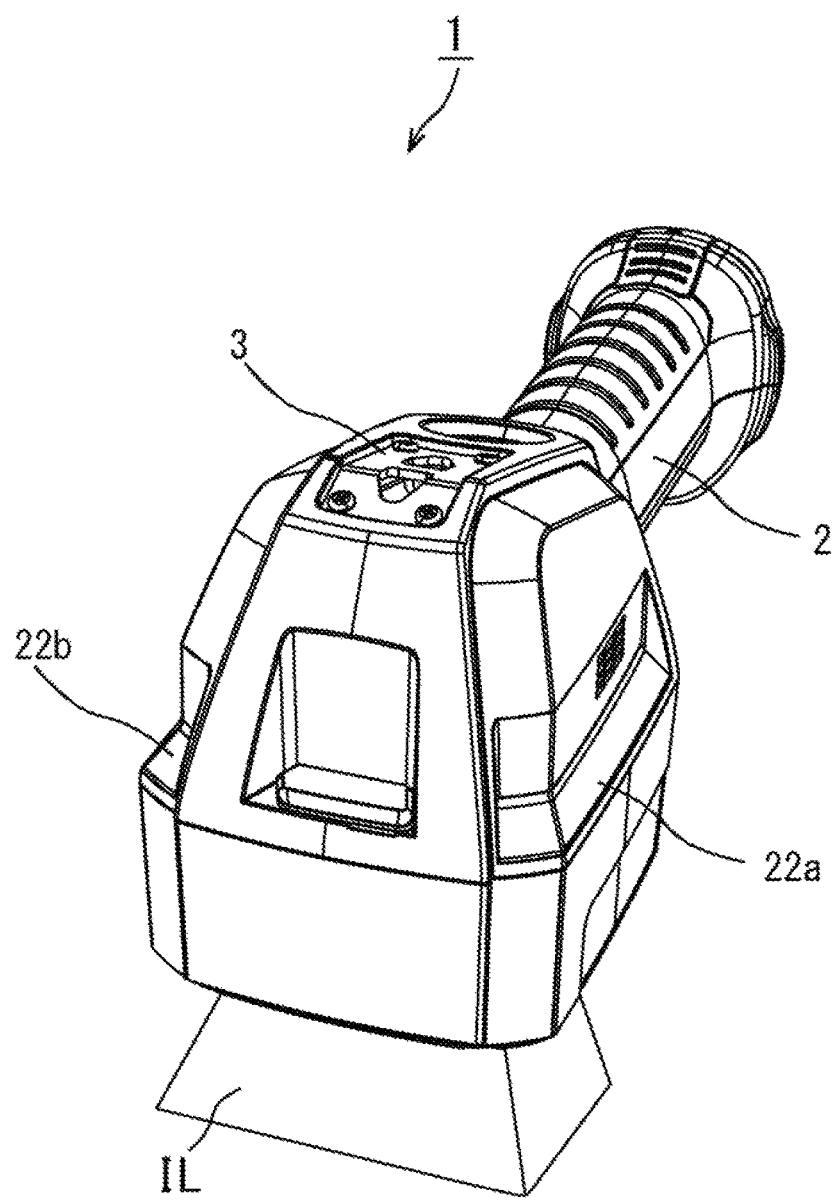
FIG. 13 is a schematic view showing a structure of indicators of the handy scanner.
Figure 14:
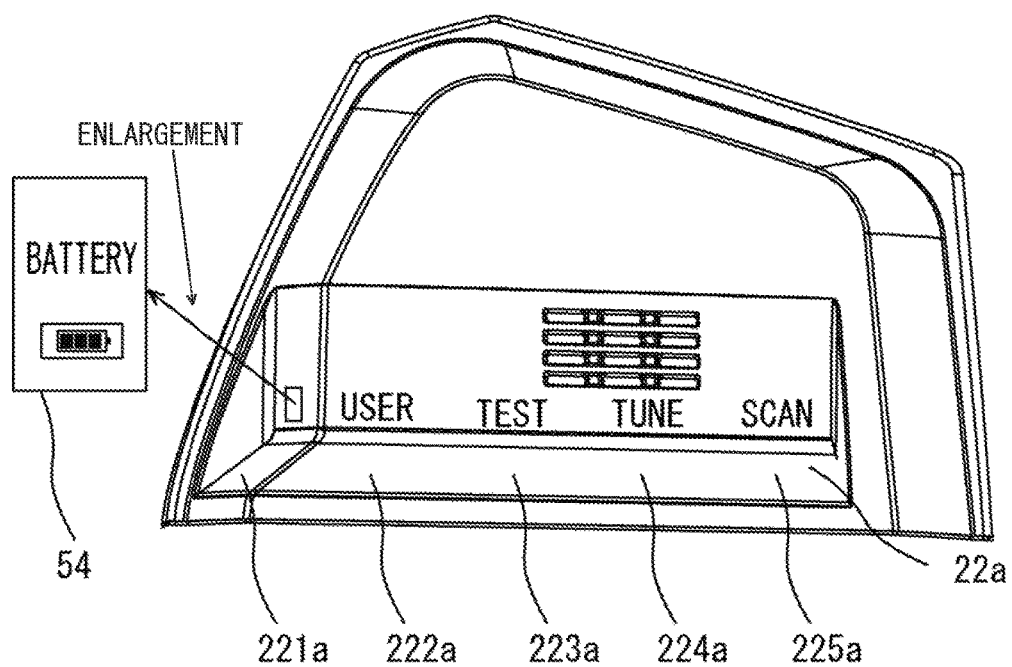
FIG. 14 is a right side view showing a head part of the handy scanner.

As described above, in many cases, when the user performs reading operation by the handy scanner, the user's vision is directed toward the bar code itself attached in the products or the packing boxes. Therefore, as the conventional handy scanner, the indicator arranged in a position farther from ahead of a user's vision is still lack of visibility. In the present embodiment, as shown in FIG. 13, the handy scanner 1 is provided with an indicator 22a (corresponding to one example of "first display part" in the scope of the claims) and an indicator 22b (corresponding to one example of "second display part" in the scope of the claims) on the right side surface and the left side surface of the head part 3 for displaying reading results, etc. Further, FIG. 14 is a right side view of the head part 3. As shown in these drawings, an indicator 221a is provided in a manner of extending from the plane surface to the right side surface. Similarly, an indicator 221b is provided in a manner of extending from the plane surface to the left side surface. In other words, the indicator 221a is provided in the right side of the plane surface, and similarly, the indicator 221b is provided in the left side of the plane surface. With this, in this embodiment, the indicators 22 are provided in all three surfaces of plane surface, right side surface, and the left side surface.

Figure 15A:
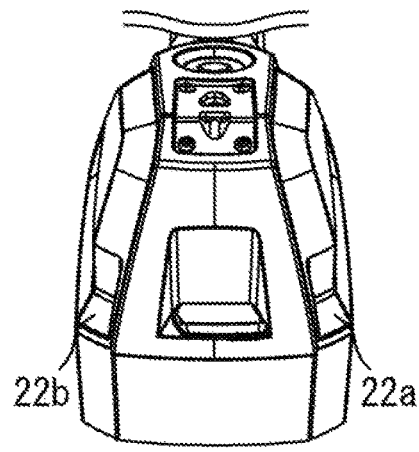
FIG. 15A is a diagram showing the indicators arranged on both side surfaces and the front surface of the handy scanner.
Figure 15B:
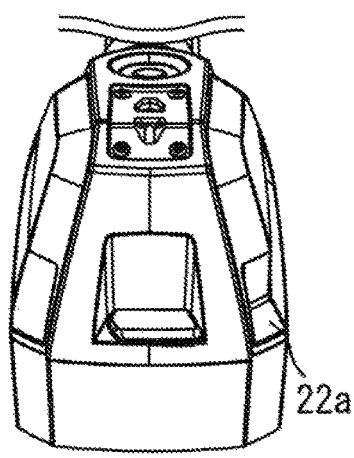
FIG. 15B is a diagram showing the indicators arranged on the right side surface part and the front surface of the handy scanner.
Figure 15C:
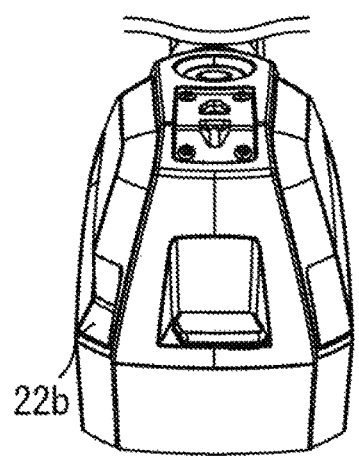
FIG. 15C is a diagram showing the indicators arranged on the left side surface part and the front surface of the handy scanner.

Other than this embodiment, for example, it may be considered that the indicators 22 are provided in two surfaces within the three surfaces of the plane surface, the right surface, and the left surface. FIG. 15A shows the head part 3 in which the indicator 22a and the indicator 22b, which are the same example as shown FIG. 13, are provided; FIG. 15B shows the head part 3 in which the indicator 22a is provided in only right side surface; and FIG. 15C shows the head part 3 in which the indicator 22b is provided in only left side surface. In the handy scanner 2 shown in FIGS. 15B and 15C, the indicators 22 are provided in two surfaces such as the right side surface and the plane surface, or the left side surface and the plane surface. With this, in the head part 3, by providing the indicators 22 in at least two of the three surfaces, it may increase the possibility that the user's vision is directed toward the indicators 22 so as to improve the visibility of the indicators 22.

Further, in the vicinity of the reading port 4, the indicators 22 extend along a circumference direction. The user's vision usually is directed toward a bar code at the time of the reading operation. However, the indicators 22 are provided in the vicinity of the reading port 4 which becomes the closest part to the bar code at the time of the reading operation, so that the visibility further improves. By extending the indicators 22 to the bar-shape along the circumference direction, specifically, in a case in which the side surface of the head part has a round shape in a circumference direction of the reading port, the viewing angle of the indicators widens.

Furthermore, in the indicators 22, rectangular-shaped display elements 222 to 225 with the same shape and the same size are continuously provided in a manner in which the longitudinal direction becomes a circumference direction, and in the portion extending to the plane surface and the side surfaces, as shown in FIG. 14, a display element 221 which is different shape from the display element 222 is continuously provided to the display element 222. In the display elements 222 to 225, when various modes described later are selected, the light in the display elements corresponding to a selected mode is turned on. The reference numeral including "a" denotes the member related to the indicator positioned in the right side surface, and the reference numeral including "b" denotes the member related to the indicator positioned in the left side surface. When it is not limited to any of those conditions, the reference numeral including "a" or "b" is not shown.

In these display elements 221 to 225, it is possible to perform non-synchronization display which display independently in the respective display elements or synchronization display which display integrally in the respective display elements. With this, it becomes capable of displaying variety of operations or states of the handy scanner 1. For example, in the non-synchronization display, the respective display elements display a selected mode, or for example, in a case in which the length of a bar corresponds to the progress of the operations, the light of the respective display elements is turned on to show the bar longer when the completion of the operation is getting closer. In the synchronization display, for example, when the reading is completed, the green color light in the indicators is turned on at the same time, and by notifying the same information in multiple directions, it can improve the visibility. As described above, the embodiments in which the indicators have multiple functions will be described later. In the side surface, in the upper part of these display elements 221 to 225, as shown in FIG. 14, various modes of "SCAN", "TUNE", "TEST", "USER" are shown from the right side of the drawing, and the display elements 222 to 225 correspond to the modes, respectively. Further, as shown in the enlarged display part in FIG. 14, a battery remaining amount display 54 showing a remaining amount of the battery 5 is provided in the plane surface side of the side surface, and for example, a battery icon is displayed in the liquid crystal display to show the remaining of the battery.

Figure 16:
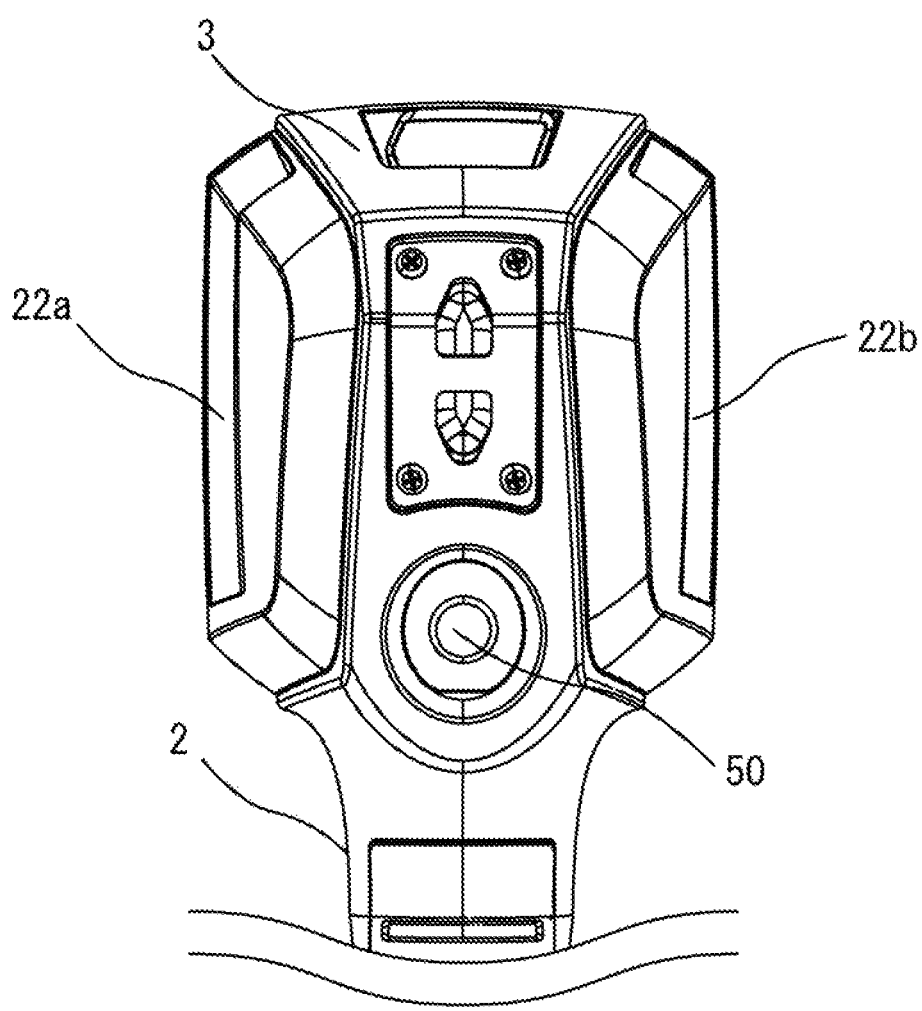
FIG. 16 is a rear view of the head part of the handy scanner.

Further, as shown in FIGS. 13 and 14, the head part 3 has an approximate truncated pyramid-shape expanding outwardly toward the reading port 4, and the indicators 22 themselves also have an inclination expanding outwardly toward the reading port 4, so that as shown in FIG. 16, when the user views the head part 3 from the rear side, the indicators 22 can be viewed.

Figure 17:
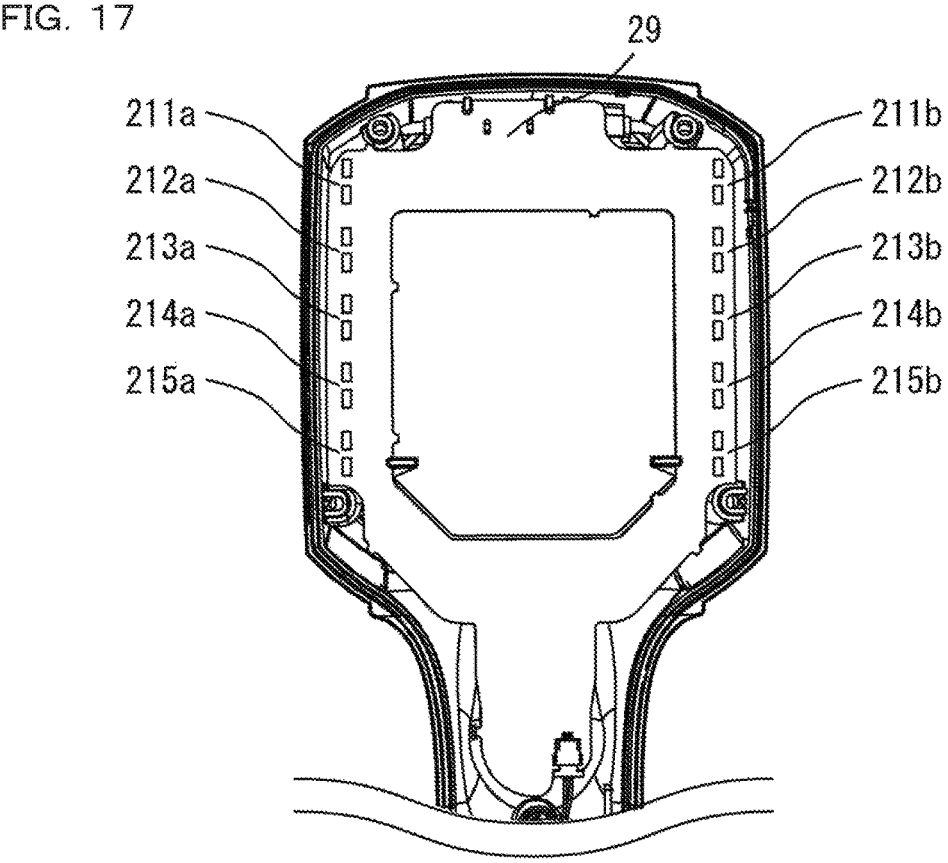
FIG. 17 is a schematic view showing an illumination substrate before mounting indicator lenses.
Figure 18:
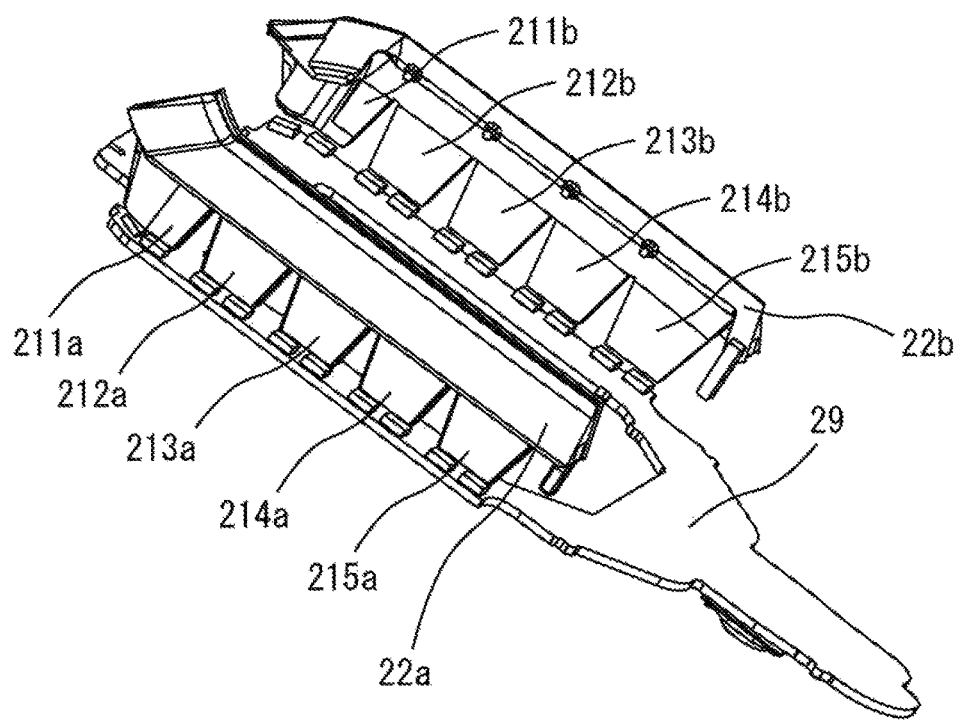
FIG. 18 is a schematic view showing indicator lenses.
Figure 19:
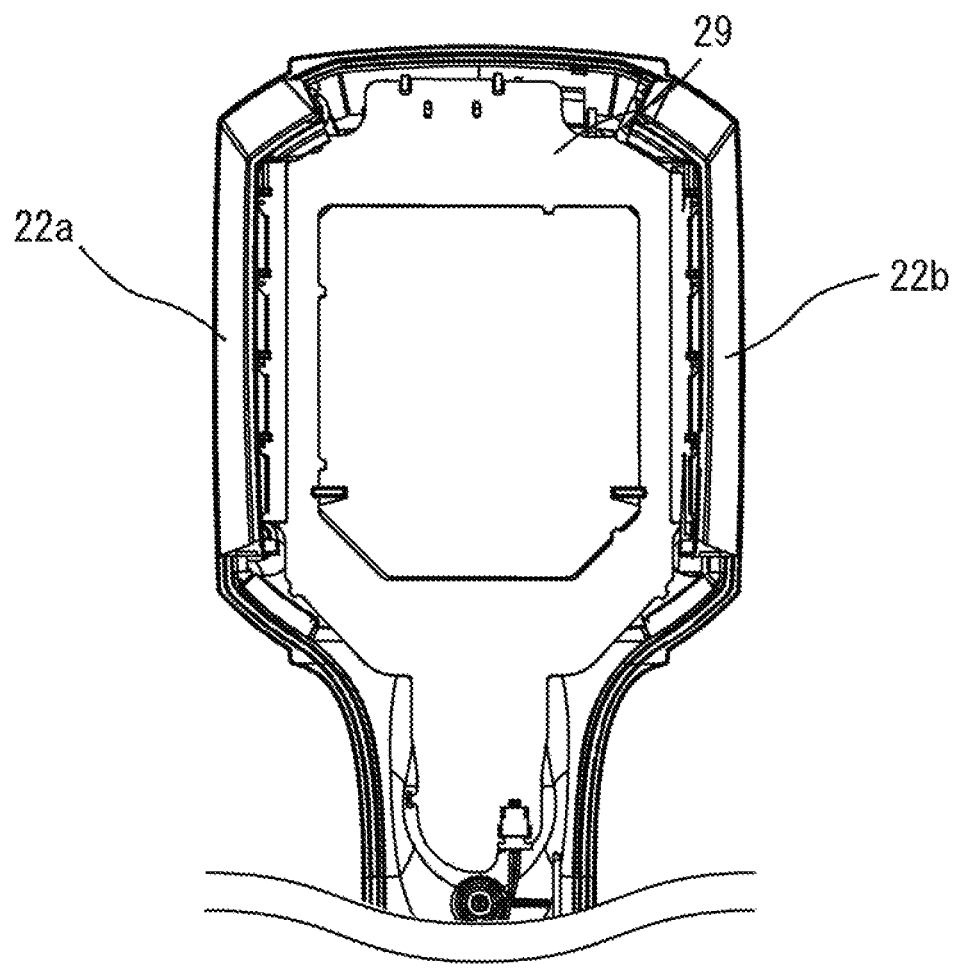
FIG. 19 is a schematic view showing the illumination substrate after mounting the indicator lenses.

Next, the inside structure of the indicators 22 will be described in reference to FIGS. 17 to 19. FIG. 17 is a schematic view showing an illumination substrate 29 before mounting the indicator lenses 22. FIG. 18 is a schematic view showing the indicator lenses 22. FIG. 19 is a schematic view showing the illumination substrate 29 after mounting the indicator lenses 22. As shown in FIG. 17, in the illumination substrate 29, the indicator LEDs 211 to 215 are arranged on the both sides. In the present embodiment, the LEDs are used, but it is not limited to this, and liquid crystals or organic ELs, etc. may be used as long as maintaining the structure in a manner of lining the display elements.

Further, as shown in FIG. 18, the indicator lenses 22 are configured with the indicator lens 22a on the right side and the indicator lens 22b on the left side. Each of the indicator lens 22a and the indicator lens 22b is provided with the members corresponding to the display elements 221a to 225a and the display elements 221b to 225b, respectively.

As shown in FIG. 19, when the indicator lenses 22 are mounted to the illumination substrate 29 and the light of the display elements is turned on, for example, the display elements are formed by a diffusion member, it illuminates over the entire surface of the display elements.

(Block Lighting)

Figure 20:
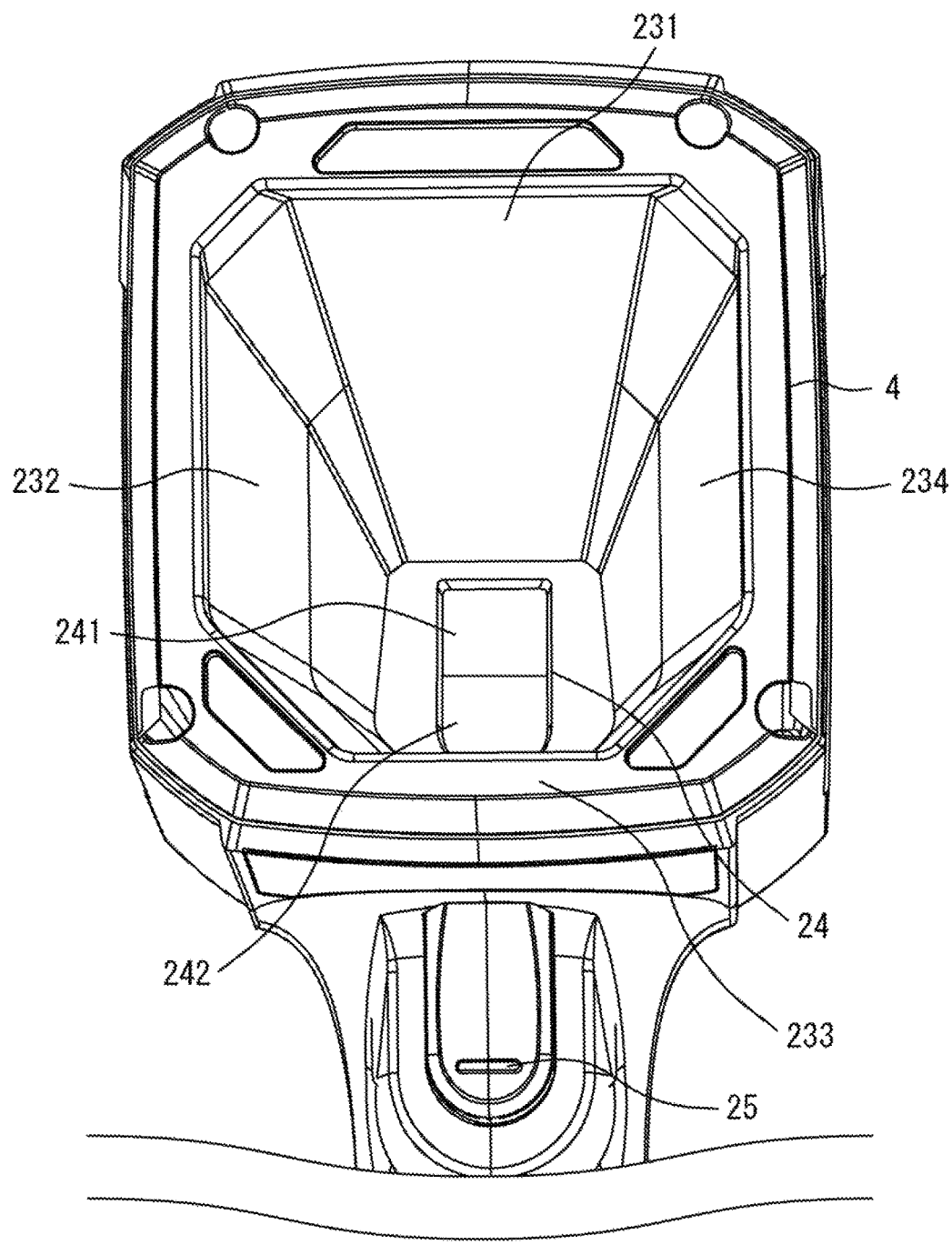
FIG. 20 is a front view showing the head part of the handy scanner.

As one of the procedures to read a bar code having high obfuscation, there is a block lighting which turns on the illumination light per block unit. FIG. 20 is a front view of a head part of the handy scanner 3. By the block lighting, as shown in the drawing, the diffusion plate 23 (corresponding to one example of "diffusion member" in the scope of the claims) is divided into an upper side surface 231, a left side surface 232, a lower side surface 233, and a right side surface 234, so as to arbitrarily turn on the respective lights per block. Therefore, by turning on the light in a specific block, the light can be applied to the bar code from a specific direction.

Figure 21:
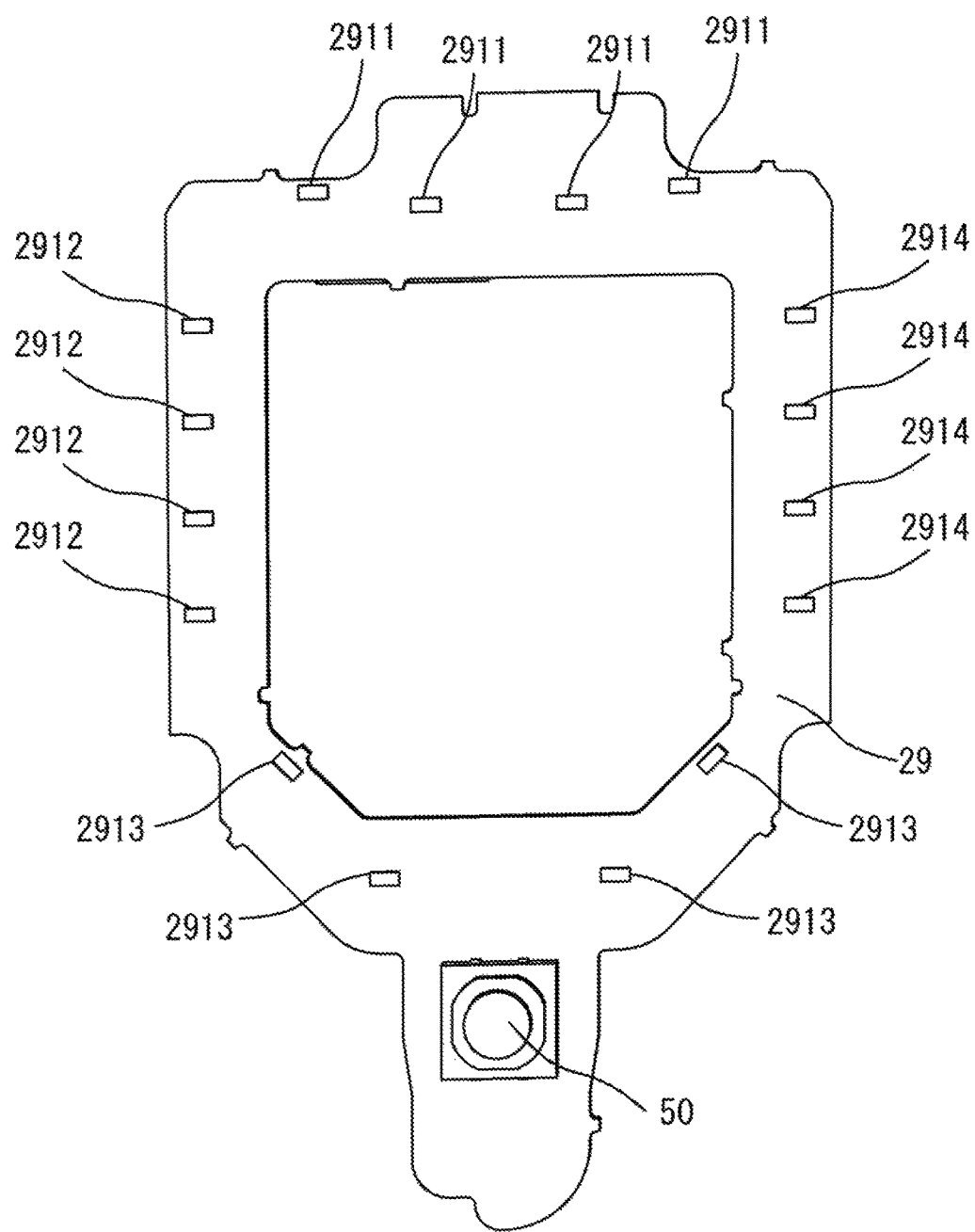
FIG. 21 is a schematic view showing the illumination substrate of the handy scanner.

FIG. 21 is a schematic view showing an illumination substrate 29 provided in the rear side of the diffusion plate 23. As shown in FIG. 21, in the illumination substrate 29, a LED illumination 2911, a LED illumination 2912, LED illumination 2913, a LED illumination 2914 are arranged so as to correspond respectively to the upper side surface 231, the left side surface 232, the lower side surface 233, and the right side surface 234. For example, four blue LEDs emitting blue light are respectively arranged in the LED illuminations 2911 to 2914 on the illumination substrate 29. The light emission angle of these LEDs is approximately 120 degrees, and the LED illumination light IL emits in a broad-shape. The lights are diffused when the LED illumination lights IL apply to the diffusion plate 23 so as to become uniform diffusion light. The diffusion plate 23 in detail will be described later.

One of the roles of the block lighting is to change a zenithal angle of the illumination light. For example, by performing block lighting in the lower side surface 233 which is approximately parallel to the imaging axis, the diffusion light can obliquely emit to the bar code, and by performing block lighting in the upper side surface 231 which is step-by-step or gradually released, the diffusion light can emit to the bar code in the direction which is close to the vertical direction.

The following is an advantage that allows to change the zenithal angle of the illumination. For example, in a case in which a bar code is marked by scratching as the DPM (direct part marking), and in a case in which the surrounding of the bar code is rough surface such as pear-skin (crepe-like asperity) or casting surface, when the diffusion light is obliquely applied, the light irregularly reflects on the rough surface, so that the bar code is appropriately read by receiving the reflecting light at the marked portion. On the other hand, in a case in which the incident light is easily reflected on a mirror surface around the bar code, the bar code is easily read by applying the diffusion light in the direction which is close to the vertical direction. That is, when the reading performance of the bar code changes depending on the zenithal angle of the illumination light, an excellent readability can be obtained by selecting an appropriate zenithal angle.

Further, another role of the block lighting is to change an azimuthal angle of the illumination light. For example, the upper side surface 231, the lower side surface 233, the left side surface 232, and the right side surface 234 are respectively arranged in up and down and right and left with respect to the imaging axis, so that by emitting them in a block unit, the diffusion light can be emitted to the bar code by changing the azimuthal angle.

The following is an advantage that allows to change an azimuthal angle of the illumination light. For example, to a hairline-shaped reading object marked by the DPM (direct part marking), there is a case in which the bar code cannot be appropriately read even though the illumination light is perpendicularly applied to the line direction of the hairline. On the contrary, there is a case in which the bar code can be read when the illumination light is applied in the line direction of the hairline. That is, when the readability of the bar code changes depending on an azimuthal angle of the illumination light, an excellent readability can be obtained by selecting an appropriate azimuthal angle.

(Structure of Diffusion Member)

Figure 22:
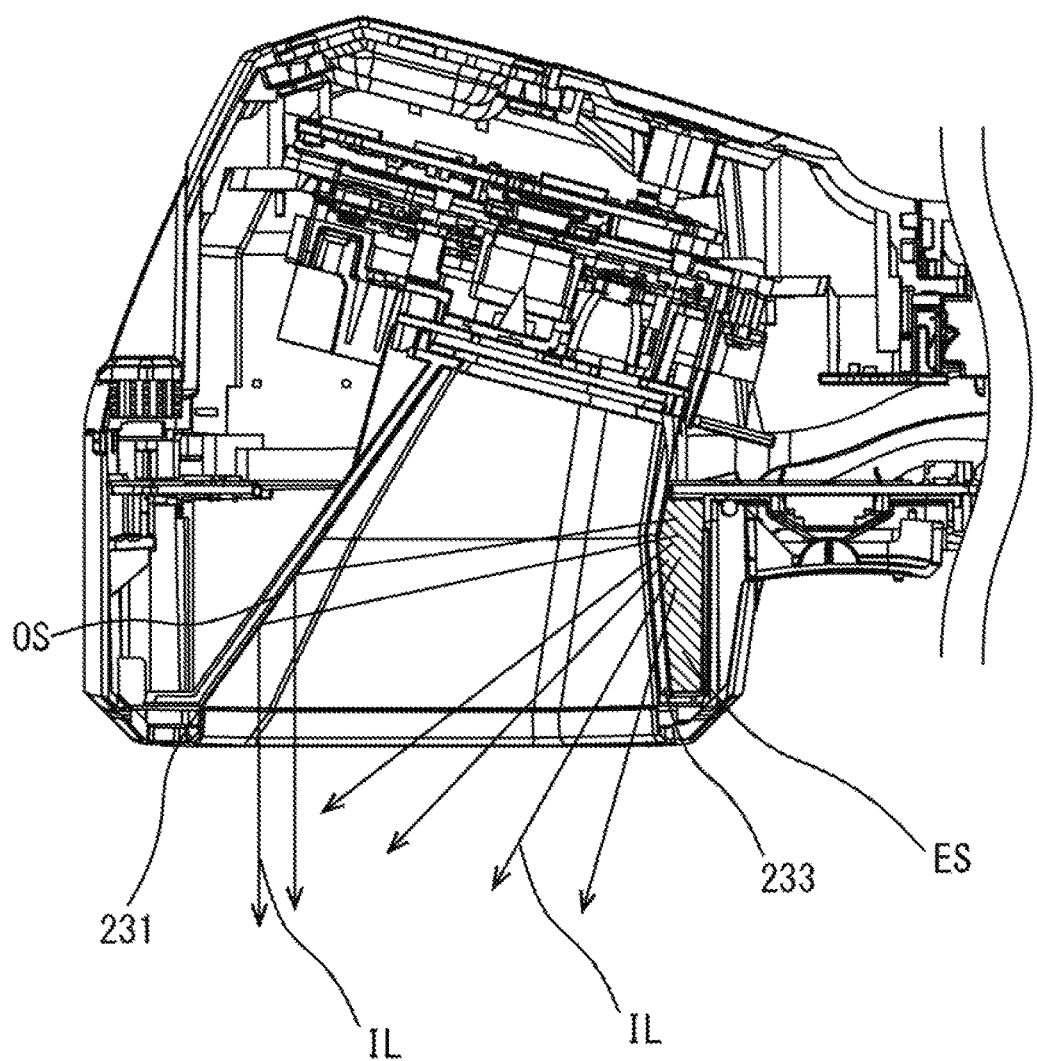
FIG. 22 is an explanatory diagram showing an optical path when a diffusion plate does not transmit light.
Figure 23:
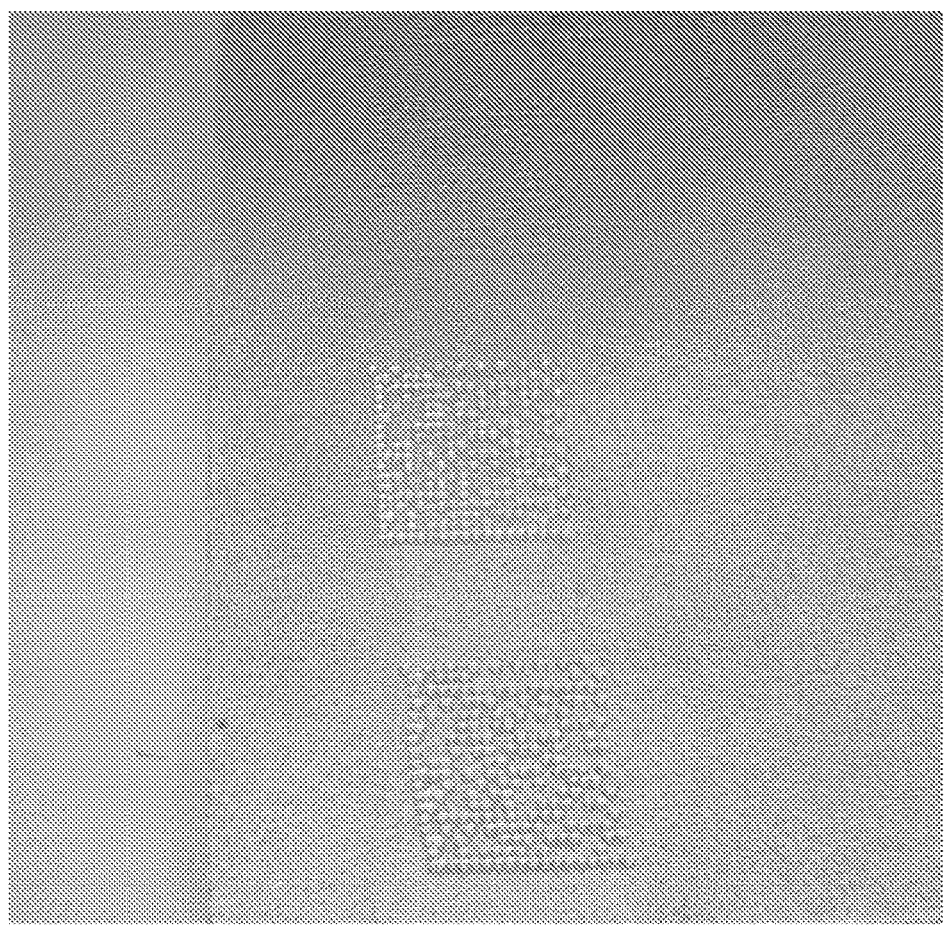
FIG. 23 is a digital image captured under an illumination environment when the diffusion plate does not transmit light.

The case in which the block lighting is performed by turning on the LED illumination 291 from the rear side of the diffusion plate 23 is considered. For example, as shown in FIG. 22, when the block lighting is performed in the lower side surface 233, the LED illumination light emitted from the LED illumination 2913 irregularly reflects when the light transmits through the lower side surface 233 of the diffusion plate 23 so that the luminance of the diffusion light becomes uniform. In this drawing, the lower side surface 233 becomes a light emitting surface ES, and the upper side surface 231 which faces to the lower side surface 233 corresponds to an opposing surface OS. The diffusion light from the light emitting surface ES directly applies to a bar code, and an excellent reading can be performed if the reflecting light is received to capture an image. However, as shown in FIG. 22, a part of the diffusion light applies to the opposing surface OS. When the light reflected at the opposing surface OS applies to the bar code, even though the contrast increases by applying the diffusion light in a specific direction by the block lighting, the contrast of the bar code becomes lowered as shown in FIG. 23 because the reflecting light from the opposing surface OS is affected.

Figure 24:
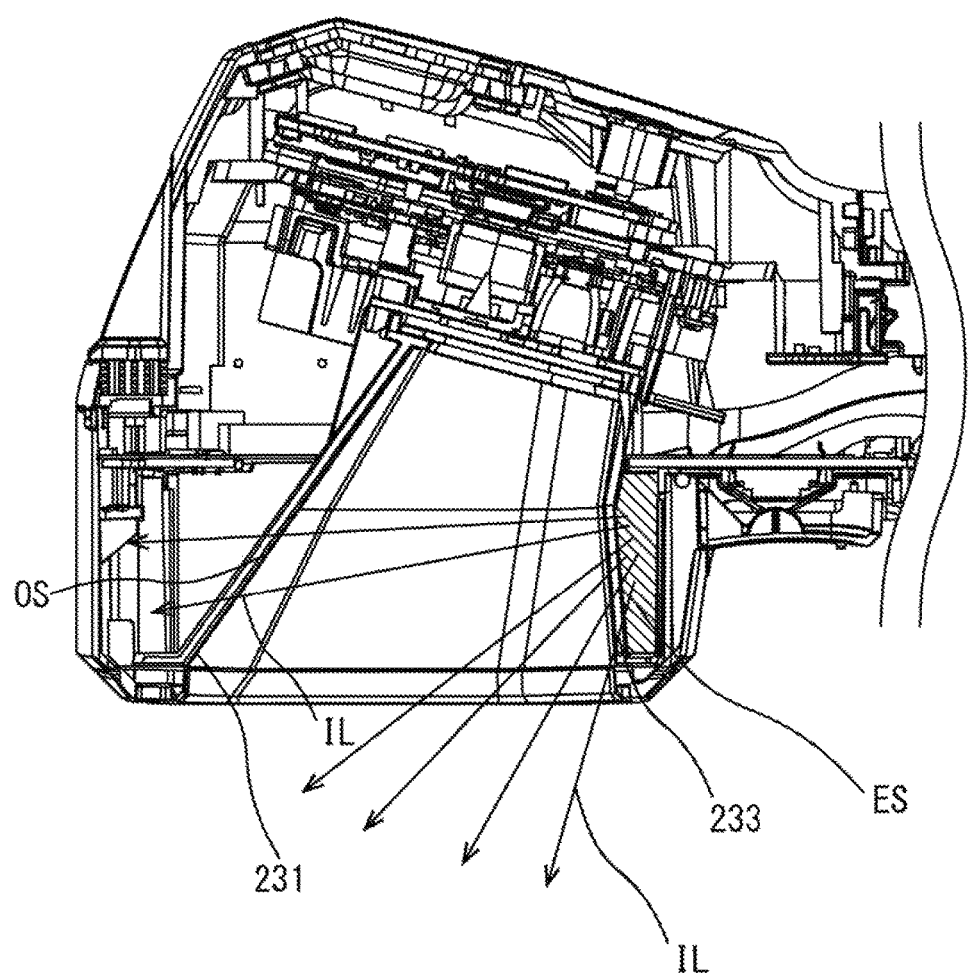
FIG. 24 is an explanatory diagram showing an optical path when a diffusion plate transmits light.
Figure 25:
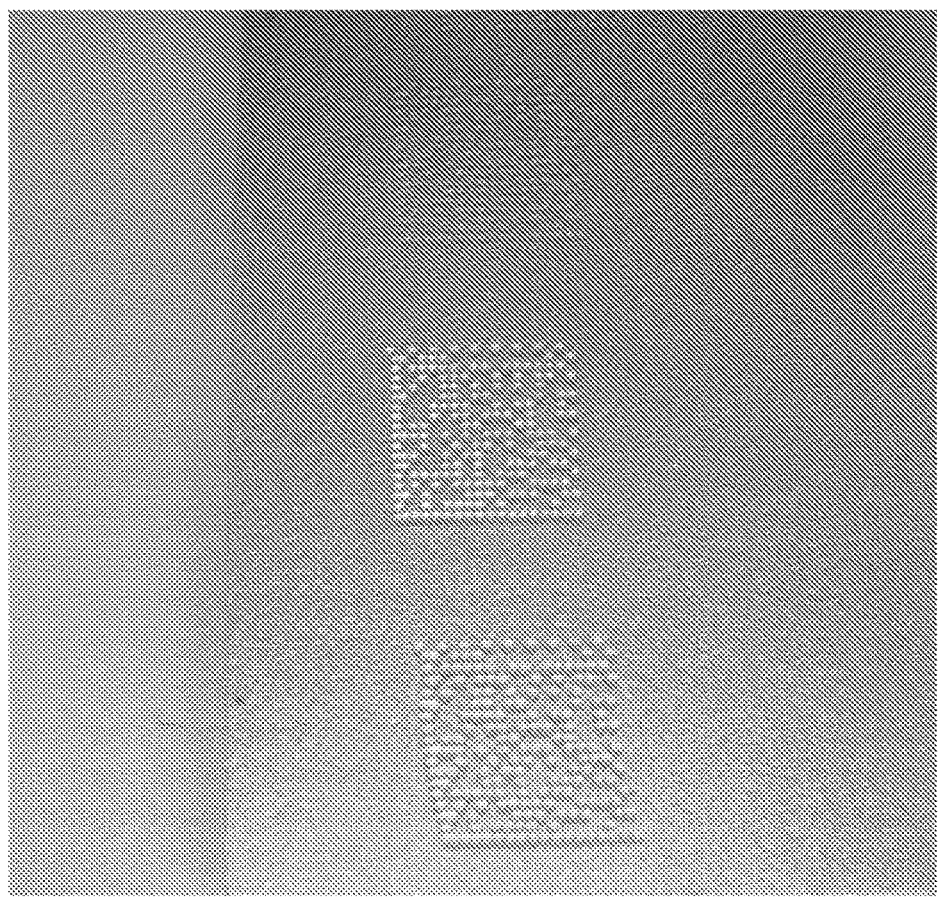
FIG. 25 is a digital image captured under an illumination environment when the diffusion plate transmits light.

On the contrary, if the reflection in the opposing surface OS can be suppressed, the diffusion light from the opposing surface OS to the bar code is reduced so as to prevent the reduction of the contrast. As the method for suppressing the reflection in the opposing surface OS, as shown in FIG. 24, the diffusion light directly transmits through the opposing surface OS from the light emitting surface ES, the transmittance of the opposing surface OS can increase, for example, equal to or more than 70% in order to transmit the light through the opposing surface OS. As a result, the diffusion light from the opposing surface OS to the bar code can be reduced, and as shown in FIG. 25, the contrast of the bar code can increase.

On the other hand, it is preferable that the transmittance of the light emitting surface ES keeps equal to or less than 90% in order to emit at least the diffusion light because of the following reasons. In the diffusion plate 23, a granular diffusion material is mixed in the transparent resin so as to scatter the incident LED illumination light by the diffusion material, and therefore, the luminance of the diffusion light can be uniform. However, the amount of the diffusion material needs to be reduced in order to increase the transmittance because the diffusion light with sufficient uniform luminance cannot be emitted.

Figure 26:
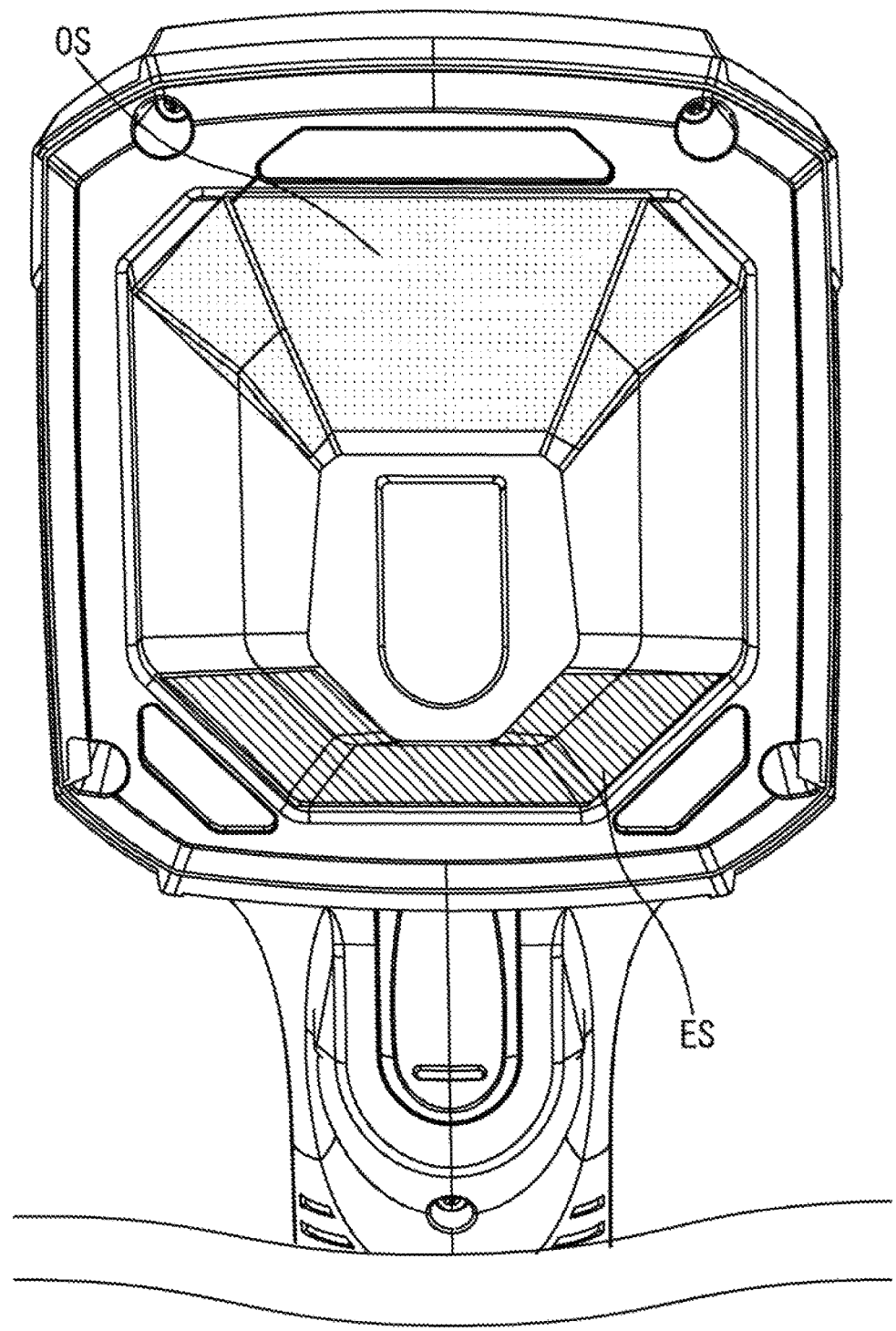
FIG. 26 is an explanatory diagram showing a part where a material having high transmittance is used in the diffusion plate.
Figure 27:
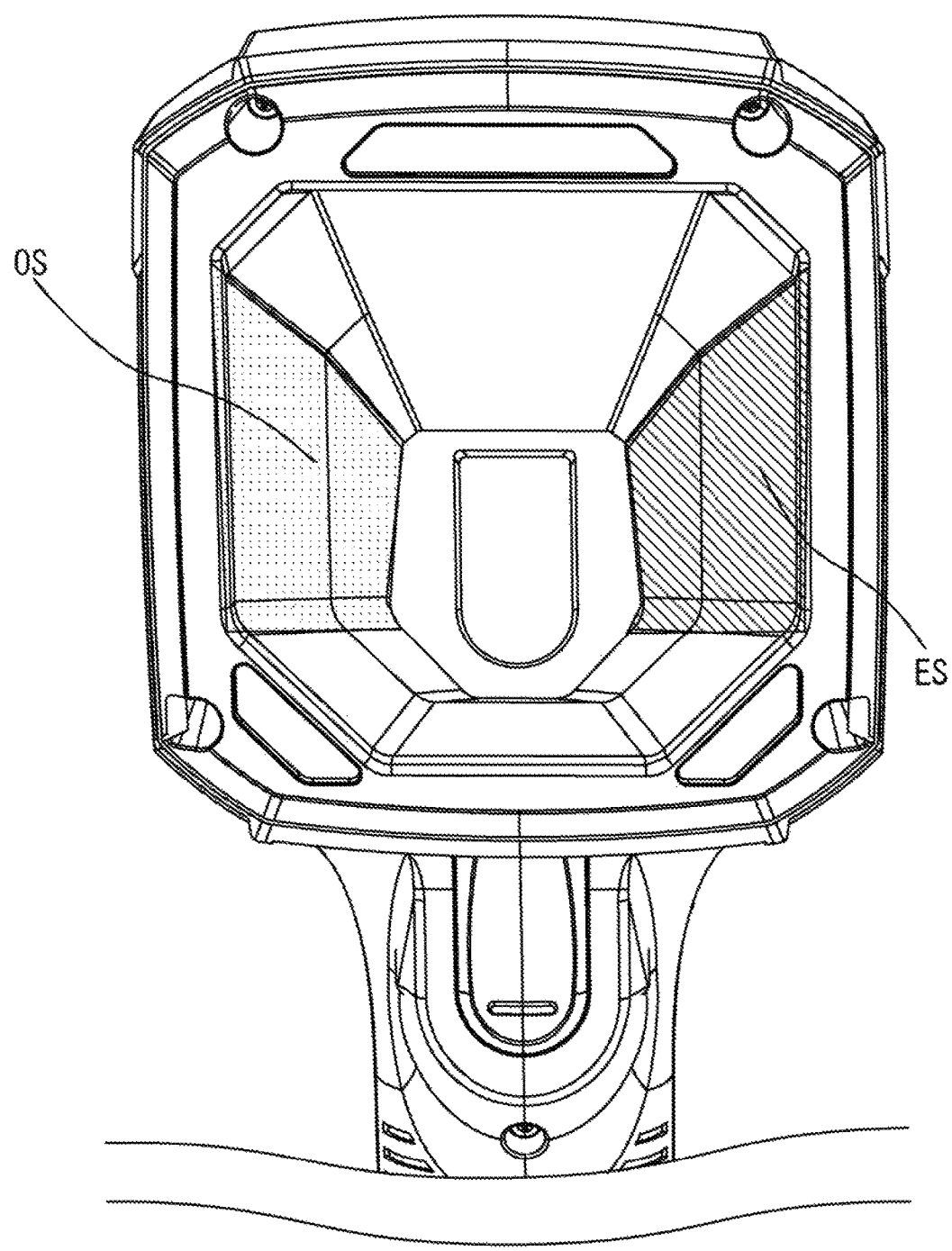
FIG. 27 is an explanatory diagram showing a part where a material having high transmittance is used in the diffusion plate.

In the present embodiment, by performing block lighting, the diffusion plate 23 has both roles of the light emitting surface ES and the opposing surface OS. As shown in FIG. 26, there are two cases in which the lower side of the head part is the light emitting surface ES and the upper side of the head part is the opposing surface OS, or the upper side of the head part is the light emitting surface ES and the lower side of the head part is the opposing surface OS. Further, as shown in FIG. 27, there are two cases in which the right side of the head part is the light emitting surface ES and the left side of the head part is the opposing surface OS, or the left side of the head part is the light emitting surface ES and the right side of the head part is the opposing surface OS. Therefore, the transmittance of the diffusion plate 23 is uniformly set equal to or more than 70% and equal to or less than 90%. With this, the transmittance in any of the light emitting surface ES or the opposing surface OS satisfies from 70% to 90%, and further, the diffusion plate 23 can be made of a single material.

On the other hand, for example, when the opposing surface OS is not configured with the diffusion plate, it may be configured with a member which transmits all illumination light emitted from the light emitting surface ES or a member which completely absorbs illumination light emitted from the light emitting surface ES. (Combination structure of diffusion illumination and polarized illumination)

The polarized illumination shuts out light other than the light polarizing in a specific direction in the polarizing element for light projection, and by shutting out the light other than the light polarizing in a specific direction in which the phase of the polarizing element for light projection differs from the phase of the polarizing element for light reception by 90 degrees, it is the illumination which transmits the light polarized in both of the polarizing elements, and therefore, when a single polarizing element exists, the light amount becomes half, but there exists two polarizing elements, so that the light amount becomes quarter of the luminance amount. Therefore, conventionally, when both of the diffused illumination and the polarized illumination are used in an image processing device, the light sources, which can increase light amount, such as light sources arranged annularly are used in the polarized illumination, and further, in a case in which an image is captured under the diffused illumination, when the polarizing element for light reception exists, the light amount becomes half of the luminance amount, so that it is preferable that an image is captured by using a separate optical path for the diffused illumination and the polarized illumination. Therefore, the diffused illumination and the polarized illumination are configured in different element, and there was a problem that the device provided with these elements became large.

When the combination of the diffused illumination and the polarized illumination are realized in the handy scanner, due to the nature of the handy scanner, it is necessary to be miniaturized. In order to use the combination of the diffused illumination and the polarized illumination while miniaturizing the head part, in the present embodiment, first, an opening for light emission of the polarized illumination is provided on the end surface (rear surface) of the truncated square pyramid-shaped diffusion plate 23, and in the vicinity of that, an opening for light reception of the polarized light is provided. Further, the diffused illumination is performed in the upper side surface part 231 to the right side surface part 234 which are the side surfaces of the truncated square pyramid shaped diffusion plate 23, and an optical path to the imaging part 41 is partially and commonly used for the diffused illumination and the polarized illumination. With this, the light reception polarizing element 241 also exists in the diffused illumination. However, LED illuminations 2411 to 2415 which are high-output to the light source can be employed, and the light amount problem is solved and there is also an advantage in which an image can be captured by a single imaging part 41, so that the miniaturization of the head part 3 is realized.

(Example of a Case in which the Formation of the Head Part 3 and the Diffusion Plate 23 is a Dome-Shape)

A shape of the head part 3 of the handy scanner 1 may be formed in a dome-shape as described above. In this case, for example, the following embodiments may be considered.

First, similar to the diffusion plate 23, it may be formed in a dome-shape. The diffusion plate 23 is not limited to the diffusion member, and here, it is called as a dome-shaped member. In other words, the dome-shaped member may be transparent, translucent, or opaque. The head part 3 stores a reading part 41 and the dome-shaped member, and has side surfaces in which the diameter progressively or gradually becomes larger from the rear side to the front side.

The dome-shaped member is provided with a sidewall surface in which the diameter progressively or gradually becomes larger as it becomes forwardly away from the reading port 4. An opening for receiving light (corresponding to one example of "first opening" in the scope of the claims) is formed in a manner in which a reading optical axis of the reading part 41 is positioned (passes) in the bottom surface facing to the reading part 41 which is in front of the reading part 41, and an opening (corresponding to one example of "second opening" in the scope of the claims) facing to the reading port 4 is formed in the front end of the sidewall surface of the dome-shaped member. That is, in other words, regarding the dome-shaped member, when the diameter of the bottom surface where the first opening is formed and the diameter of the front end (opening end) of the sidewall surface where the second opening is formed are compared, the sidewall surface is formed, at least, in a manner in which the diameter of the front end of the sidewall surface becomes larger. Therefore, as shown in, for example, FIG. 10, etc., a projection may be provided outside the sidewall surface, or a part of the sidewall surface where the diameter becomes smaller as it becomes forwardly away from the reading port 4 may be included. The dome shape includes various shapes such as a cone shape, a polygonal pyramid shape, etc.

In this embodiment, in the handy scanner 1, the reading port 4 of the head part 3 is formed in a position facing to the opening formed in the front end of the dome-shaped member, and the holding part 2 is mounted to the side surface of the head part 3 in a manner of extending in a direction away from the reading optical axis of the reading part 41. Further, in the head part 3 of the handy scanner 1, the indicators 22 are formed in an elongated shape, and the direction along the circumference of the side surface is defined as a longitudinal direction, within the side surface of the head part 3 except the portion mounting the holding part 2. As described later, in a display part formed in an elongated shape, a plurality of display elements may be arranged in a line along a part around the reading optical axis of the reading part 41.

According to this embodiment, the indicators 22 can be provided on an inclined surface of the dome-shaped head part 3 where the dome-shaped member is stored, and therefore, it can enhance the visibility of the indicators 22.

(Basic Procedure of Reading Operation of the Heady Scanner 1)

Figure 28:
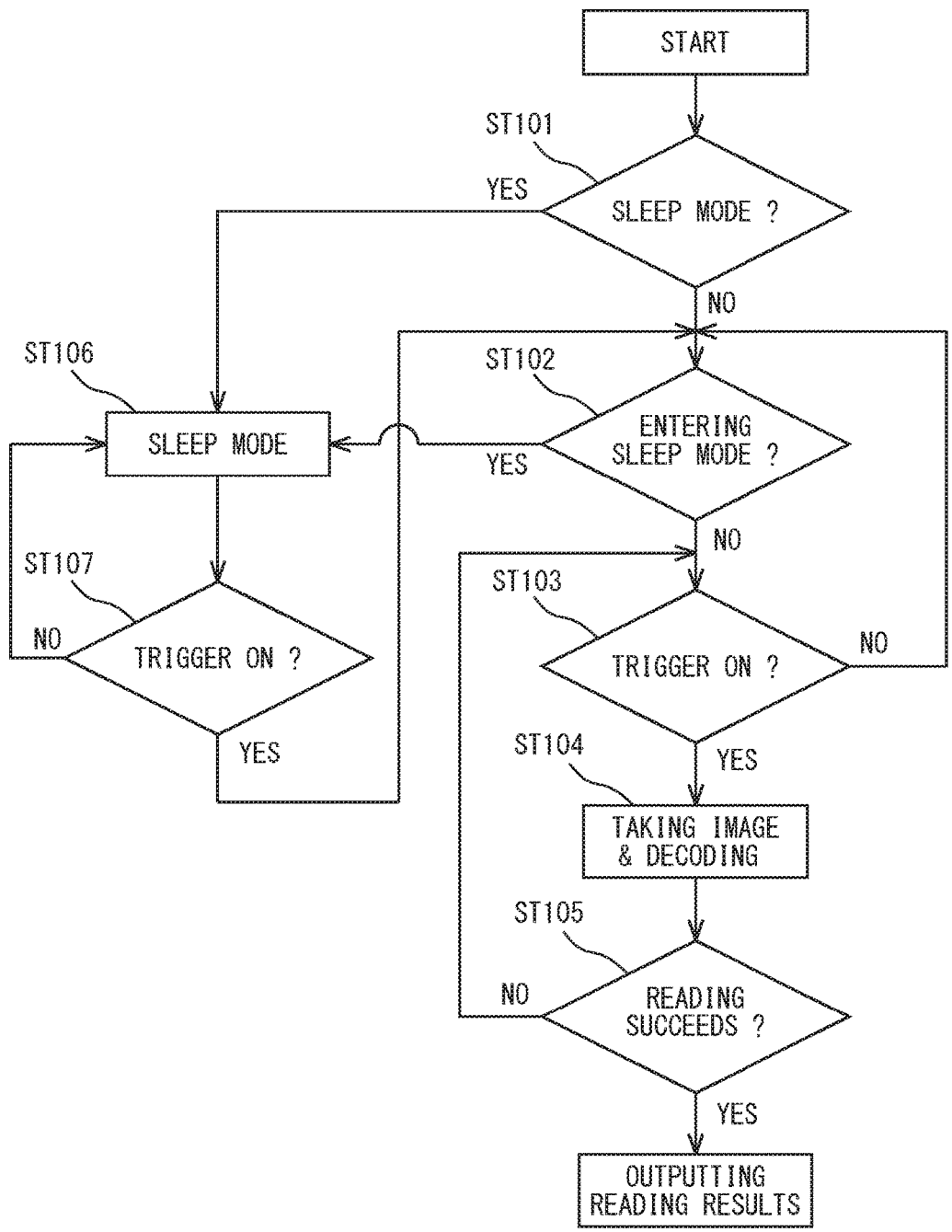
FIG. 28 is a flowchart showing procedures of a reading operation of a handy scanner.

Next, the procedure of the reading operation of the handy scanner 1 with such structure will be explained in reference to the flowchart of FIG. 28. First, in Step ST101, on the assumption that the handy scanner 1 is operated by the battery 5, currently, the determination whether or not the handy scanner 1 is in a sleep mode is performed. Here, the sleep mode means that when the handy scanner 1 is operated by the battery 5, this is the mode in which the handy scanner 1 is operated in a lower power consumption.

When it is not in the sleep mode, in Step ST102, the determination whether or not it becomes in the sleep mode is determined. Whether or not it becomes in the sleep mode is decided on the basis of time. The operation by the user is limited to press the trigger, so that when the set time in which the user does not press the trigger is elapsed, it becomes in the sleep mode. This set time can be set by the user. When the user does not press the trigger after the set time is elapsed, it becomes in the sleep mode.

When it does not become in the sleep mode in Step ST102, in Step ST103, the determination whether or not the trigger is pressed is determined. If the trigger is pressed, in Step ST104, an image is captured and the decoding processing is performed. When the image has been captured and the decoding has been performed, the determination whether or not the reading is proper is performed, and if the reading is not proper, it goes back to Step ST103. If the trigger is still pressed, it repeats Steps ST103 to ST105. In Step ST105, initially, when the reading is proper, it outputs the reading result.

In Step ST101, when it determines that the handy scanner is in the sleep mode, in Step ST107, the determination whether or not the trigger is pressed is performed. When the trigger is pressed, the operation of Step ST103 is executed. When the trigger is not pressed, it continues the sleep mode of Step ST106. That is, when the handy scanner 1 is in the sleep mode, there is a system in which it does not start until the trigger is pressed.

(Operation of the Indicators 22 in Various Modes)

Figure 29:
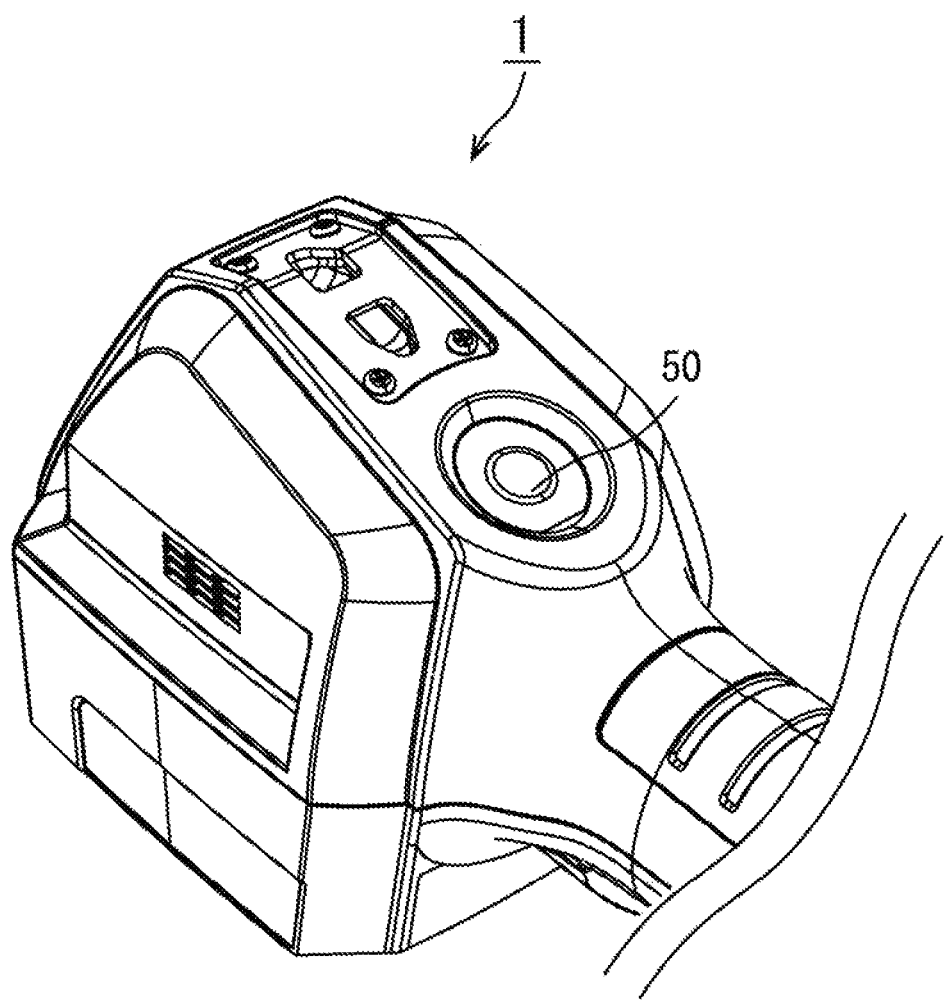
FIG. 29 is a perspective view showing the head part of the handy scanner.
Figure 30:
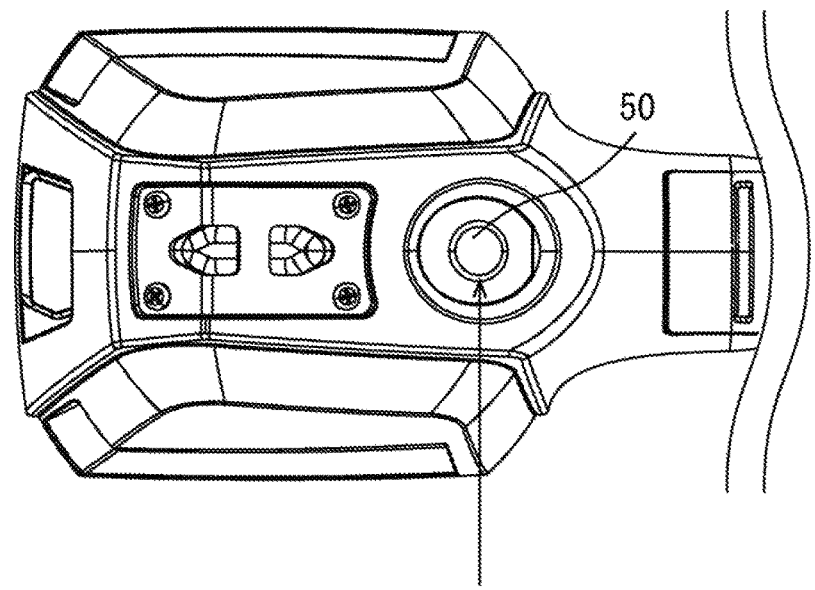
FIG. 30 is rear view showing the head part of the handy scanner.

FIG. 29 is a perspective view of the head part 3. FIG. 30 is a rear view of the head part 3. By pressing the function switch 50 as shown in the drawings, the handy scanner 1 switches to various modes. As shown in FIG. 14, the handy scanner 1 has four operation modes of a scan mode, a tune mode, a test mode, and a user mode ordered from the right side. The scan mode is the mode for regular reading operation. Further, the tune mode is the mode for optimizing the parameter when reading a bar code. Furthermore, the test mode is the mode for testing reading rate. Finally, the user mode is the mode for various operations and settings.

Figure 31:
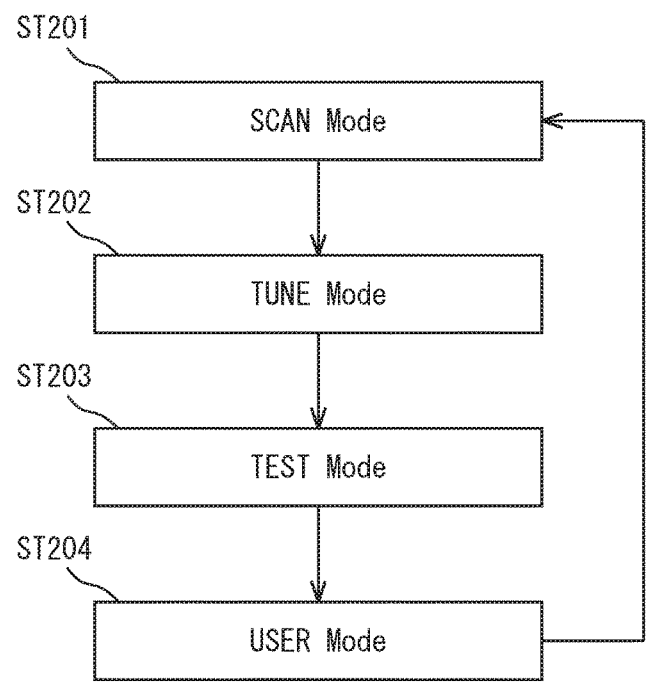
FIG. 31 is a flowchart showing procedures of a switching operation of operation modes when pressing a function switch.
Figure 32A:
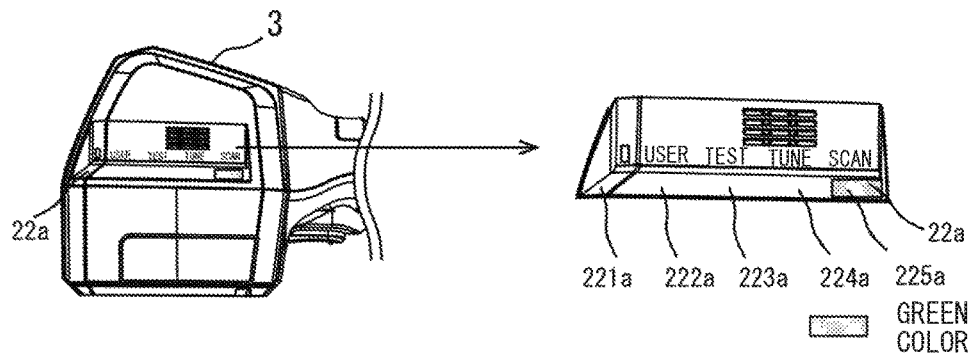
FIG. 32A is an explanatory diagram showing the switching operation of the operation modes, and shows when a scan mode is selected.
Figure 32B:
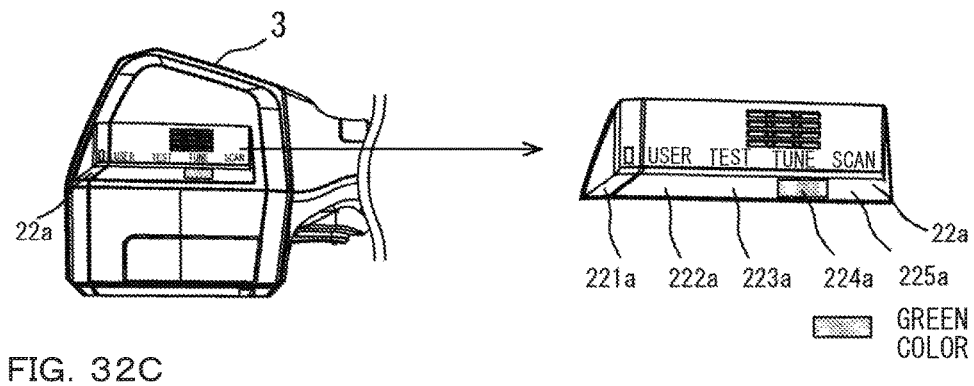
FIG. 32B is an explanatory diagram showing the switching operation of the operation modes, and shows when a tune mode is selected.
Figure 32C:
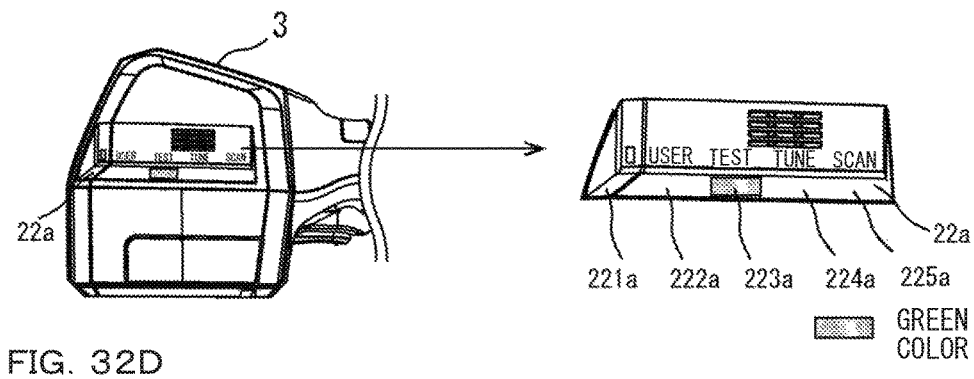
FIG. 32C is an explanatory diagram showing the switching operation of the operation modes, and shows when a test mode is selected.
Figure 32D:
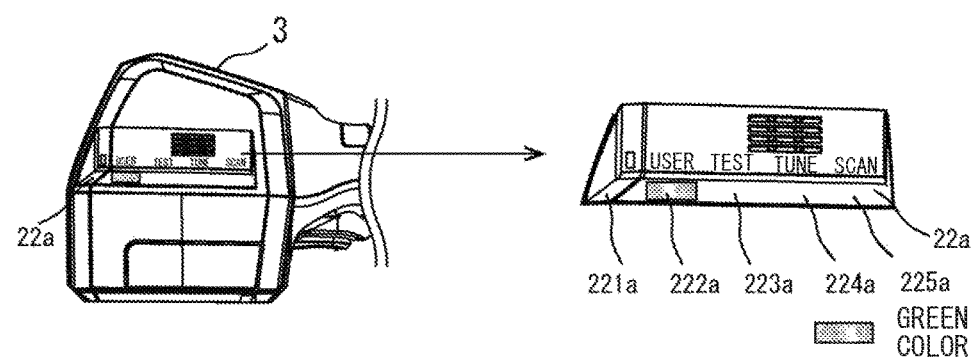
FIG. 32D is an explanatory diagram showing the switching operation of the operation modes, and shows when a user mode is selected.

The function switch 50 shown in FIG. 30 switches an operation mode in the procedure of the flowchart shown in FIG. 31 every time when the function switch is pressed. As shown in the drawing, the operation mode is switched in the order of the scan mode of Step ST201, the tune mode of Step ST202, the test mode of Step ST203, and the user mode of Step ST204, and when pressing the function switch at the time of the user mode, it returns to the scan mode and the procedure is repeatedly executed. Concretely, by switching the operation modes, as shown in FIGS. 32A to 32D, in the order of the figure numbers, the display element in which green color light is turned on is switched, and an operation mode of the handy scanner 1 is changed in response to an operation mode when the trigger switch 25 is pressed. Hereinafter, the operation of the indicators 22 in every operation mode will be described in detail.

(Scan Mode)

Figure 33A:
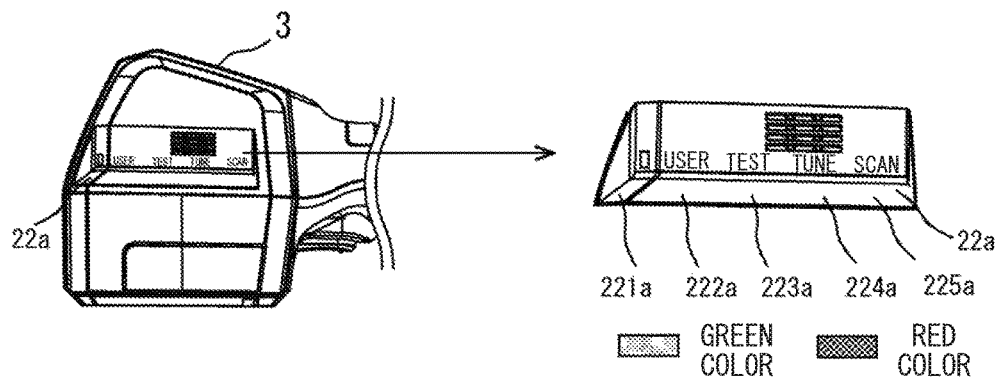
FIG. 33A is an explanatory diagram of the scan mode.
Figure 33B:
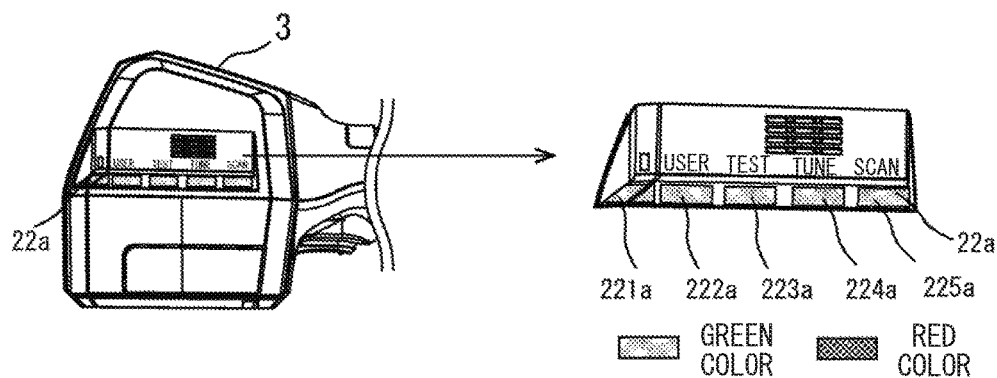
FIG. 33B is an explanatory diagram of the scan mode.

The scan mode is the mode for performing regular reading operation. FIGS. 33A to 33E are explanatory diagrams showing the operation of the indicator 22 in the scan mode. Further, FIGS. 34A to 34D show examples of lighting modes of the indicators 22. When the reading operation is not performed, the lights of the indicators 22 are turned off. Further, as shown in FIG. 33A, while the handy scanner 1 is reading, the lights of the indicators 22 are turned off. When the reading operation is succeeded, as shown in FIGS. 33B and 34A, the green color light is turned on in the indicator 22a and the indicator 22b.

Figure 33C:
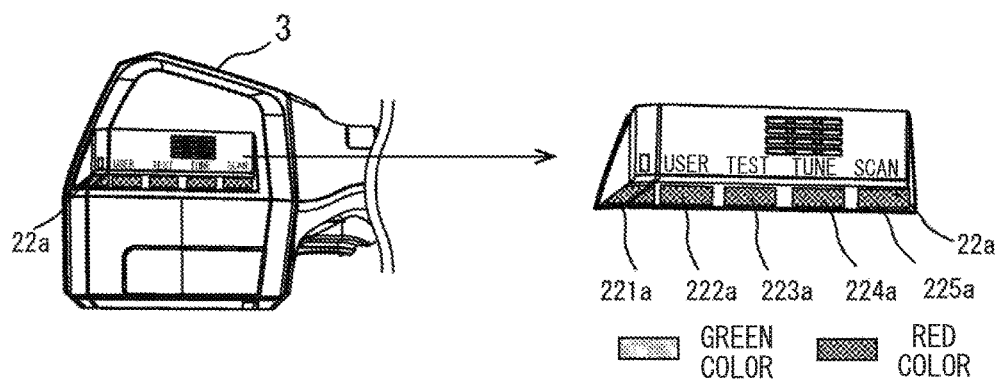
FIG. 33C is an explanatory diagram of the scan mode.
Figure 34A:
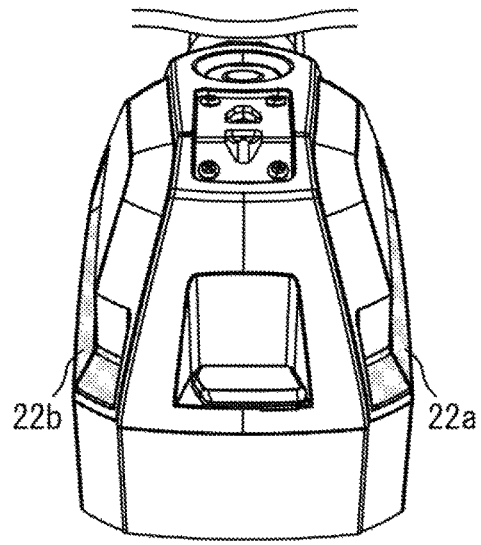
FIG. 34A is diagram showing an example of a lighting mode of the indicators.
Figure 34C:
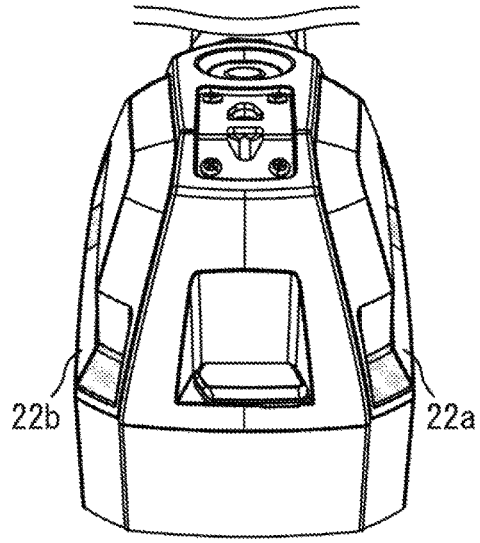
FIG. 34C is diagram showing an example of a lighting mode of the indicators.
Figure 34B:
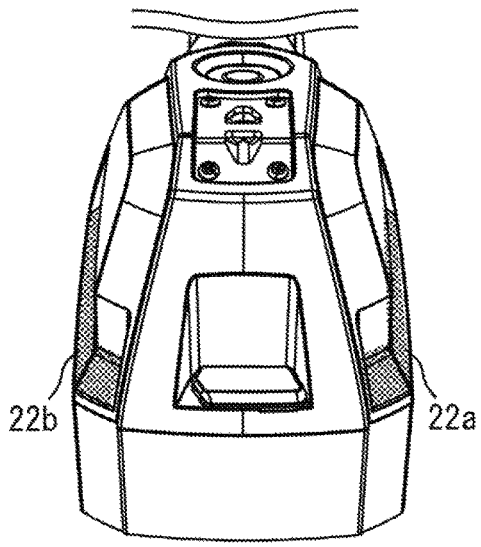
FIG. 34B is diagram showing an example of a lighting mode of the indicators.

On the other hand, when the reading operation fails, as shown in FIGS. 33C and 34B, the red color light is turned on in the indicator 22a and the indicator 22b.

Figure 33D:
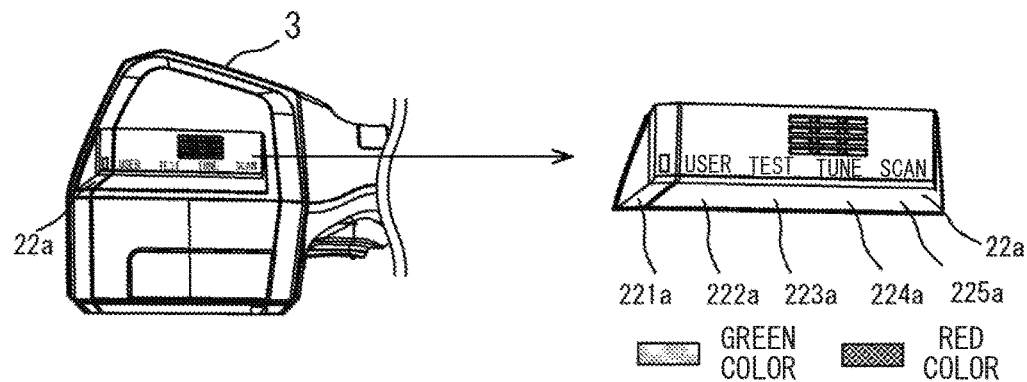
FIG. 33D is an explanatory diagram of the scan mode.
Figure 33E:
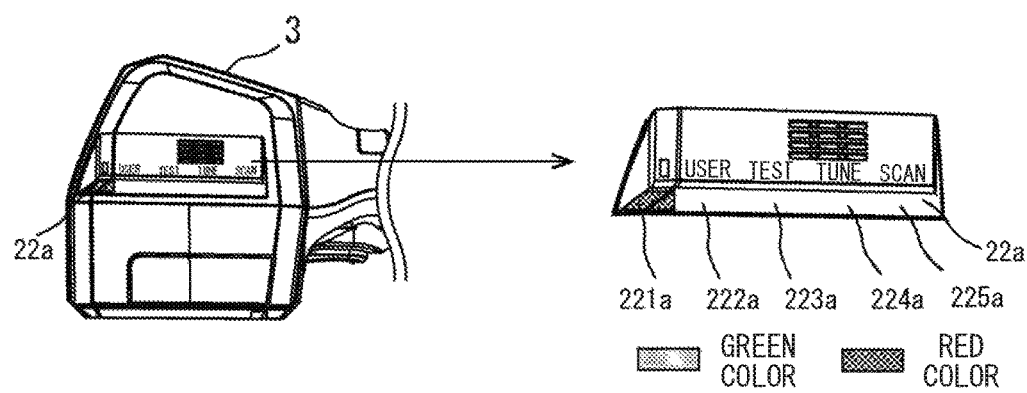
FIG. 33E is an explanatory diagram of the scan mode.

After the completion of the reading, when there is no error, in the same manner as the case in which the reading operation is not performed, as shown in FIG. 33D, the lights of the indicators 22 are turned off. On the other hand, for example, when the remaining amount of the battery becomes low after the completion of the reading, as shown in FIG. 33E, the red color light is turned on in the top end of the display element 221a and the display element 221b.

Figure 34D:
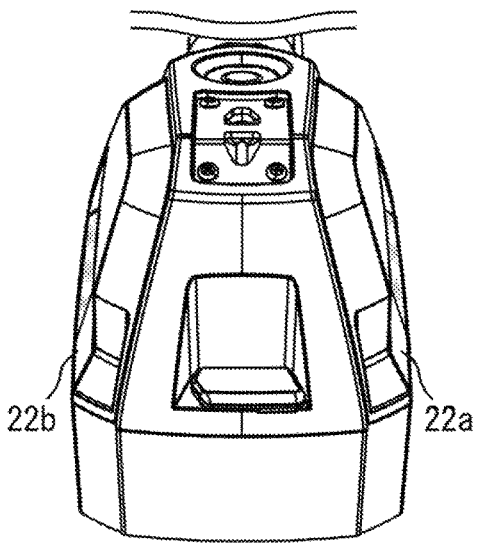
FIG. 34D is diagram showing an example of a lighting mode of the indicators.

The lighting mode when the reading operation succeeds may be considered in various ways. For example, as shown in FIG. 34A, the green color light may be turned on in all of the display elements 221 to 225. Other than that, for example, as shown in FIG. 34C, the green color light may be turned on in the display element 221 and the display element 225 or as shown in FIG. 34D, the green color light may be turned on in the display element 224 and the display element 225.

The lighting mode when the reading operation fails may be considered in various ways. For example, as shown in FIG. 34B, the red color light may be turned on in all of the display elements 221 to 225. Other than that, similar to the case in which the reading operation succeeds, the red color light may be turned on in the display elements as shown in FIGS. 33C and 33D. In brief, in the scan mode, the lighting mode of the indicators 22 changes in response to the reading operation of the handy scanner 1. In other words, the lighting mode of the indicators 22 changes based on success or failure of the reading operation by the reading part. In the present embodiment, it focuses on the lighting mode by turning on or off the light or changing the colors, but whether it is success or failure of the reading operation may be notified to the user by flashing light.

(Tune Mode)

The tune mode is the mode for optimizing the parameter when reading a bar code. When reading a bar code, there are various parameters such as, for example, gain, brightness, decoding, etc. of a camera. The combination of the parameters to be best for a bar code is different in each bar code, so that in order to increase the successful rate of the reading operation, it is necessary to find the best combination of the parameters in each bar code to be read.

Figure 35:
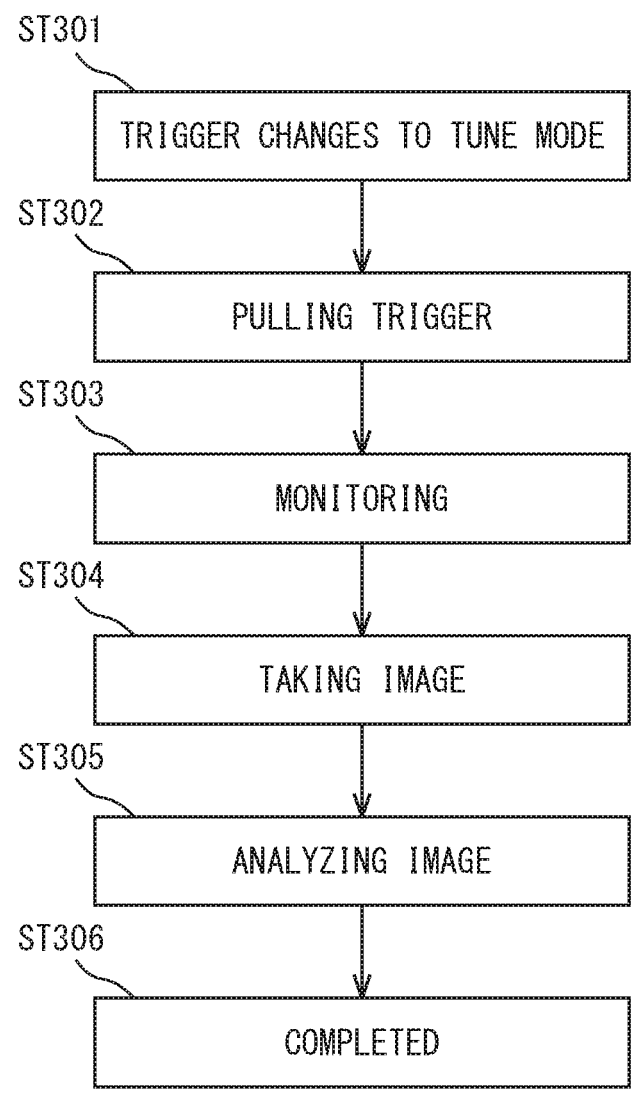
FIG. 35 is a flowchart showing procedures of the operation of the tune mode.

To find the combination of the parameters, the imaging condition changes by performing, for example, a block lighting or a polarized illumination, etc., and an actual reading operation is performed, and the optimization of the parameters is performed by selecting the combination of the parameters which is the highest accuracy of the reading. The flow of optimizing the various parameters in the tune mode can be systemized by six steps. FIG. 35 is a flowchart showing the flow of the six steps. FIGS. 36A to 36G are explanatory diagrams showing each step in the flowchart of FIG. 35.

Figure 36A:
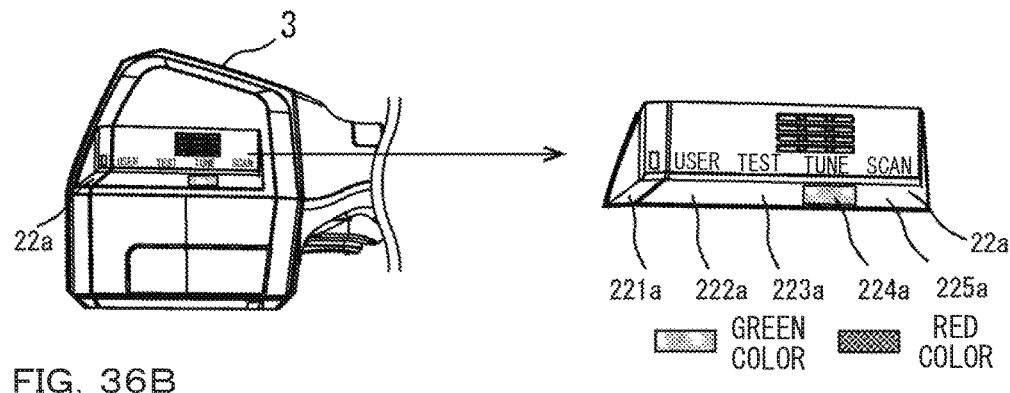
FIG. 36A is an explanatory diagram of the tune mode.

First, in Step ST301, the trigger switch 25 changes to the tune mode. It is switched by pressing the function switch 50. As shown in FIG. 36A, the second display element from the right side is the tune mode. By switching to the tune mode, the trigger switch 25 switches to the button for the tune mode.

Next, in Step ST302, by pressing the trigger switch 25 and pulling the trigger, the monitoring of Step ST303 starts.

(Tune Mode: Monitoring)

Figure 36B:
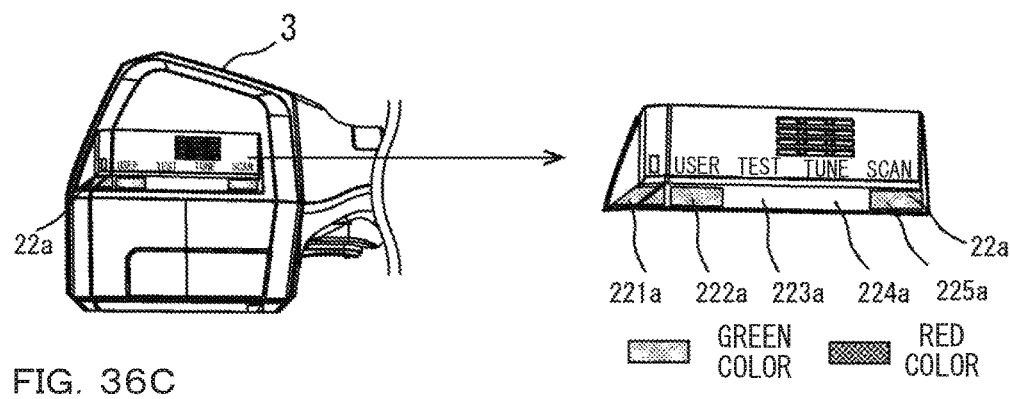
FIG. 36B is an explanatory diagram of the tune mode.

Next, in Step ST303, the monitoring is performed. The monitoring means to find a brief parameter by repeating a series of operation such that a combination is changed among the combinations in a preliminary set image condition, and an image is taken, and the image is analyzed. When a brief parameter is determined by the monitoring, based on the parameter, it is limited to a range of a probable parameter, and the series of operation such that an image is taken and the image is analyzed is repeated again, so that the parameter is optimized. Here, the step of executing the monitoring means, first, to guess and narrow down to the optimal value because the time for completing the optimization can be shortened. In this monitoring, the green color light is turned on in three of the display element 221, the display element 222, and the display element 225 of the indicators 22 as shown in FIG. 36B. Therefore, whether or not the reading is possible is notified to the user.

(Tune Mode: Imaging)

In Step ST304, a plurality of images is taken within the range of parameter determined in Step ST303. The imaging condition includes, for example, brightness, illumination position of block lighting, presence or absence of polarized illumination. Images for all the parameters are taken, and all the captured images are stored in RAM 333. It takes time for storing the images in the RAM 333, so that the progress of the processing is displayed for the user. For example, the following processing is performed for displaying the progress of the processing.

Figure 36C:
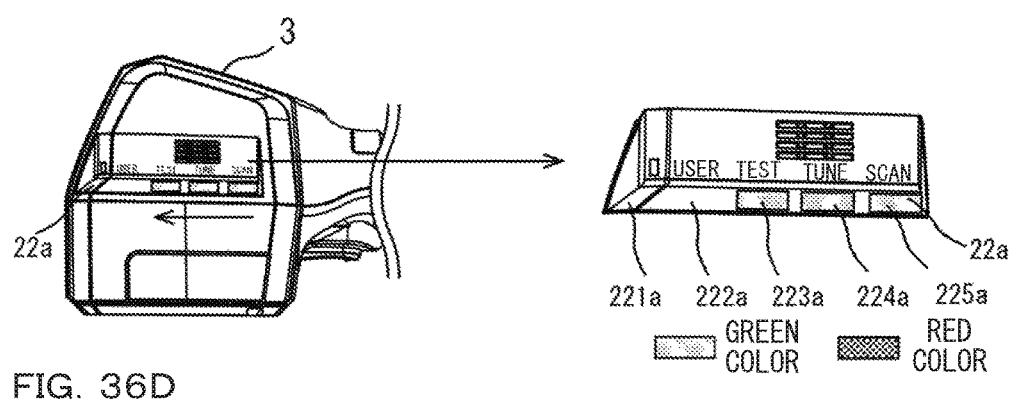
FIG. 36C is an explanatory diagram of the tune mode.

A progress rate of the processing is calculated by comparing the planned number of all captured images (or planned number of all stored images) and the number of current captured images (or number of current stored images). The indicators 22 have five display elements 221 to 225, and each of the display elements corresponds to 20% of the progress rate, so that the process of the processing can be displayed. The display elements are continuously provided in a bar shape, so that as shown in FIG. 36C, and the lights in the display elements are turned on from the right side in response to the progress rate. For example, when the progress rate is more than 0% and less than 20%, the light of the display element 225 is only turned on. When the progress rate is equal to or more than 20% and less than 40%, the light of the display element 224 is additionally turned on. Such that, by associating the progress rate of work or operation with a plurality of display elements which are continuously provided to show as a bar shape as a whole, the progress of processing or operation can be expressed. Further, the object by the expression is not limited to the process of work or operation. For example, the quality of the reading results may be expressed in a bar display.

With this, the light in the display elements may be integrally turned on by synchronizing the respective display elements or may be individually turned on by non-synchronizing the respective display elements. As an example of the non-synchronization display, it serves as a display to indicate operation modes, and as another example, it serves as a display to indicate the progress of work or operation. That is, the display elements are used to indicate both modes and results.

Figure 36D:
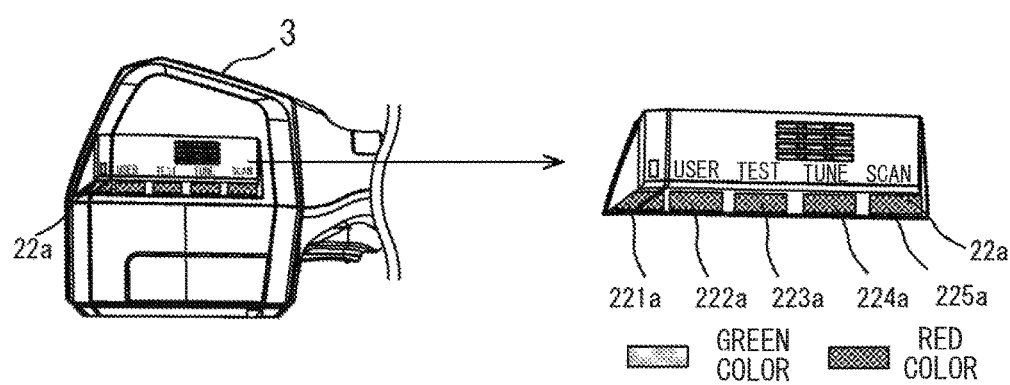
FIG. 36D is an explanatory diagram of the tune mode.

In FIG. 36C, when all display elements are turned on, storing the images to the RAM 333 is completed. In order to notify the completion of the imaging to the user, as shown in FIG. 36D, the red color light in all display elements 221 to 225 of the indicator 22 is once turned on. At the same time, the beep sound is output. Therefore, the completion of the imaging is notified to the user, and after that, it is shifted to the analysis of the images, so that the user can release the trigger switch 25 which has been continuously pressed by the user in order to take the images.

(Tune Mode: Analysis of Images)

When the imaging is completed, in Step ST305, the captured images are automatically retrieved from the RAM 333, and the images are analyzed to find the optimized parameter. Specifically, the parameter when the optimum images have been obtained became the optimized parameter. For example, a black and white image, a thick and thin image, etc., when a bar code is taken is scored, and whether or not it is an optimum image is determined by the image which has the highest score. In Step ST305, the user can release the trigger switch 25 and wait for the completion of the analysis. Therefore, it solves the inconvenience in which the user has to continuously press the trigger switch 25 until the completion of the analysis, and improves the usability.

Figure 36E:
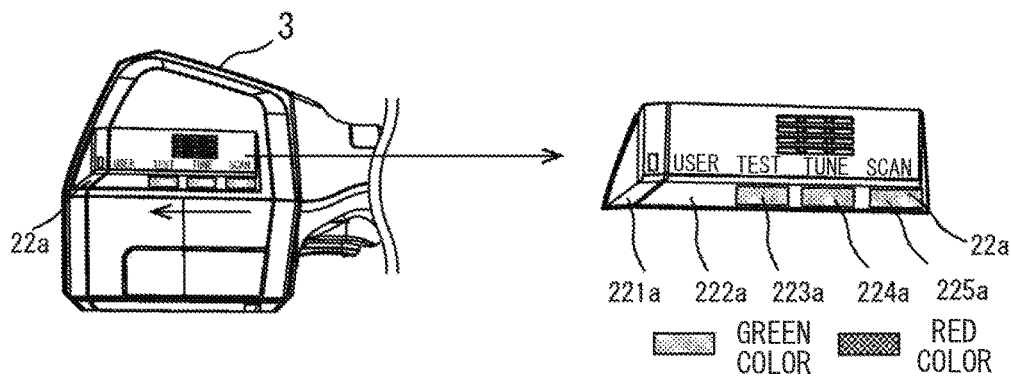
FIG. 36E is an explanatory diagram of the tune mode.
Figure 36F:
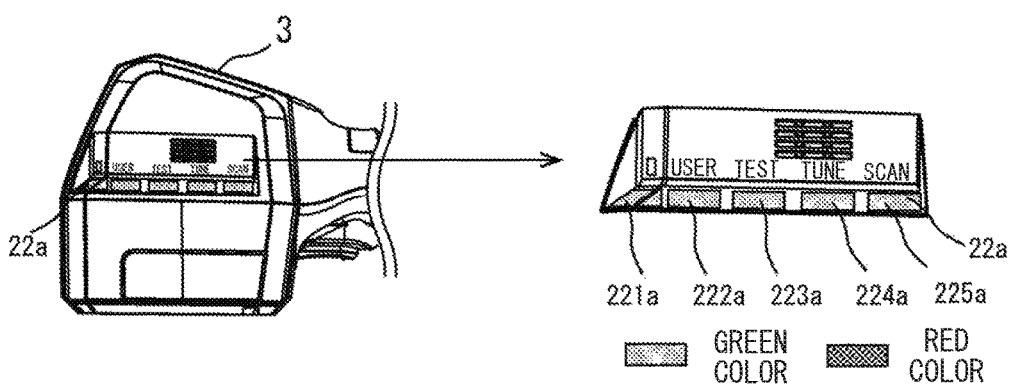
FIG. 36F is an explanatory diagram of the tune mode.
Figure 36G:
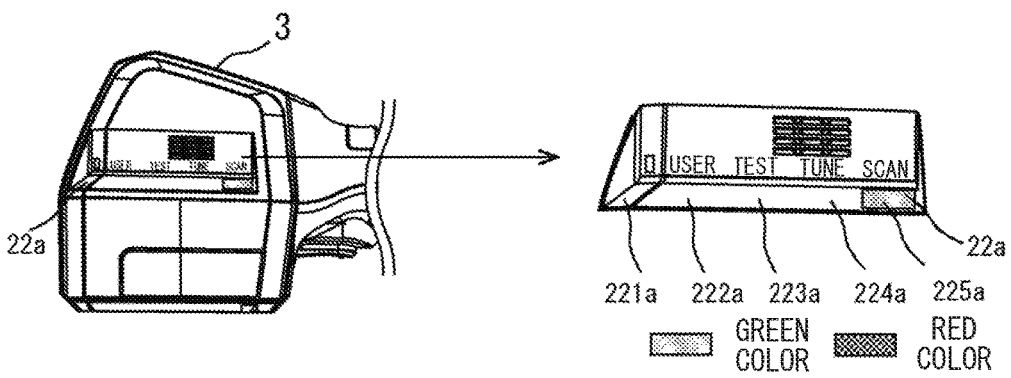
FIG. 36G is an explanatory diagram of the tune mode.

FIG. 36E shows the progress of analysis operation. In Step ST306, when the image analysis is completed, the beep sound is output and as shown in FIG. 36F, the green color light is turned on in all the display elements 221 to 225 of the indicators 22. When a predetermined time is elapsed, as shown in FIG. 36G, the operation mode is automatically shifted to the scan mode.

As described above, the handy scanner 1 (for example, DSP 331) according to the present embodiment is provided with a mode transition function in which the tune mode for optimizing a reading parameter used in the reading part is shifted from the scan mode for performing the regular reading operation. After shifting to the tune mode, in order to optimize the reading parameter, the reading part repeatedly takes images of a symbol by a predetermined number of times while the reading parameters are varied under a predetermined condition. At this point, in the display part, the light is turned on or flashed in the display elements to show the progress status based on the progress status of the image processing by the reading part. Specifically, for example, as described above, the light in each display element may be sequentially turned on, or the light color in each display element may be changed. In the display part, when the image processing by the reading part is completed, the light in the display elements is turned on or flashed to indicate the completion of the image processing. When the user confirmed the status of turning on the light, the user can release the handy scanner 1 and the user does not have to hold the holding part 2 when the handy scanner 1 (for example, DSP 331) analyzes the images.

In other words, in the display part according to the present invention, in the tune mode for optimizing the reading parameter, the lights in the display elements are turned on or flashed to indicate the progress status of the image processing by the reading part and the completion of the image processing by the reading part, so that the usability and convenience when optimizing the reading parameter can be improved.

(Test Mode)

The test mode is the mode for testing a reading rate. When a symbol is easily read, many lights are turned on in the display elements 221 and 225, and when a symbol is hardly read, the number of lights turned on is reduced. Therefore, the user can realize the test result of the reading rate. FIG. 37 is a flowchart showing a procedure of the operation in the test mode. FIGS. 38A to 38D are explanatory diagrams showing each step in the flowchart shown in FIG. 37.

Figure 38A:
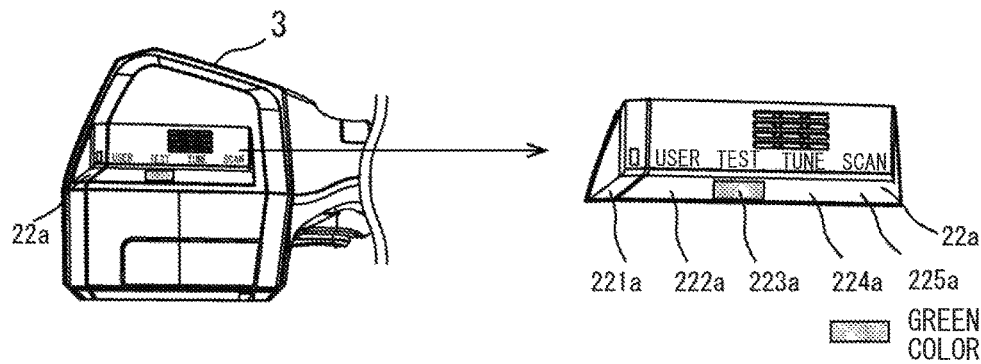
FIG. 38A is an explanatory diagram of the test mode.
Figure 38B:
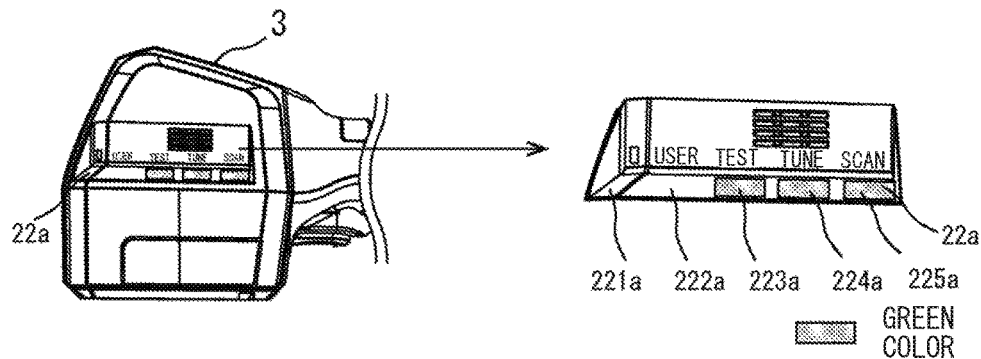
FIG. 38B is an explanatory diagram of the test mode.

As the operation, in Step ST401, by pressing the function switch 50, as shown in FIG. 38A, the light in the display element 223 corresponding to the test mode is turned on.

Next, in Step ST402, the user presses the trigger switch 25 and pulls the trigger.

The test is maintained in Step ST403 while the user pulls the trigger in Step ST402, and the test mode is completed when the user releases the trigger in Step ST404.

Figure 38C:
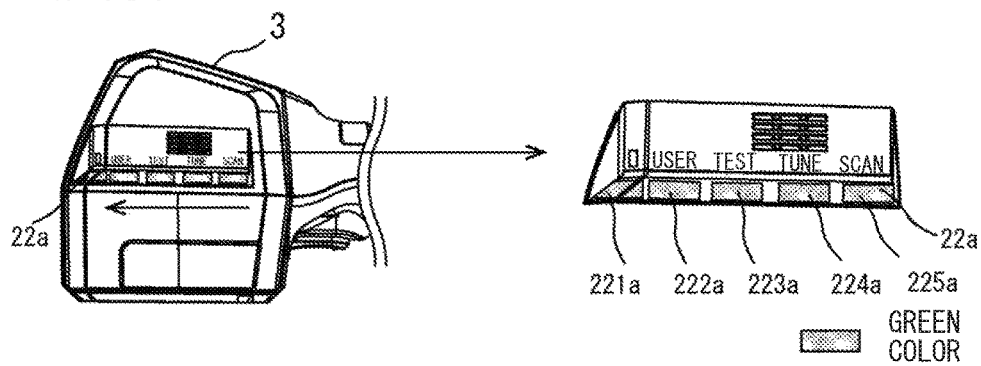
FIG. 38C is an explanatory diagram of the test mode.

In Step ST403, when a symbol is read appropriately, as shown in FIG. 38C, the green color lights in all the display elements 221 to 225 are turned on. When the reading rate becomes low, the number of lights turned on in the display elements is reduced from the left side. The beep sound is continued to be output while pressing the trigger switch 25 in Step ST402, and during the time, it continues to calculate the reading rate and at the same time, the reading rate is expressed by turning on the lights in the display elements.

Figure 38D:
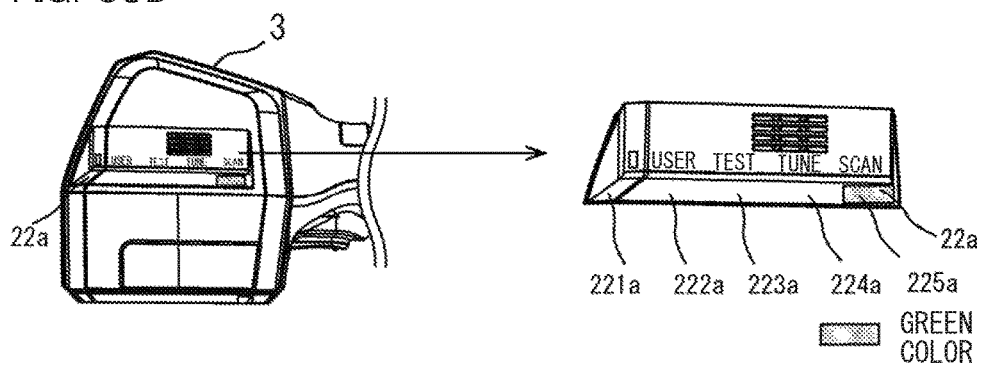
FIG. 38D is an explanatory diagram of the test mode.

In Step ST404, by releasing the trigger by the user, when the test mode is completed, as shown in FIG. 38D, the operation mode is automatically shifted to the scan mode.

Even though the parameter is optimized in the tune mode, all the parameters are not optimized in the test mode because the parameters are tuned with a wrong distance such that the distance to a bar code is too far, etc. Even in this case, by the test mode, whether or not the tuning is appropriate can be confirmed.

As described above, the handy scanner 1 (for example, DSP 331) according to the present embodiment is provided with a mode transition function in which the test mode for performing a reading test in response to a reading posture (or reading position) of the handy scanner 1 is shifted from the scan mode for performing the regular reading operation. After shifting to the test mode, the reading part repeatedly takes images of a symbol, and the reading test of the symbol is performed. The reading part calculates a reading rate indicating a rate which is the successful rate of the reading among a predetermined number of reading tests. In the display part, the lights in the display elements are turned on or flashed to indicate an appropriateness of reading posture of the handy scanner 1 based on the reading rate calculated by the reading part. Such operation processing of the display part is repeatedly performed during the test mode. Therefore, the user can recognize visually or audibly which position or posture the reading rate improves in a relative positional relationship with a symbol when the user holds the holding part 2 of the handy scanner 1, and furthermore, the usability can be improved.

(User Mode)

The user mode is the mode in which the user performs various operations and settings. In this mode, the user can perform three operations or settings of (1) communication quality test, (2) collation registration, and (3) fixed character output (when pressing the trigger switch 25, a character determined inside is output). Hereinafter, the operations or the settings performed by the user will be described.

(User Mode: Communication Quality Test)

Figure 39:
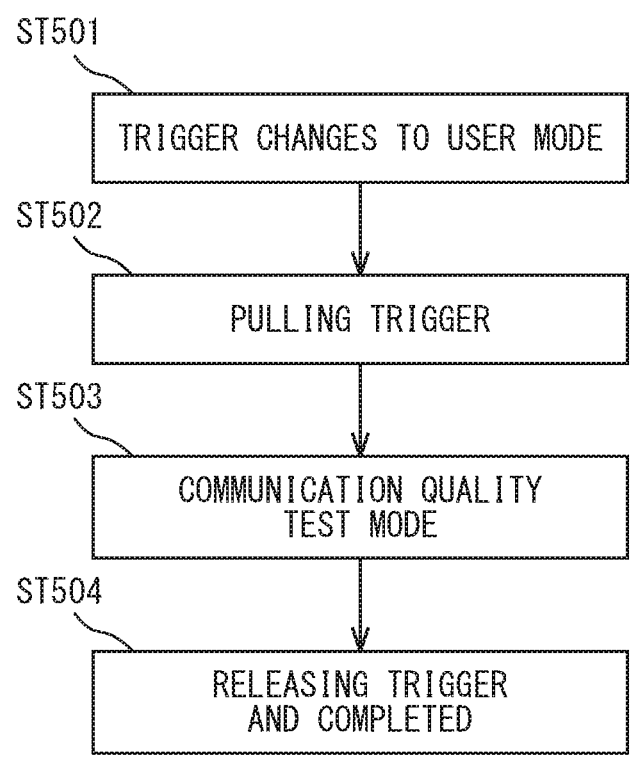
FIG. 39 is a flowchart showing procedures of the operation of a communication quality test of the user mode.

FIG. 39 is a flowchart showing an operation procedure in the user mode for performing the communication quality test. FIGS. 40A to 40D are explanatory diagrams showing each step in the flowchart shown in FIG. 39.

Figure 40A:
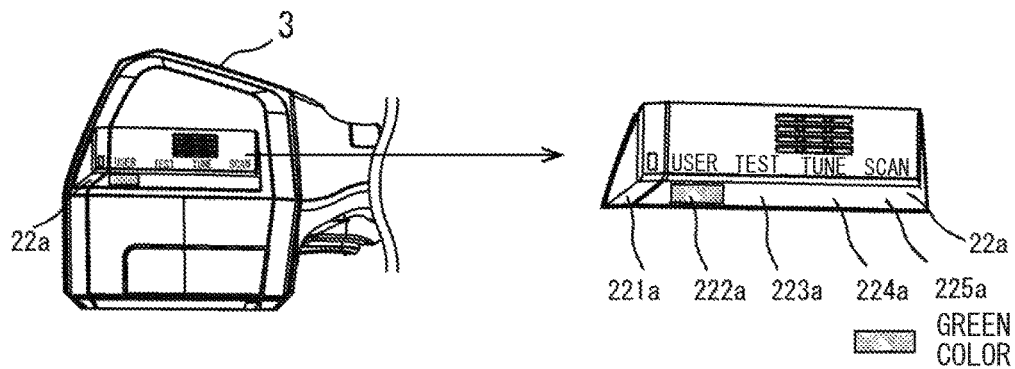
FIG. 40A is an explanatory diagram showing a communication quality test of the user mode.
Figure 40B:
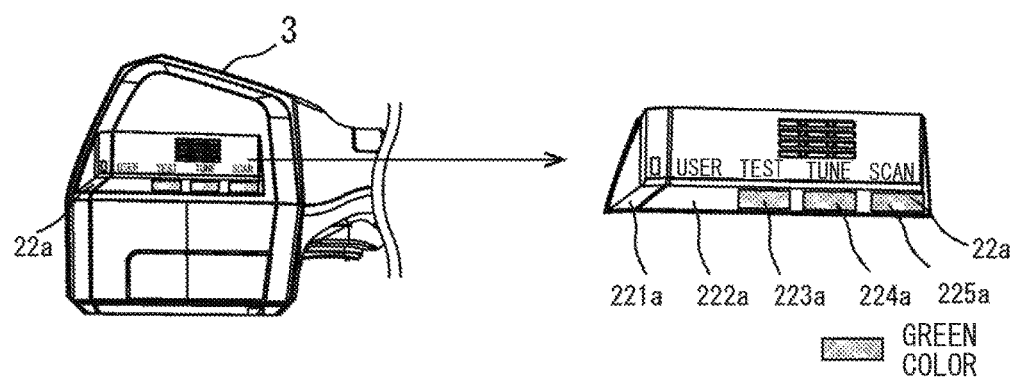
FIG. 40B is an explanatory diagram showing the communication quality test of the user mode.

First, as an operation, in Step ST501, the function switch 50 is pressed to turn on the light in the display element 222 corresponding to the user mode as shown in FIG. 40A.

Next, in Step ST502, the user presses the trigger switch 25 and pulls the trigger.

During the user pulls the trigger in Step ST502, the communication quality test continues in Step ST503, and in Step ST504, the communication quality test completes by releasing the trigger by the user.

Figure 40C:
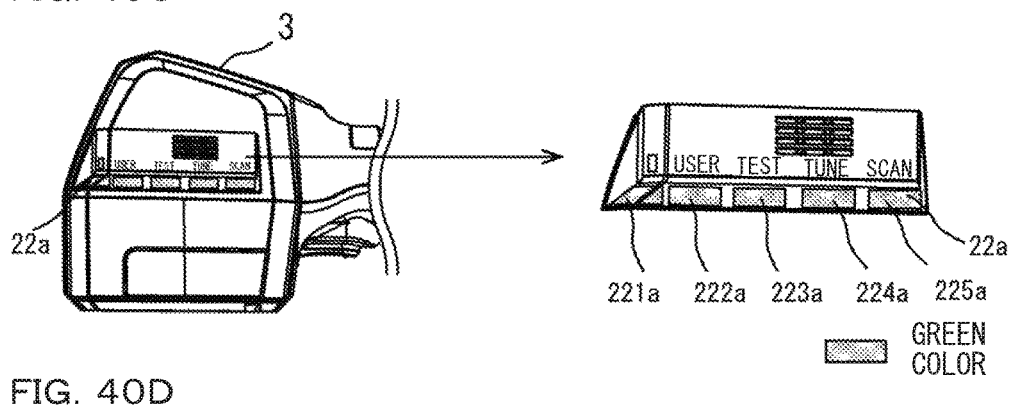
FIG. 40C is an explanatory diagram showing the communication quality test of the user mode.

In Step ST503, when the communication quality is good, as shown in FIG. 40C, the green color lights are turned on in all the display elements 221 to 225. When the communication quality becomes lower, the number of lights in the display elements is reduced from the left side. In Step ST502, the beep sound is output while the trigger switch 25 is pressed, and during the time, at the same time in which the communication quality test continues, the display elements express the communication quality by turning on the number of lights.

Figure 40D:
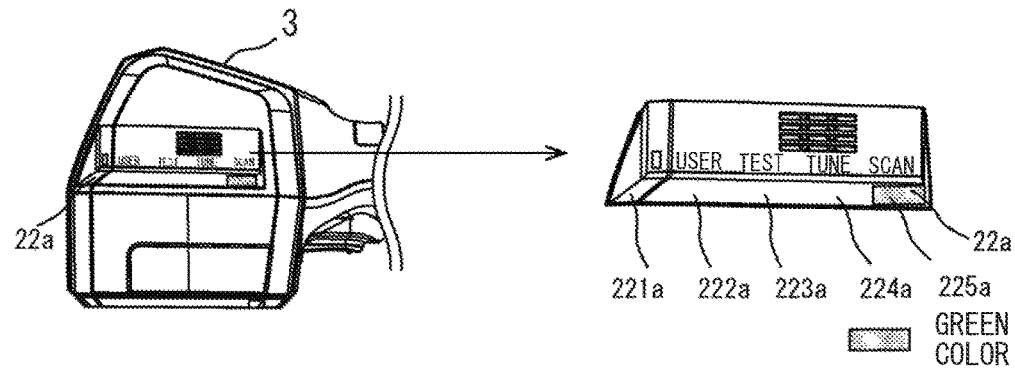
FIG. 40D is an explanatory diagram showing the communication quality test of the user mode.

In Step ST504, when the communication quality test is completed by releasing the trigger by the user, as shown in FIG. 40D, the operation mode is automatically shifted to the scan mode.

In the communication quality test, inside a factory, when the user has to work far away from a place where the radio transmission of a relay device cannot reach, or when there are many metal devices and the radio wave is reflected to the metal devices and the communication cannot be performed, the user can perform a survey to store a usable range when the relay device or the handy scanner 1 is initially placed.

(User Mode: Collation Registration)

Figure 41:
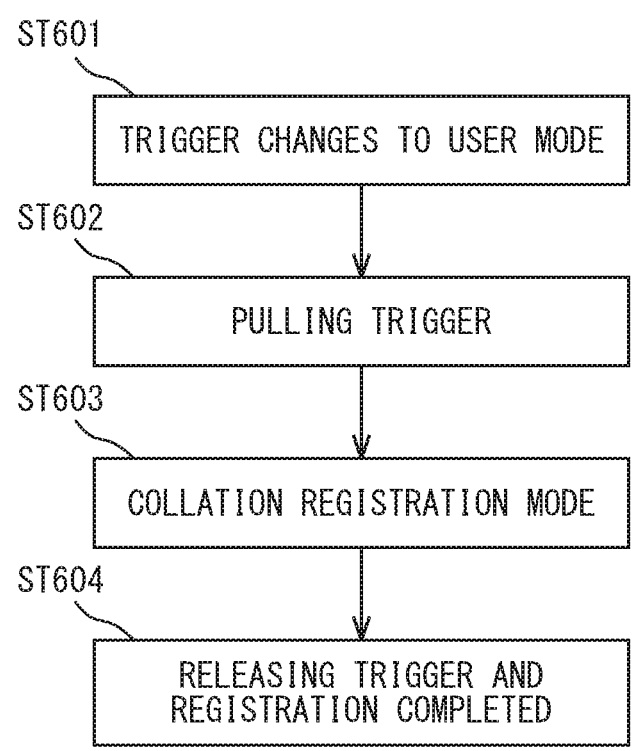
FIG. 41 is a flowchart showing procedures of the operation of collation registration of the user mode.

FIG. 41 is a flowchart showing an operation procedure in the user mode for performing a collation registration. FIGS. 42A to 42D are explanatory diagrams showing each step of the flowchart shown in FIG. 41.

Figure 42A:
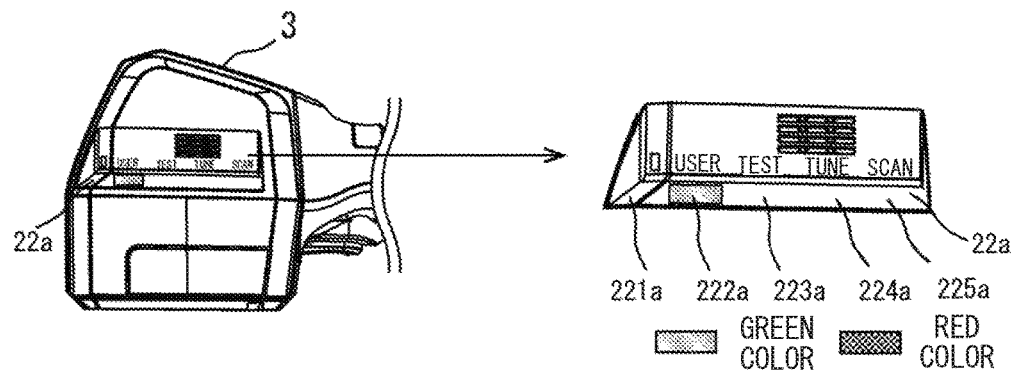
FIG. 42A is an explanatory diagram of the collation registration of the user mode.

First, as an operation, in Step ST601, as shown in FIG. 42A, the light in the display element 222 corresponding to the user mode is turned on by pressing the function switch 50.

Next, in Step ST602, the user presses the trigger switch 25 and pulls the trigger. With this operation, in Step ST603, the reading starts and a bar code character string is registered as a collation character string at the timing when the first bar code is read, and the processing is completed.

Figure 42B:
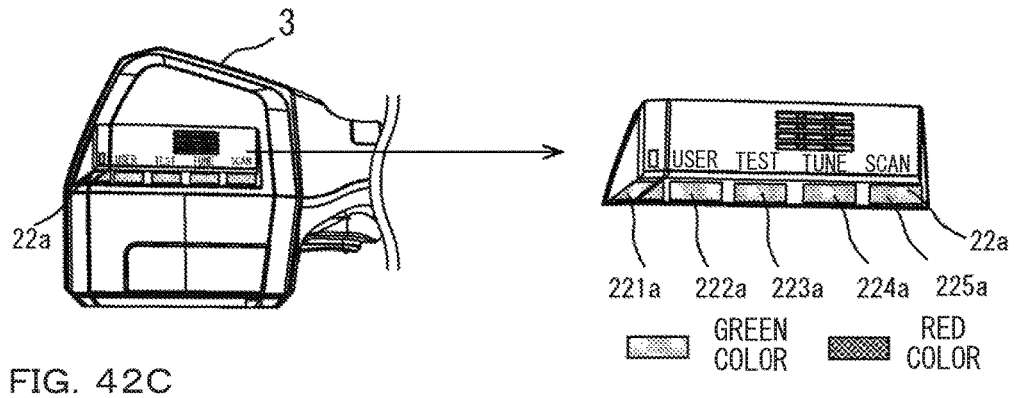
FIG. 42B is an explanatory diagram of the collation registration of the user mode.
Figure 42C:
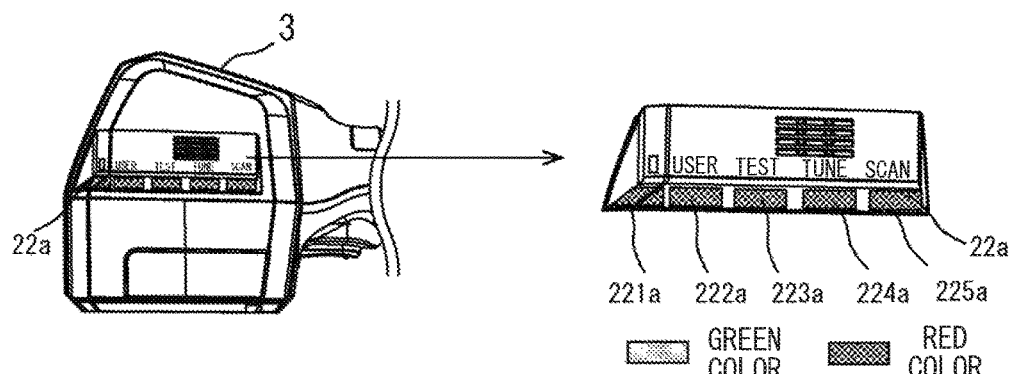
FIG. 42C is an explanatory diagram of the collation registration of the user mode.

In Step ST603, when the collation registration is completed, as shown in FIG. 42B, the green color lights are turned on in all the display elements 221 to 225. When the collation registration fails, as shown in FIG. 42C, the red color lights are turned on in all the display elements 221 to 225.

Figure 42D:
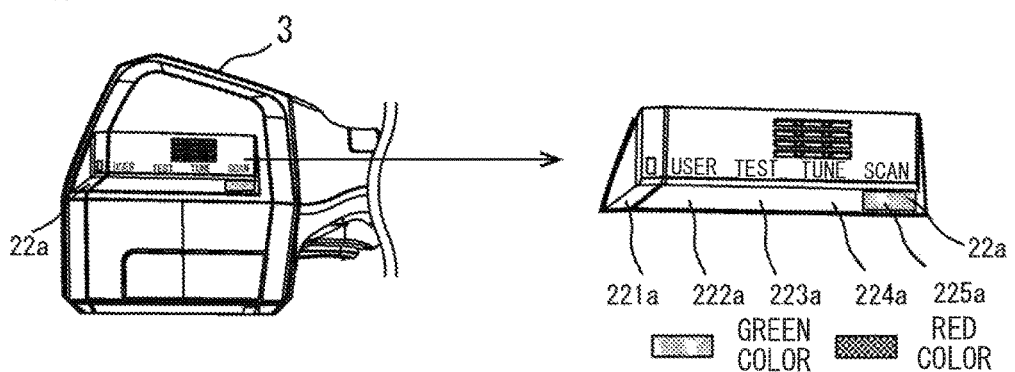
FIG. 42D is an explanatory diagram of the collation registration of the user mode.

Further, in Step ST604, when the collation registration is completed, as shown in FIG. 42D, the operation mode is automatically shifted to the scan mode. Further, during reading a collation mode, at the timing when the user releases the trigger, the operation mode is also shifted to the scan mode without executing the registration of a collation character string. In this scan mode, it is different from regular processing because whether or not it corresponds to the bar code stored as a collation registration is determined, and even though the reading is completed, when it does not correspond to the bar code stored as a collation registration, it fails. Therefore, the reading result is limited to any one of success or failure.

(User Mode: Fixed Character Output)

Figure 43:
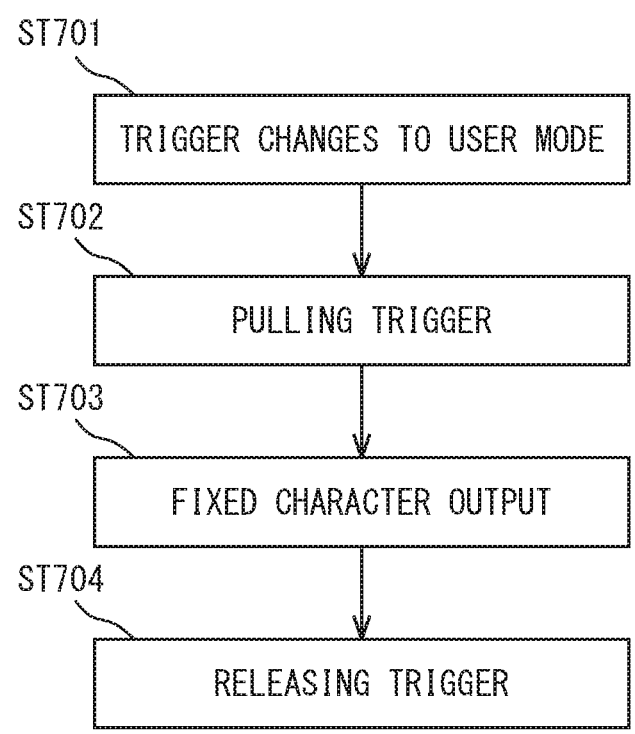
FIG. 43 is a flowchart showing procedures of the operation of fixed character output of the user mode.

FIG. 43 is a flowchart showing an operation procedure in the user mode for performing a fixed character output. FIGS. 44A to 44D are explanatory diagrams showing each step of the flowchart shown in FIG. 43.

Figure 44A:
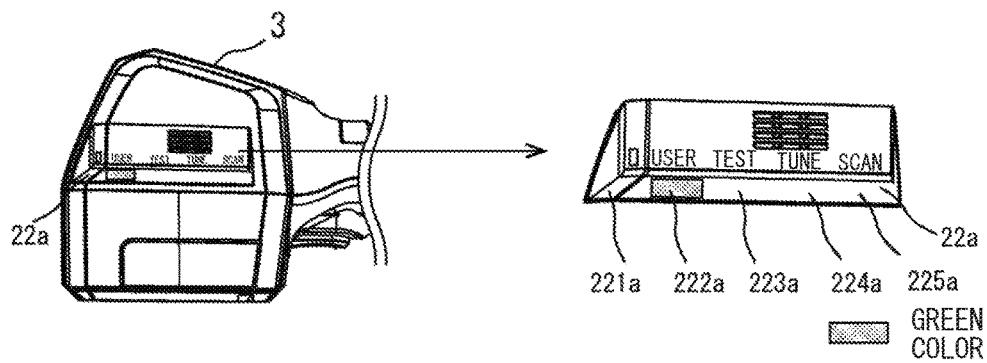
FIG. 44A is an explanatory diagram of the fixed character output of the user mode.

The characters are preliminary registered from a personal computer (PC) to the handy scanner 1 through a USB, etc. for performing the fixed character output from the handy scanner 1. First, as an operation, in Step ST701, as shown in FIG. 44A, the light in the display element 222 corresponding to the user mode is turned on by pressing the function switch 50.

Next, in Step ST702, the user presses the trigger switch 25 and pulls the trigger.

In Step ST702, during the user pulls the trigger, in Step ST703, it continues to perform the fixed character output, and in Step ST704, the fixed character output is completed by releasing the trigger by the user. When the user once presses the trigger switch 25 and immediately releases the trigger, the registered fixed character can be output at one time. In the present embodiment, during pulling the trigger, it is set to continue performing the fixed character output, but for example, it may be set to output the fixed character at one time when the trigger is pulled.

Figure 44B:
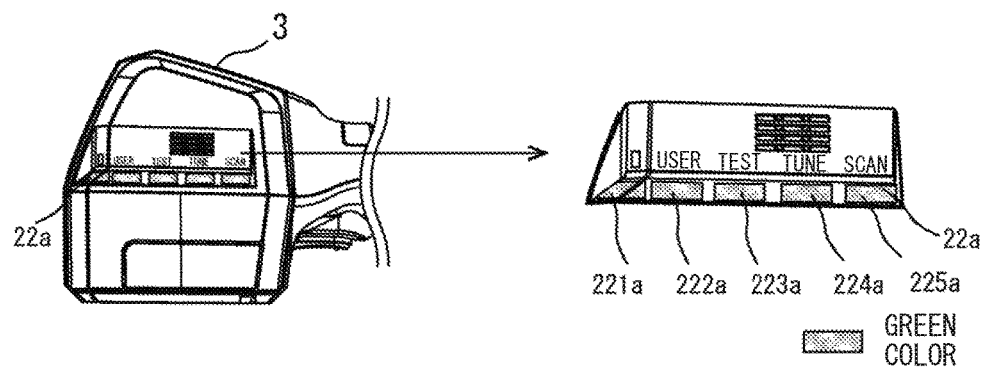
FIG. 44B is an explanatory diagram of the fixed character output of the user mode.

In Step ST703, when the fixed character output is completed, as shown in FIG. 44B, the green color lights are turned on in all the display elements 221 to 225. In Step ST702, the beep sound continues to be output while the trigger switch 25 continues to be pressed, and during the time, the fixed character output continues to be performed.

Figure 44C:
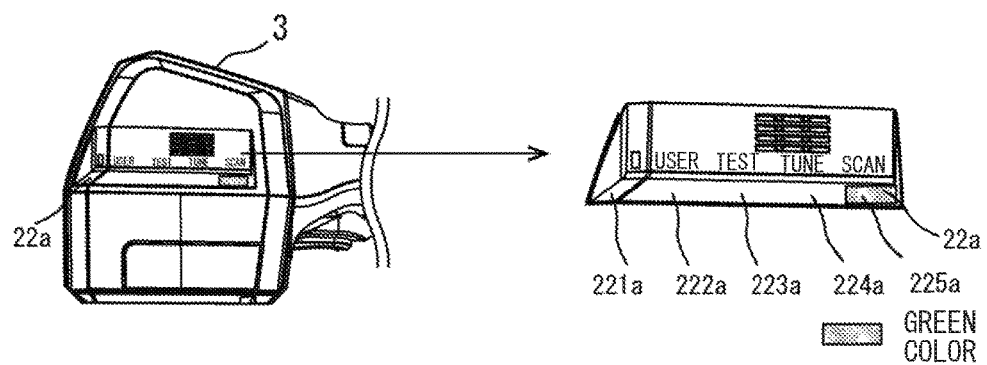
FIG. 44C is an explanatory diagram of the fixed character output of the user mode.
Figure 45A:
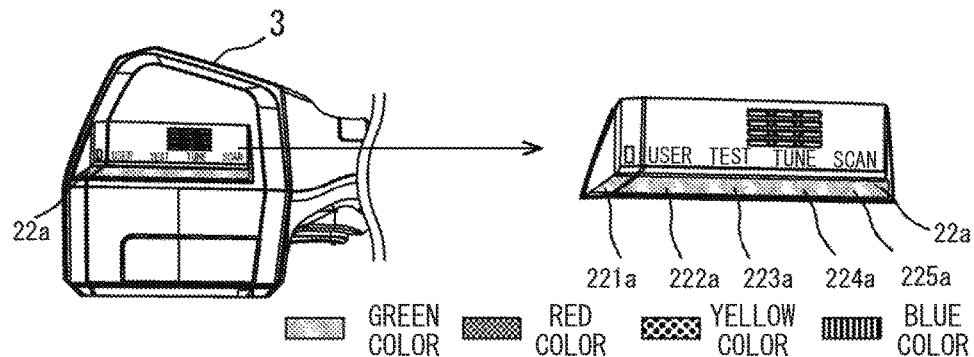
FIG. 45A is an explanatory diagram showing lighting method changing colors of the indicators.
Figure 45B:
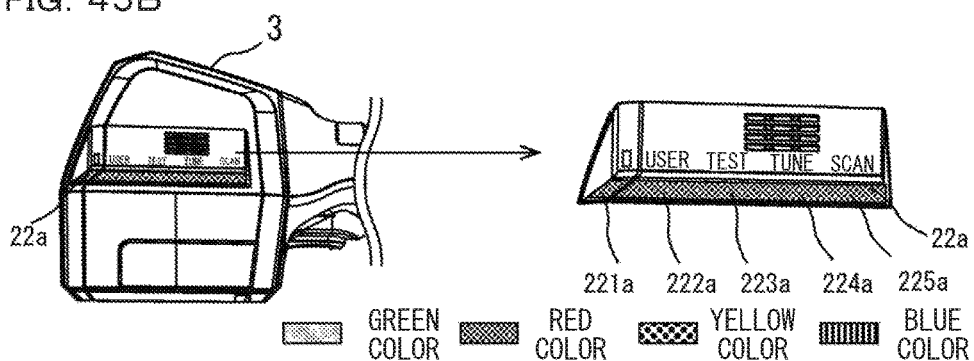
FIG. 45B is an explanatory diagram showing lighting method changing colors of the indicators.
Figure 45C:
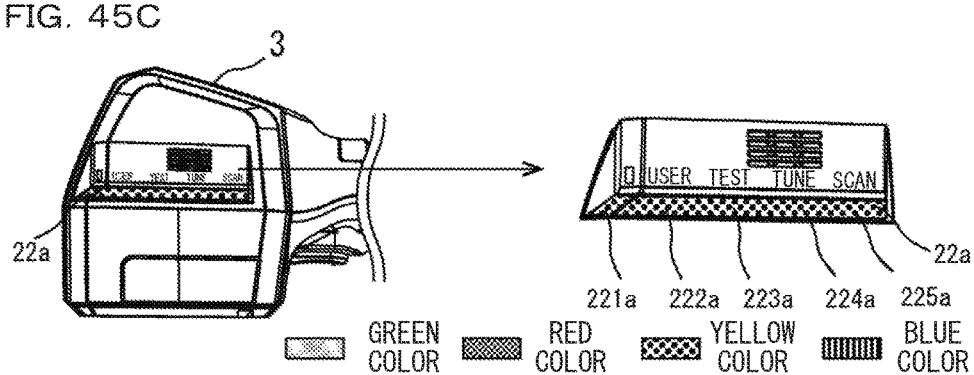
FIG. 45C is an explanatory diagram showing the lighting method changing colors of the indicators.
Figure 45D:
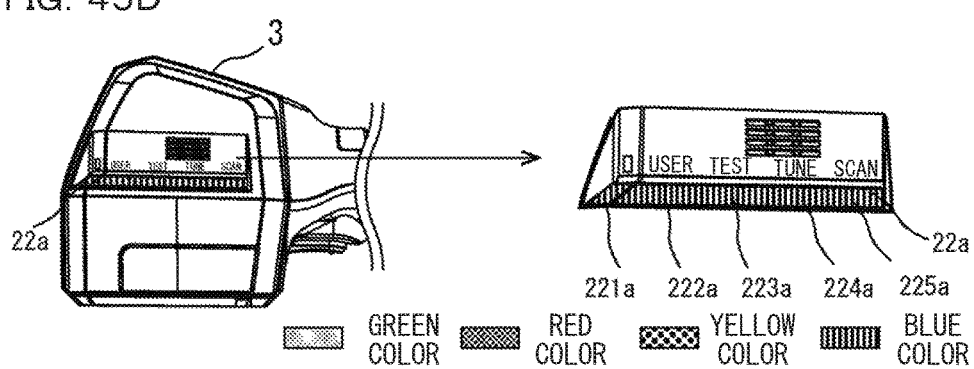
FIG. 45D is an explanatory diagram showing the lighting method changing colors of the indicators.
Figure 46A:
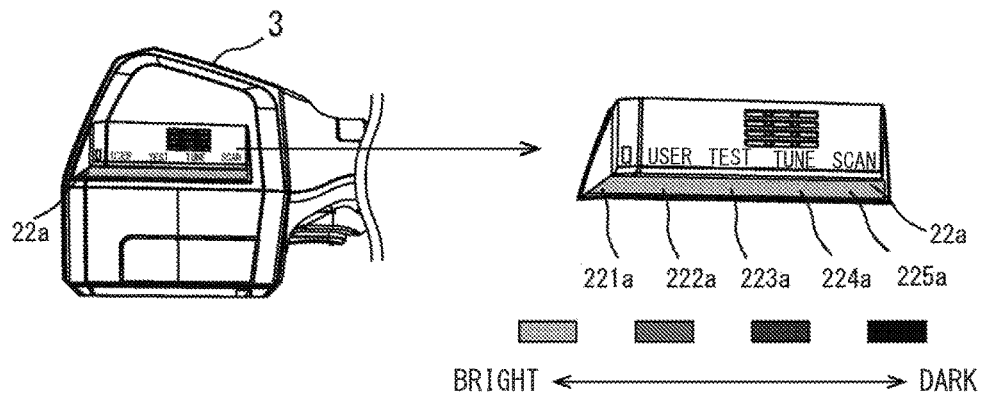
FIG. 46A is an explanatory diagram showing lighting method changing brightness of the indicators.
Figure 46B:
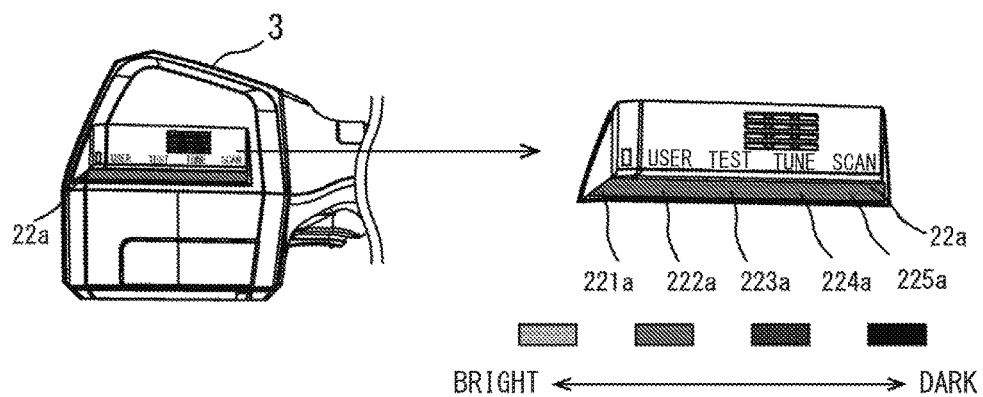
FIG. 46B is an explanatory diagram showing the lighting method changing brightness of the indicators.
Figure 46C:
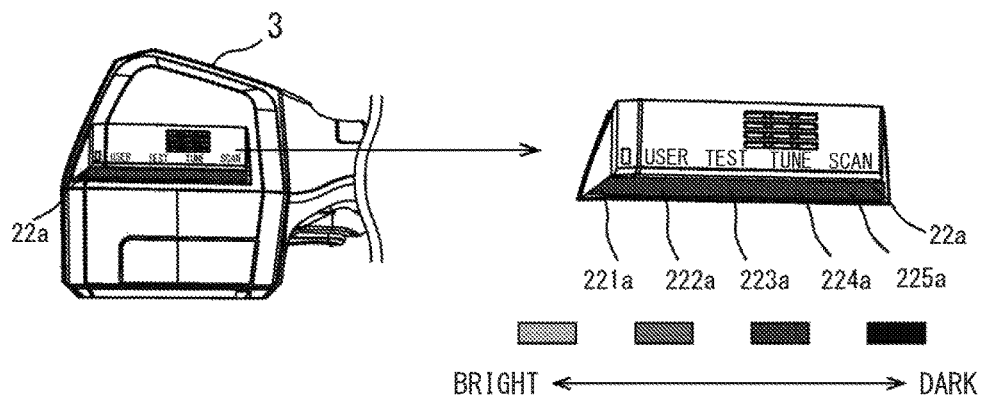
FIG. 46C is an explanatory diagram showing the lighting method changing brightness of the indicators.
Figure 46D:
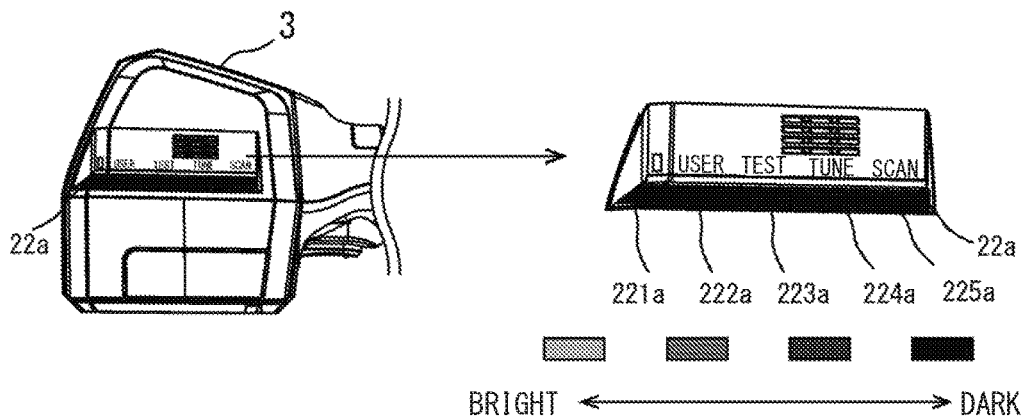
FIG. 46D is an explanatory diagram showing the lighting method changing brightness of the indicators.
Figure 47A:
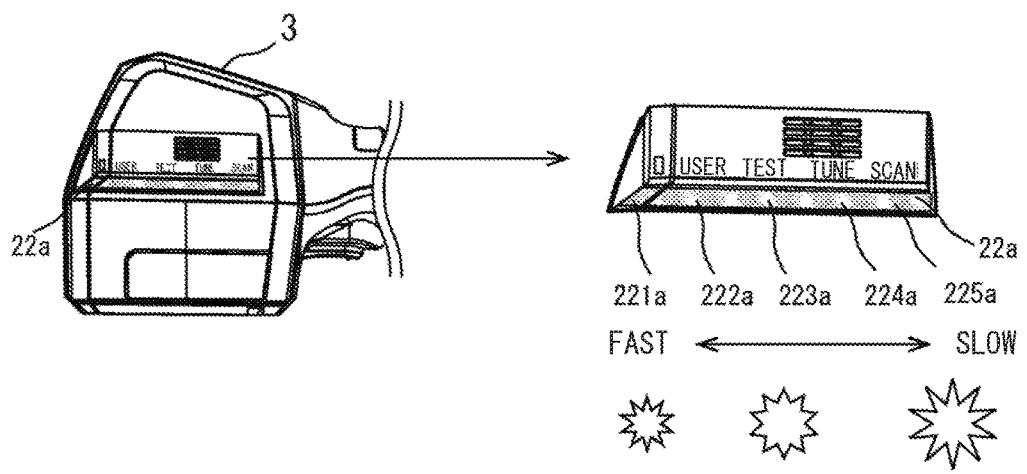
FIG. 47A is an explanatory diagram showing lighting method changing flashing speed of the indicators.
Figure 47B:
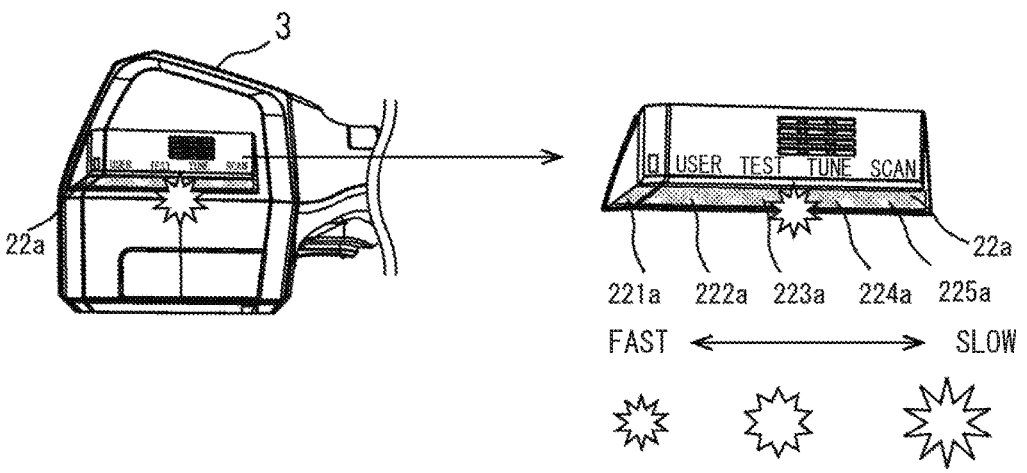
FIG. 47B is an explanatory diagram showing the lighting method changing flashing speed of the indicators.
Figure 47C:
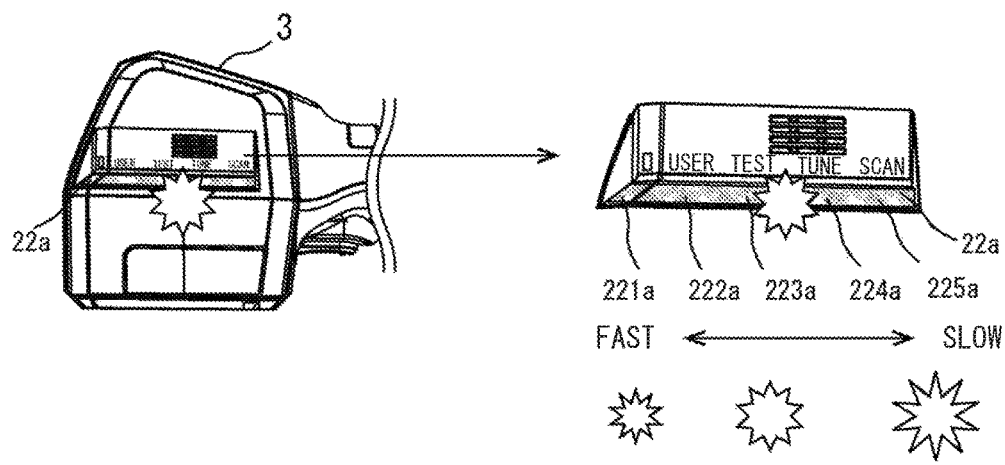
FIG. 47C is an explanatory diagram showing the lighting method changing flashing speed of the indicators.
Figure 47D:
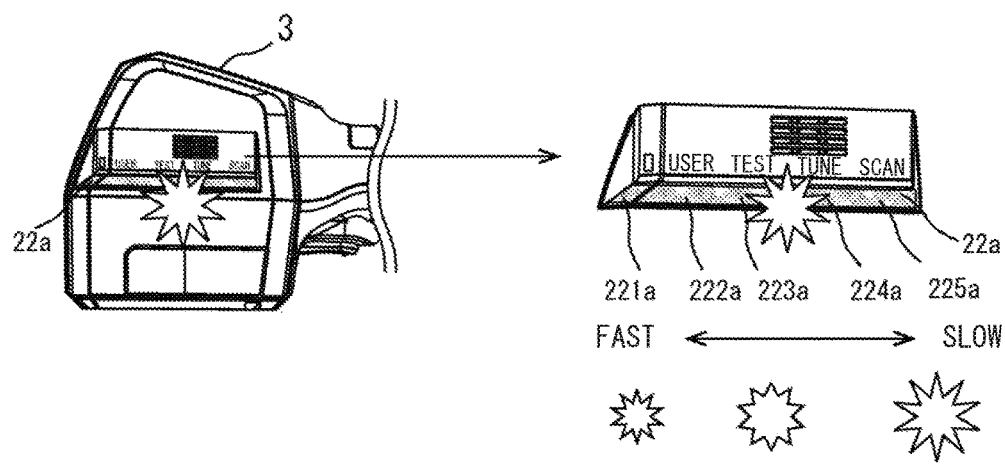
FIG. 47D is an explanatory diagram showing the lighting method changing flashing speed of the indicators.
Figure 48:
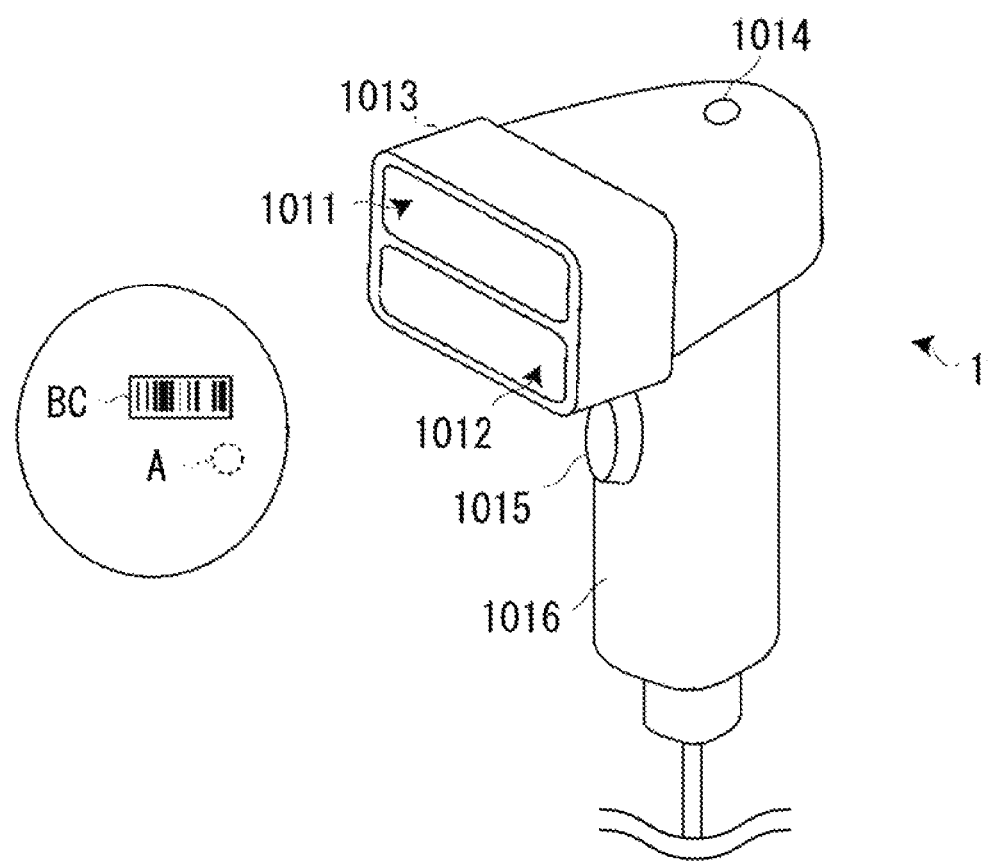
FIG. 48 is a schematic view showing a conventional reader.

In Step ST704, when the fixed character output is completed by releasing the trigger by the user, the operation mode is automatically shifted to the scan mode as shown in FIG. 44C.

In this fixed character output, for example, a tab key may be preliminary registered as a fixed character, and after performing the regular reading in the scan mode, when it is shifted to the user mode and the fixed character output is performed, a tab key is inserted below the character string which has been read, so that when it is read by, for example, EXCEL (registered trademark), the character string can be input in each cell.

(Other Lighting Method of Indicators)

In the present embodiment, the LED (indicator LED 21) is used as a light source of the indicators 22, but it may be, for example, a liquid crystal or an organic EL, and it is not particularly limited. As another lighting method of the indicators, for example, it may be considered to change colors. FIGS. 45A to 45D are diagrams showing various display modes of the indicators 22 by changing colors of the light source. As shown in FIGS. 45A to 45D, the color of the indicators 22 may be changed to green color, red color, yellow color, and blue color.

Further, as another lighting method of the indicators, for example, it may be considered to change the brightness. FIGS. 46A to 46D is diagrams showing various display modes of the indicators 22 to change the brightness of the light source. As shown in FIGS. 46A to 46D, the brightness of the indicators 22 can be changed in, for example, four steps.

Furthermore, as another lighting method of the indicators, for example, it is considered to change the light flashing speed. FIGS. 47A to 47D are diagrams showing various display modes of the indicators 22 by changing the light flashing speed. As shown in FIGS. 47A to 47D, the light flashing speed of the indicators 22 can be changed in, for example, four steps.

Furthermore, the indicating method may be in various ways. For example, a numeric value may be displayed in a display such as a liquid crystal, etc., and other than that, tempo or size of the sound, strength or frequency of the vibrator, etc. may be considered.

INDUSTRIAL APPLICABILITY

The present invention relates to a portable optical reader improving visibility of the indicators for notifying various information to a user.

What is claimed is:

1. A portable optical reader comprising:
a reading part optically reading a symbol as a reading object;
a head part housing the reading part and having a reading port for the reading part;
a holding part continuously connected to the head part and extending in a connecting direction; and
a display part provided in the head part to display at least a reading result read by the reading part,
wherein the head part has outer side surfaces, and the display part is provided on at least two of outer side surfaces, the outer side surfaces being a side surface facing to a surface on which the holding part is connected, and being a side surface substantially orthogonal to both a reading direction by the reading part and an extending direction of the holding part.

2. The portable optical reader according to claim 1, wherein the display part has a first display part in one side of a pair of the outer side surfaces facing in a direction substantially orthogonal to the extending direction of the holding part, and has a second display part in another side.

3. The portable optical reader according to claim 1, wherein on the side surfaces which form the head part, the display part is provided in a position further forward than a rear surface of the holding part.

4. The portable optical reader according to claim 1, wherein the display part has an inclined surface separating from a reading optical axis of the reading part while being closer to the reading port.

5. The portable optical reader according to claim 1, wherein the display part extends along a circumference direction of the reading port.

6. The portable optical reader according to claim 5, wherein the display part includes a plurality of display elements continuously provided in an extending direction of the holding part.

7. The portable optical reader according to claim 1, wherein the holding part is continuously connected to the head part in a manner in which the extending direction of the holding part is substantially parallel to a plane surface including the reading port of the reading part.

8. The portable optical reader according to claim 1, the portable optical reader further comprising a switch for switching to a tune mode, the tune mode being for optimizing parameters to read a code.

9. The portable optical reader according to claim 8, wherein the display part indicates completion information when an optimization analysis is completed in the tune mode.

10. The portable optical reader according to claim 9, the reading part comprising a camera configured to capture a plurality of images of a symbol prior to the optimization analysis in the tune mode, and a memory configured to store the plurality of images captured by the camera, wherein
the display part notifies a user of the completion of capturing the plurality of images by the camera.

11. A portable optical reader comprising:
a reading part optically reading a symbol as a reading object;
a dome-shaped member provided in front of the reading part, the dome-shaped member having a first opening, a side wall surface and a second opening, the first opening through which a reading optical axis of the reading part passes formed on a rear end surface of the dome-shaped member which faces to the reading part, the sidewall surface having a diameter which progressively or gradually becomes larger with an increase of a distance from the first opening, and the second opening formed in a front end of the sidewall surface;
the reading part and the dome-shaped member being housed within a head part, the head part having a side surface having a diameter which progressively and gradually becomes larger from a rear side to a front side, and having a reading port in a position facing to the second opening;
a holding part extending in a direction increasing a distance from a reading optical axis of the reading part, one end of the holding part being mounted on the side surface of the head part; and
a display part displaying at least a reading result read by the reading part, the display part provided to the side surface except a portion where the holding part is mounted within the side surface of the head part.

12. The portable optical reader according to claim 11, wherein the display part is formed in an elongated shape in which a direction along a circumference of the side surface of the head part is defined as a longitudinal direction.

13. The portable optical reader according to claim 11, wherein the dome-shaped member is a diffusion plate.

14. The portable optical reader according to claim 11, the head part having the reading port at the front side of the head part in a position facing to the second opening of the dome-shaped member.

15. The portable optical reader according to claim 11, the display part including an indicator for notifying a user of a reading result read by the reading part.

16. The portable optical reader according to claim 11, the portable optical reader further comprising a switch for switching to a tune mode, the tune mode being for optimizing parameters to read a code.

17. The portable optical reader according to claim 16, wherein the display part indicates completion information when an optimization analysis is completed in the tune mode.

18. The portable optical reader according to claim 17, the reading part comprising a camera configured to capture a plurality of images of a symbol prior to the optimization analysis in the tune mode, and a memory configured to store the plurality of images captured by the camera, wherein
the display part notifies a user of the completion of capturing the plurality of images by the camera.

19. A portable optical reader comprising:
a reading part optically reading a symbol as a reading object;
a head part housing the reading part and having a reading port for the reading part;
a holding part continuously connected to the head part and extending in a connecting direction; and
a display part provided in the head part to display at least a reading result read by the reading part,
wherein the head part has outer side surfaces, and the display part is provided on at least two of outer side surfaces, the outer side surfaces being a side surface facing to a surface on which the holding part is connected, and being side surfaces facing in a direction substantially orthogonal to both a reading direction by the reading part and an extending direction of the holding part.

* * * * *